(12) United States Patent
Park et al.

(10) Patent No.: US 10,736,116 B2
(45) Date of Patent: Aug. 4, 2020

(54) METHOD AND APPARATUS FOR AN UPLINK TRANSMISSION BASED ON A CHARACTERISTIC OF PHYSICAL RESOURCES

(71) Applicant: Samsung Electronics Co., Ltd., Suwon-si, Gyeonggi-do (KR)

(72) Inventors: Seunghoon Park, Suwon-si (KR); Jungmin Moon, Suwon-si (KR); Sangkyu Baek, Yongin-si (KR)

(73) Assignee: Samsung Electronics Co., Ltd., Suwon-si, (KR)

( * ) Notice: Subject to any disclaimer, the term of this patent is extended or adjusted under 35 U.S.C. 154(b) by 0 days.

(21) Appl. No.: 16/009,932

(22) Filed: Jun. 15, 2018

(65) Prior Publication Data
US 2018/0368133 A1 Dec. 20, 2018

(30) Foreign Application Priority Data

Jun. 15, 2017 (KR) .................. 10-2017-0076110
Aug. 10, 2017 (KR) .................. 10-2017-0101948

(51) Int. Cl.
*H04W 4/00* (2018.01)
*H04W 72/04* (2009.01)
*H04W 72/14* (2009.01)
*H04L 5/00* (2006.01)
*H04W 72/12* (2009.01)

(52) U.S. Cl.
CPC ............ *H04W 72/048* (2013.01); *H04L 5/00* (2013.01); *H04W 72/042* (2013.01);
(Continued)

(58) Field of Classification Search
CPC ....... H04W 76/046; H04L 5/00; H04L 5/0055
See application file for complete search history.

(56) References Cited

U.S. PATENT DOCUMENTS

2011/0038335 A1* 2/2011 Kim .................. H04L 47/10
370/329
2013/0051334 A1 2/2013 Sammour et al.
(Continued)

FOREIGN PATENT DOCUMENTS

EP 3 413 637 A1 12/2018
WO 2016/021638 A1 2/2016

OTHER PUBLICATIONS

Ericsson: Logical Channel prioritization and multiple numerologies; 3GPP TSG-RAN WG2#98, Tdoc R2-1704397; May 15-19, 2017; Hangzhou, P.R of China (Year: 2017).*
(Continued)

*Primary Examiner* — Lan-Huong Truong
(74) *Attorney, Agent, or Firm* — Jefferson IP Law, LLP

(57) ABSTRACT

The disclosure relates to a pre-fifth-generation (5G) or 5G communication system to be provided for supporting higher data rates beyond fourth-generation (4G) communication system such as long term evolution (LTE). A method of a terminal of a wireless communication system is provided. The method includes receiving information on mapping between at least one logical channel and profile information of at least one uplink grant from a base station, receiving the at least one uplink (UL) grant from the base station, and transmitting data based on the profile information of the at least one uplink grant and the mapping information.

16 Claims, 41 Drawing Sheets

(52) U.S. Cl.
CPC ....... *H04W 72/1268* (2013.01); *H04W 72/14* (2013.01); *H04W 72/0446* (2013.01); *H04W 72/0453* (2013.01); *H04W 72/1289* (2013.01)

(56) References Cited

U.S. PATENT DOCUMENTS

| | | | |
|---|---|---|---|
| 2017/0202009 A1* | 7/2017 | Kim | H04W 72/1284 |
| 2017/0311317 A1* | 10/2017 | Dinan | H04W 72/048 |
| 2018/0092089 A1* | 3/2018 | Yin | H04W 72/0446 |
| 2018/0115928 A1* | 4/2018 | Kim | H04W 36/0061 |
| 2018/0132282 A1* | 5/2018 | Ly | H04W 8/245 |
| 2018/0139668 A1 | 5/2018 | Takahashi et al. | |

OTHER PUBLICATIONS

Huawei et al., "Remaining issues on LCP with Multiple Numerologies; 3GPP TSG-RAN WG2 #98; R2-1705624; May 15-19, 2017; Hangzhou, China"; (Year: 2017).*

Samsung; The Details of LCP for Supporting Multiple Numerologies/TTIs; 3GPP TSG RAN WG2 #97bis; R2-1703716; Apr. 3-7, 2017; Spokane, WA.

Catt; LCP procedure for NR; 3GPP TSG-RAN WG2 Meeting #97bis; R2-1704258; May 15-19, 2017; Hangzhou, China.

Ericsson; Logical channel prioritisation and multiple numerologies; 3GPP TSG-RAN WG2 #98; Tdoc R2-1704397; May 15-19, 2017; Hangzhou, P.R. of China.

Lenovo et al.; LCP procedure with multiple numerologies; 3GPP TSG-RAN WG2 Meeting #98; R2-1705317; May 15-19, 2017; Hangzhou, China.

Huawei et al.; Remaining issues on LCP with Multiple Numerologies; 3GPP TSG-RAN WG2 #98; R2-1705624; May 15-19, 2017; Hangzhou, China.

International Search Report dated Sep. 14, 2018; International Appln. No. PCT/KR2018/006806.

Extended European Search Report dated Mar. 23, 2020, issued in European Patent Application No. 18816600.3.

* cited by examiner

METHOD AND APPARATUS FOR AN UPLINK TRANSMISSION BASED ON A CHARACTERISTIC OF PHYSICAL RESOURCES

CROSS-REFERENCE TO RELATED APPLICATION(S)

This application is based on and claims priority under 35 U.S.C. § 119(a) of a Korean patent application number 10-2017-0076110, filed on Jun. 15, 2017, in the Korean Intellectual Property Office, and of a Korean patent application number 10-2017-0101948, filed on Aug. 10, 2017 in the Korean Intellectual Property Office, the disclosure of each of which is incorporated by reference herein in its entirety.

BACKGROUND

1. Field

The disclosure relates to a wireless communication system. More particularly, the disclosure relates to a method and apparatus for multiplexing multiple services that are simultaneously active in a terminal (e.g., user equipment (UE)) for efficient uplink (UL) transmission.

2. Description of Related Art

In more particular, the disclosure proposes a method for a terminal to determine, when the terminal receives an UL grant, services or logical channels (LCHs) having the data to be transmitted based on physical layer properties (e.g., numerology, transmission time interval (TTI) length, modulation and coding scheme (MCS), and power control command)) of the UL grant and generate a packet with the service-specific or logical channel-specific data.

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'Beyond 4G Network' or a 'Post long term evolution (LTE) System'.

The 5G communication system is considered to be implemented in higher frequency millimeter wave (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beam forming, large scale antenna techniques are discussed in 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed. Meanwhile, a terminal can transmit data on the UL resources allocated by a base station (e.g., gNb). However, it has never been defined how a terminal having multiple simultaneously active services with different requirements selects at least one service of which data are to be transmitted. There is therefore a need of a method for a terminal having multiple simultaneously active services to select at least one service to transmit the data belonging to the selected service on the UL resources allocated by the base station.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method for a terminal having multiple services with different requirements to select at least one service or logical channel so as to transmit data belonging to the selected service or logical channel on uplink (UL) resources allocated by a base station based on physical layer properties of the UL resources. Also, the disclosure proposes operations of a terminal and a base station for making such a logical channel selection determination.

Additional aspects will be set forth in part in the description which follows and, in part, will be apparent from the description, or may be learned by practice of the presented embodiments.

In accordance with an aspect of the disclosure, a method of a terminal of a wireless communication system is provided. The method includes receiving information on mapping between at least one logical channel and profile information of at least one uplink grant from a base station, receiving the at least one uplink grant from the base station, and transmitting data based on the profile information of the at least one uplink grant and the mapping information.

In accordance with another aspect of the disclosure, a method of a base station of a wireless communication system is provided. The method includes transmitting information on mapping between at least one logical channel and profile information of at least one uplink grant to a terminal, transmitting the at least one uplink grant to the terminal, and receiving data from the terminal, which selects the data based on the profile information of the at least one uplink grant and the mapping information.

In accordance with another aspect of the disclosure, a terminal of a wireless communication system is provided. The terminal includes a transceiver and at least one processor configured to receive information on mapping between at least one logical channel and profile information of at least one uplink grant from a base station, receive the at least one uplink grant from the base station, and transmit data based on the profile information of the at least one uplink grant and the mapping information.

In accordance with another aspect of the disclosure, a base station of a wireless communication system is provided. The base station includes a transceiver and at least one processor configured to transmit information on mapping between at least one logical channel and profile information of at least one uplink grant to a terminal, transmit the at least one uplink grant to the terminal, and receive data from the terminal, which selects the data based on the profile information of the at least one uplink grant and the mapping information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
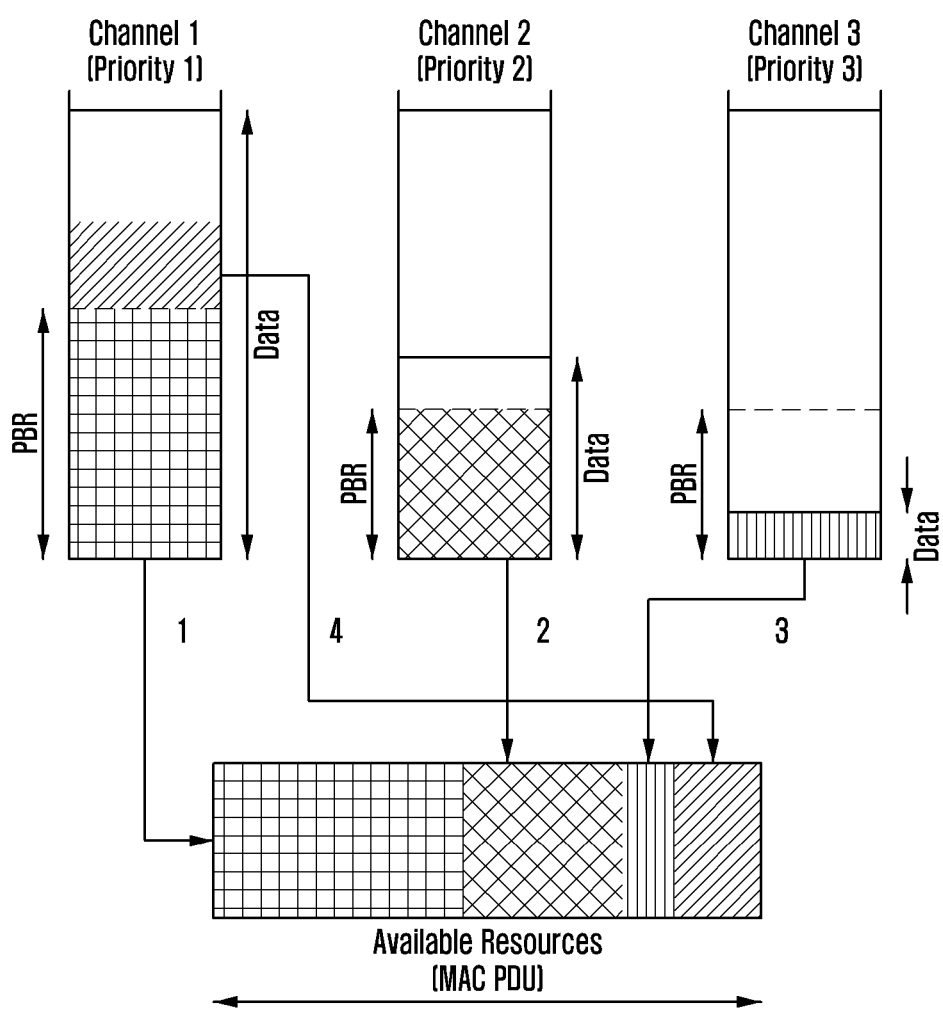
FIG. 1 is a diagram illustrating a logical channel prioritization (LCP)-based uplink (UL) resource utilization method according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Advantages and features of the disclosure and methods of accomplishing the same may be understood more readily by reference to the following detailed description of embodiments and the accompanying drawings. The disclosure may, however, be embodied in many different forms and should not be construed as being limited to the various embodiments set forth herein; rather, these embodiments are provided so that this disclosure will be thorough and complete and will fully convey the concept of the disclosure to those skilled in the art, and the disclosure will only be defined by the appended claims. Like reference numerals refer to like elements throughout the specification.

The disclosure proposes a logical channel prioritization (LCP) operation for uplink (UL) transmission of a terminal in a mobile communication system.

It is expected that a fifth generation (5G) mobile communication system supports various services (or slices) such as an enhanced mobile BroadBand (eMBB), an ultra-reliable and low-latency communication (URLLC), and an enhanced machine type communication (eMTC). This may be understood in the same context as a long term evolution (LTE) system, as a fourth generation (4G) mobile communication system, supporting voice over Internet protocol (VoIP) as a voice call service and a best effort (BE) service. It is also expected that various numerologies are supported in the 5G mobile communication system. In detail, the numerology denotes a subcarrier spacing, etc.

It is also expected that various lengths of time interval transmission (TTI) are supported in the 5G mobile communication system. This is one of the significant features distinguishing the 5G mobile communication system from the up-to-date standard LTE system supporting only one TTI length (1 ms). If the 5G mobile communication system supports a TTI (e.g., TTI of 0.1 ms) that is very shorter than the TTI of 1 ms in use by the LTE system, this may be a great help to support the services requiring a short delay such as URLLC.

The disclosure proposes a UL scheduling method considering support of the characteristics (i.e., various services, numerologies, and TTI) of the 5G mobile communication system. The disclosure proposes a scheduling method for supporting various services with various numerologies and TTIs, which differs from the LTE UL scheduling method designed for supporting various services.

Before undertaking the detailed description of the disclosure, a brief description is made of the logical channel prioritization (LCP). The disclosure adopts the LCP for UL scheduling.

In the case of a downlink (DL) scheduling, all operations of DL scheduling and DL traffic generation and transmission are performed by a base station. That is, the base station performs the DL scheduling and transmits the generated DL traffic. In the case of a UL scheduling, however, the operations of UL traffic generation and transmission are performed by the terminal but the operation of UL scheduling by the base station. Accordingly, the base station performs the UL scheduling to allocate a predetermined size of resources to the terminal, and the terminal generates and transmits UL traffic on the allocated resources. Here, mapping the UL traffic generated by the terminal to the allocated resources is referred to as LCP. In detail, the process may be of determining the type and size of the traffic to be transmitted on the allocated resources. Detailed description is made thereof with reference to FIG. 1.

FIG. 1 is a diagram illustrating an LCP-based UL resource utilization method according to an embodiment of the disclosure.

The UL traffic generated by a terminal is corresponded to a logical channel according to a type of service. For example, a logical channel or a group of logical channels may corresponds to a service. Each logical channel has a priority according to a configuration of a base station.

Referring to FIG. 1, logical channels 1, 2, and 3 have respective priorities, i.e., priority 1, priority 2, and priority 3. The terminal maps the UL traffic to the resources allocated by the base station as follows.

Basically, the terminal maps data to the logical channels by the prioritized bit rate (PBR) in a descending order of the priority. Here, the PBR of each logical channel is configured by the base station through radio resource control (RRC) signaling.

Next, the terminal assigns the remaining traffic to the logical channels in the descending order repetitively until the allocated resources exhausted. In this manner, the UL traffic belonging to multiple logical channels can be multiplexed.

A description is made of the first embodiment of the disclosure hereinafter.

In LTE, a base station transmits modulation and coding scheme (MCS) information to a terminal using a UL grant. This information indicates the modulation order and coding scheme for use by the terminal in generating a physical layer (PHY) packet. The MCS information is used by the terminal in processing the given data to generate the PHY packet but not in determining service or logical channel (LCH) having the data to be transmitted through the UL grant. In the uplink transmission method according to the first embodiment of the disclosure, the terminal uses the MCS information in determining the service or LCH having the data to be transmitted through the UL grant.

Figure 2A:
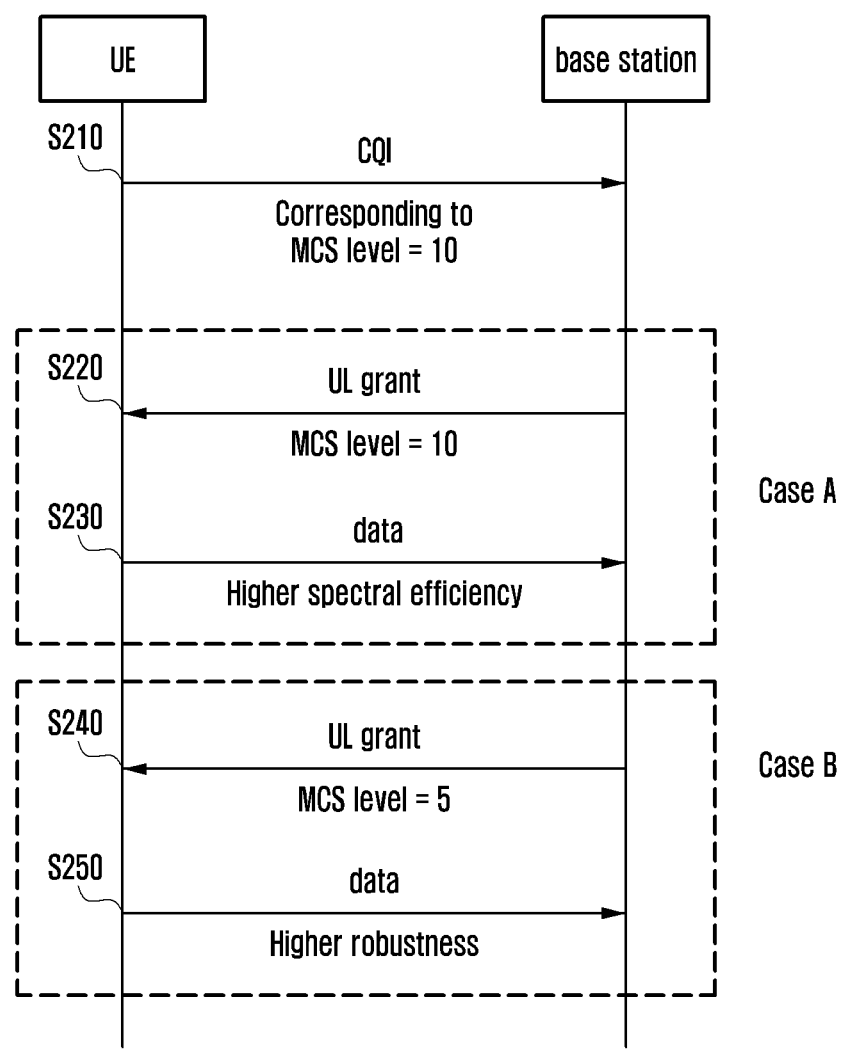
FIG. 2A is a signal flow diagram illustrating a procedure for a base station to transmit a terminal a UL grant including different modulation and coding scheme (MCS) information if a specific channel quality indicator (CQI) is received from the terminal (user equipment (UE)) according to an embodiment of the disclosure.

FIG. 2A is a signal flow diagram illustrating a procedure for a base station to transmit a terminal a UL grant including different MCS information if a specific channel quality indicator (CQI) is received from the terminal (user equipment (UE)) according to an embodiment of the disclosure.

The terminal may feedback the CQI at operation S210. It is assumed that the terminal feeds back the CQI corresponding to MCS level 10 to the base station.

Here, two cases are considered as follows.

Case A: The base station may transmit to the terminal, at operation S220, a UL grant indicating the MCS level 10 determined based on the CQI feedback information from the terminal.

Case B: The base station may transmit to the terminal, at operation S240, a UL grant indicating the MCS level 5 determined based on the CQI feedback from the terminal.

Typically, when a channel gain is given between the base station and the terminal, the terminal feeds back the highest one of CQI satisfying a given target error rate to the base station.

Accordingly, in case A, the terminal receives, at operation S220, the UL grant indicating the MCS level 10 with which the highest throughput is expected while satisfying the given target error rate when the terminal transmits data at operation S230. This means that the base station determines to set the MCS level to 10 to achieve the highest throughput while satisfying the target error rate.

In case B, the terminal receives, at operation S240, the UL grant indicating the MCS level 5 with which a throughput less than that in case A is expected while satisfying an error rate less than that the target error rate when the terminal transmits data at operation S250. This is because there is a trade-off between the error rate and the throughput when a channel gain is given between the base station and the terminal.

Accordingly, if the base station generates a UL grant indicating the MCS level 5 to the terminal even though the terminal feeds back the CQI indicating the MCS level 10, this means that it is intended for the terminal to transmit data with a low error rate. If the base station generates a UL grant indicating the MCS level 5 to the terminal, this may intend to satisfy the give error rate with the reduction of the channel gain.

However, the terminal cannot distinguish between above-described situations of case A and case B. That is, when the terminal feeds back the CQI corresponding to the MCS level 10 and receives the UL grant indicating the MCS level 5 from the base station, it cannot be aware whether (a) the base station has inevitably decreased the MCS level from 10 to 5 as a result of observation or prediction of channel gain reduction or (b) the base station has intentionally decreases the MCS level from 10 to 5 to satisfy a low target error rate although possible to satisfy the target error rate with the MCS level 10.

Supposed that both eMBB traffic requiring a higher throughput and URLLC traffic requiring a high reliability and low error rate exist in a buffer of the terminal. The terminal may transmit the eMBB traffic or URLLC traffic in an allocated TTI based on the TTI length and subcarrier spacing value. If the terminal can distinguish the above-described MCS configuration intents of the base station, it may be possible for the terminal to transmit data in consideration of the MCS configuration intent in addition to the TTI length and subcarrier spacing value. In order to accomplish this, the terminal may operate as follows.

In the case where the base station transmits a UL grant indicating an MCS level lower than that corresponding to the CQI feedback of the terminal to set a low target error rate, the terminal transmits the URLLC traffic requiring a high reliability and low error rate, among the traffic existing in the buffer, through the allocated UL grant.

In the case where the base station transmits a UL grant indicating an MCS level similar to that corresponding to the CQI feedback of the terminal for a high throughput, the terminal transmits eMBB traffic requiring high throughput, among the traffic existing in the buffer, through the allocated UL grant.

In this manner, if the terminal is capable of identifying the MCS configuration intent of the base station, it may be possible for the terminal to determine the LCH having the data to be transmitted when it receives the UL grant. That is, the terminal is capable of selecting an LCH that matches the properties of the UL grant and transmitting data through the LCH, thereby improving service quality.

In order to accomplish this, the disclosure proposes a method for the base station to transmit to the terminal a UL grant including a 1-bit indicator indicating the MCS configuration intent. In the disclosure, the 1-bit indicator is referred to as conservative MCS. Although the specific term is used to describe the embodiments of the disclosure, it is obvious that the term can be change for any other intending the MCS configuration intent. The conservative MCS is exemplified as follows.

If Conservative MCS=1, this may mean that the MCS level indicated in the UL grant transmitted by the base station is selected with the intent of transmission of traffic requiring a low error rate.

If Conservative MCS=0, this may mean that the MCS level indicated in the UL grant transmitted by the base station is selected with the intent of transmission of traffic requiring a high throughput.

Table 1 shows information fields of the LTE UL grant to which the 1-bit conservative MCS field is added.

TABLE 1

| Field name | Length (number of bits) |
| --- | --- |
| Flag for format 0/1A differentiation | 1 |
| Hopping flag | 1 |
| N_ULhop | 1~2 |
| Resource block assignment | 5~13 |
| MCS and RV | 5 |
| NDI | 1 |
| TPC for PUSCH | 2 |
| Cyclic shift for DM RS | 3 |
| UL index (TDD only) | 2 |
| Downlink assignment index | 2 |
| CQI request | 1~2 |
| Conservative MCS | 1 |

Figure 2B:
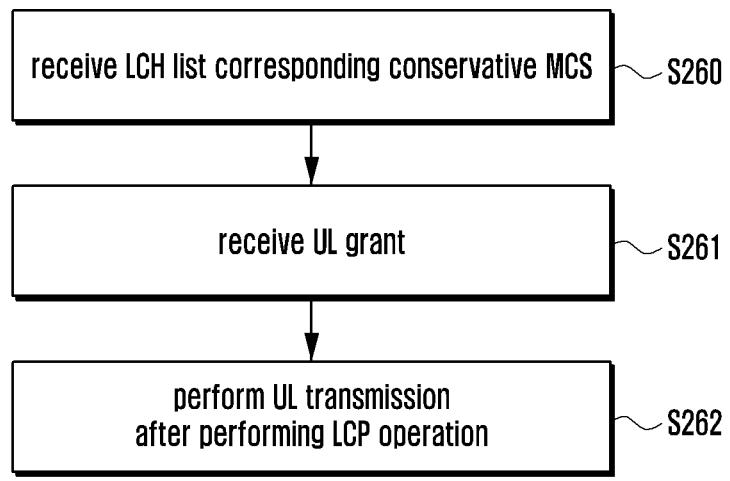
FIG. 2B is a flowchart illustrating an operation of a terminal according to an embodiment of the disclosure.

A description is made of the operation of a terminal in detail with reference to FIG. 2B.

FIG. 2B is a flowchart illustrating an operation of a terminal according to an embodiment of the disclosure.

(1) The terminal may receive an LCH list at operation S260. The terminal may receive an LCH list for the conservative MCS=1 and another LCH list for the conservative MCS=0. The terminal may receive the conservative MCS value-specific LCH lists through an RRC information element (IE) such as LogicalChannelConfig IE.

(2) The terminal may receive a UL grant at operation S261. Upon receipt of the UL grant, the UE may check the conservative MCS field of the UL grant.

A. If the conservative MCS is set to 1, the terminal selects an LCH matching the conservative MCS=1 according to the mapping between the conservative MCS and the LCH, the mapping being provided by the base station, and performs LCP operation on the selected LCH.

B. If the conservative MCS is set to 0, the terminal selects an LCH matching the conservative MCS=0 according to the mapping between the conservative MCS and the LCH, the mapping being provided by the base station, and performs LCP operation on the selected LCH.

(3) After completing the LCP operation, the terminal performs UL transmission at operation S262.

Figure 2C:
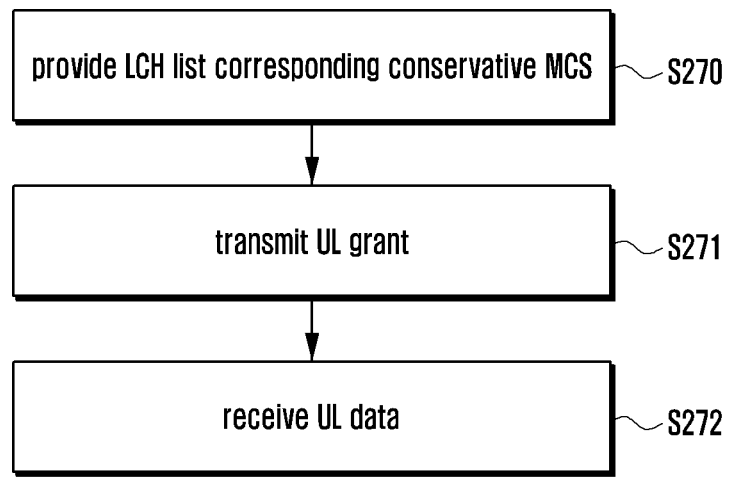
FIG. 2C is a flowchart illustrating an operation of a base station according to an embodiment of the disclosure.

FIG. 2C is a flowchart illustrating an operation of a base station according to an embodiment of the disclosure.

(1) The base station may transmit to a terminal the LCH lists for the conservative MCS=1 and the conservative MCS=0, respectively, at operation S270. The base station may transmit the conservative MCS value-specific LCH lists to the terminal through an RRC IE such as LogicalChannelConfig IE.

(2) The base station may transmit a UL grant at operation S271. The base station may include a conservative MCS field in the UL grant, and the terminal may check the conservative MCS field of the UL grant.

(3) Then, the base station may receive uplink data from the terminal at operation S272. The uplink data may belong to the LCH corresponding to the conservative MCS. The detailed description of the mapping between the conservative MCS and the LCH has been made above and thus is omitted herein.

A description is made of the second embodiment of the disclosure hereinafter.

In LTE, a base station transmits transmit power control (TPC) information to a terminal using a UL grant. This information is essential in order for the terminal to determine an uplink transmit power level. Although the terminal uses the TPC information in determining the transmit power for transmitting a PHY packet generated with give data but not in determining a service or LCH having the data to be transmitted through the UL grant. The TPC information is used by the terminal in determining the transmit power for transmitting a PHY packet generated with given data but not in determining a service or LCH having the data to be transmitted through the UL grant. In the uplink transmission method according to the second embodiment of the disclosure, the terminal uses the TPC information in determining the service or LCH having the data to be transmitted through the UL grant.

Figure 3A:
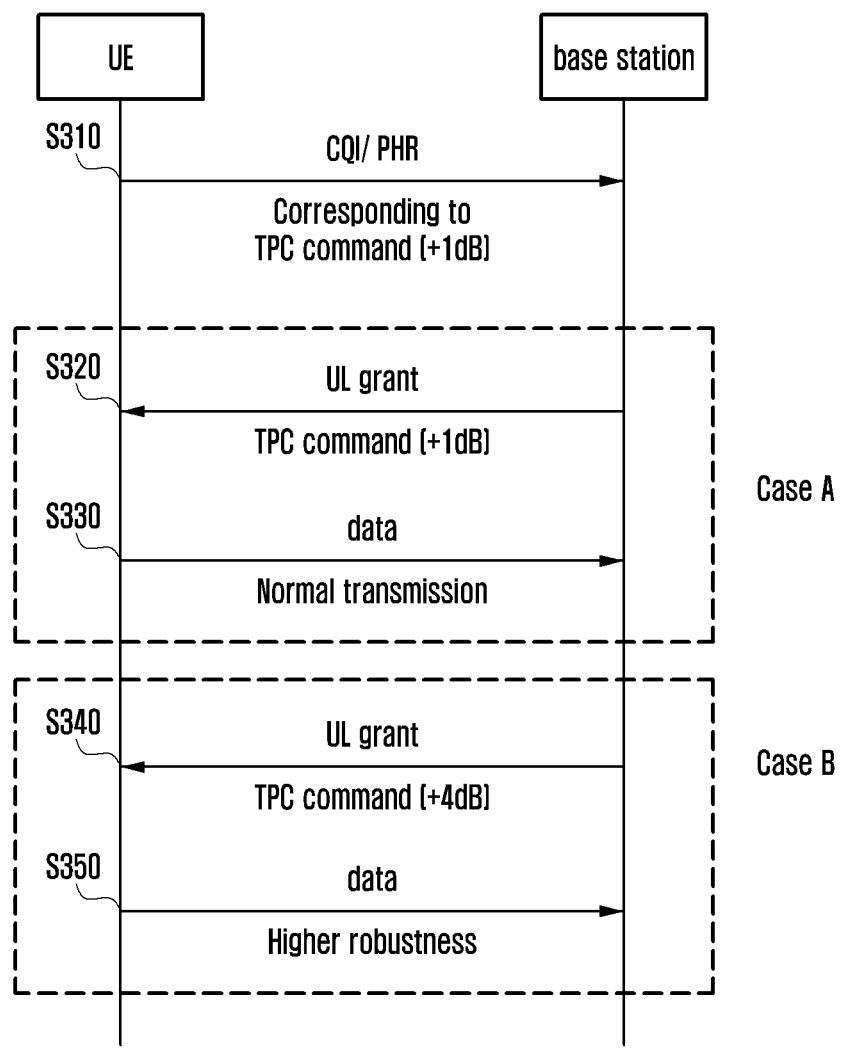
FIG. 3A is a signal flow diagram illustrating a procedure for a base station to transmit a terminal a UL grant including a transmit power control (TPC) command determined differently depending on a CQI and a power headroom report (PHR) received from the terminal according to an embodiment of the disclosure.

FIG. 3A is a signal flow diagram illustrating a procedure for a base station to transmit a terminal a UL grant including a TPC command determined differently depending on a CQI and a power headroom report (PHR) received from the terminal according to an embodiment of the disclosure.

The terminal may perform CQI feedback and PHR at operation S310 to provide the base station of information on the channel gain between the base station and the terminal and the power headroom of the terminal. In this embodiment, the terminal may set the TPC command to +1 dB.

Here, two cases are considered as follows.

Case A: The base station may transmit to the terminal, at operation S320, a UL grant including the TPC command instructing the terminal to increase its transmit power by 1 dB (TPC command (+1 dB)) in comparison with that for the previous transmission based on the CQI and PHR received from the terminal. The terminal transmits at an increased power at operation S330.

Case B: The base station may transmit to the terminal, at operation S340, a UL grant including the TPC command instructing the terminal to increase its transmit power by 4 dB (TPC command (+5 dB) in comparison with that for the previous transmission based on the CQI and PHR received from the terminal. The terminal transmits at an increased power at operation S350.

Typically, when a channel gain is given between the base station and the terminal, the base station set the TPC command such that the received signal strength of the UL signal at the base station becomes a target signal strength.

For example, if the base station has previously received the UL signal from the terminal with the target signal strength and the current channel gain is reduced by 1 dB in comparison with that for the previous transmission, the base station instructs the terminal to increase its transmit power by 1 dB in comparison with the previous transmit power in order to compensate for the reduction of the channel gain.

Accordingly, in case A, the terminal which receives the UL grant including the TPC command instructing to increase the transmit power by 1 dB in comparison with that for the previous transmission may assume that the base station has observed or predicted the channel gain reduction by 1 dB.

Likewise, in case B, the terminal which receives the UL grant including the TPC command instructing to increase the transmit power by 4 dB in comparison with that for the previous transmission may assume that the base station has observed or predicted the channel gain reduction by 4 dB.

It may also be possible to consider the following situation. It may occur that the channel gain between the base station and the terminal is actually reduced by 1 dB although the base station transmits the UL grant including the TPC command instructing the terminal to increase its transmit power by 4 dB as in the above-described case B. The reason why the base station instructs the terminal to increase its transit power by 4 dB through the TPC command is to receive the UL signal from the terminal more stably, i.e., at a lower error rate, by increasing the target signal strength by 3 dB.

However, the terminal cannot understand the intent why the base station sets the TPC command as above only based on the TPC information included in the UL grant. That is, when the base station instructs the terminal to increase its transmit power in comparison with that for its previous transmission, the terminal cannot be aware whether the base station intends to (a) compensate for the channel gain reduction at the same target signal strength or (b) increase the target signal strength.

Supposed that both URLLC traffic requiring a high reliability and low error rate and other normal eMBB traffic exist in a buffer of the terminal. The terminal may transmit the eMBB traffic or URLLC traffic in an allocated TTI based on the TTI length and subcarrier spacing value. If the terminal can distinguish between the above described TPC command configuration intents of the base station, it may be possible for the terminal to transmit data in consideration of the TPC command configuration intent in addition to the TTI length and subcarrier spacing value. In order to accomplish this, the terminal may operate as follows.

In the case where the base station transmits a UL grant indicating an increase of the target signal strength, based on the channel gain between the base station and the terminal and the PHR received from the terminal, with the intent of achieving a lower target error rate on the basis of the channel gain between the base station and the terminal and the PHR received from the terminal, the terminal transmits the URLLC traffic requiring a high reliability and low error rate, among the traffic existing in the buffer, through the allocated UL grant.

In the case where the base station transmits a UL grant indicating an increase of the target signal strength, based on the channel gain between the base station and the terminal and the PHR received from the terminal, with no intent of achieving a lower target error rate, the terminal transmits the normal eMBB traffic among the traffic existing in the buffer, through the allocated UL grant.

In this manner, if the terminal is capable of identifying the TPC command configuration intent of the base station, it may be possible for the terminal to determine the LCH having the data to be transmitted when it receives the UL grant. That is, the terminal is capable of selecting an LCH having the data matching the properties of the allocated UL grant, thereby improving service quality.

In order to accomplish this, the disclosure proposes a method for the base station to transmit to the terminal a UL grant including a 1-bit indicator indicating the TPC command configuration intent. In the disclosure, the 1-bit indicator is referred to as transmission power boost. Although the specific term is used to describe the embodiments of the disclosure, it is obvious that the term can be change for any other intending the TPC command configuration intent. The transmission power boost is exemplified as follows.

If Transmission power boost=1, this may mean that the TPC command included in the UL grant transmitted by the base station is configured for the intent of transmission of traffic requiring a low error rate.

If Transmission power boost=1, this may mean that the TPC command included in the UL grant transmitted by the base station is configured for the intent of normal eMBB traffic transmission rather than the URLLC traffic.

Table 2 shows information fields of the LTE UL grant to which the 1-bit transmission power boost field is added.

TABLE 2

| Field name | Length (number of bits) |
| --- | --- |
| Flag for format 0/1A differentiation | 1 |
| Hopping flag | 1 |
| N_ULhop | 1~2 |
| Resource block assignment | 5~13 |
| MCS and RV | 5 |
| NDI | 1 |
| TPC for PUSCH | 2 |
| Cyclic shift for DM RS | 3 |
| UL index (TDD only) | 2 |
| Downlink assignment index | 2 |
| CQI request | 1~2 |
| Transmission power boost | 1 |

Figure 3B:
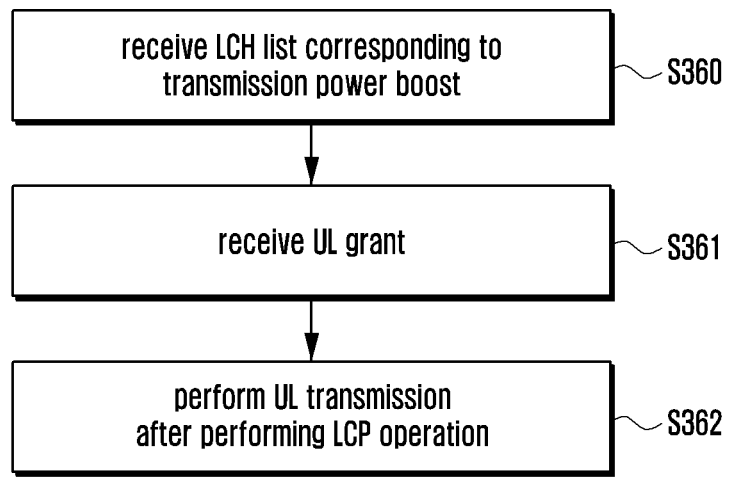
FIG. 3B is a flowchart illustrating an operation of a terminal according to an embodiment of the disclosure.

A description is made of the operation of a terminal in detail with reference to FIG. 3B.

FIG. 3B is a flowchart illustrating an operation of a terminal according to an embodiment of the disclosure.

(1) The terminal may receive an LCH list at operation S360. The terminal may receive an LCH for the transmission power boost=1 and another LCH for the transmission power boost=0. The terminal may receive the transmission power boost value-specific LCH lists through an RRC IE such as LogicalChannelConfig IE.

(2) The terminal may receive a UL grant at operation S361. Upon receipt of the UL grant, the UE may check the transmission power boost field of the UL grant.

A. If the transmission power boost is set to 1, the terminal selects an LCH matching the transmission power boost=1 according to the mapping between the transmission power boost and the LCH, the mapping being provided by the base station, and performs LCP operation on the selected LCH.

B. if the transmission power boost is set to 0, the terminal selects an LCH matching the transmission power boost=0 according to the mapping between the transmission power boost and the LCH, the mapping being provided by the base station, and performs LCP operation on the selected LCH.

(3) After completing the LCP operation, the terminal performs UL transmission at operation S362.

Figure 3C:
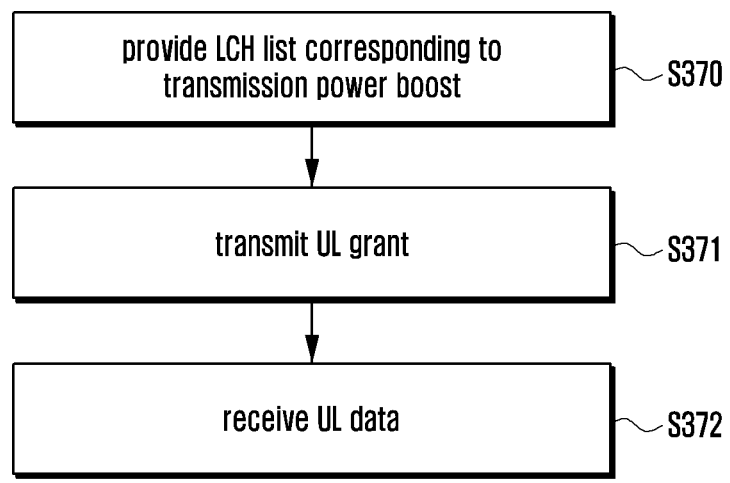
FIG. 3C is a flowchart illustrating an operation of a base station according to an embodiment of the disclosure.

FIG. 3C is a flowchart illustrating an operation of a base station according to an embodiment of the disclosure.

(1) The base station may transmit a terminal the LCH lists for the transmission power boost=1 and transmission power boost=0, respectively, at operation S370. The base station may transmit the transmission power boost value-specific LCH lists to the terminal through an RRC IE such as LogicalChannelConfig IE.

(2) The base station may transmit a UL grant at operation S371. The base station may include a transmission power boost field in the UL grant, and the terminal may check the transmission power boost field of the UL grant.

(3) Then, the base station may receive uplink data from the terminal at operation S372. The uplink data may belong to the LCH corresponding to the transmission power boost. The detailed description of the mapping between the transmission power boost and the LCH has been made above and thus is omitted herein.

A description is made of the third embodiment of the disclosure hereinafter.

In the 5G mobile communication system or NR system under discussion in the 3GPP, communication between a base station and a terminal may be established with various types of numerologies and TTI lengths. Accordingly, a UL grant transmitted by the base station to allocate uplink resources to the terminal may include a combination of a numerology and a TTI. Such a system should be designed to support services expected to appear in the future without significant modification as well as the 5G services such as eMBB, URLLC, and eMTC with different requirements.

There may be a mapping relationship between physical layer property information (e.g., numerology and TTI length) in the UL grant and a service. For example, a UL grant including certain physical layer property information may be more appropriate for eMBB traffic transmission of the terminal, whereas a UL grant including any other physical layer property information may be more appropriate for URLLC traffic transmission of the terminal. The physical layer properties to be considered are as follows.

TTI length, slot length, symbol length
Subcarrier spacing, cyclic prefix length
MCS level, transmission power
number of symbols per subframe, TTI, or slot
whole bandwidth of allocated resources, FFT size
etc.

The above information is necessary to generate a PHY packet in the physical layer of the terminal and may be referred to differently. The physical layer of the terminal has to know the above enumerated parameters to generate the PHY packet and perform UL transmission. This is required to generate the PHY packet correctly and perform the UL transmission. However, it is not necessary for a media access control (MAC) layer of the terminal to know all of the parameters but some related to scheduling such as LCP. It should be avoided notify the MAC layer of other parameters, which increase terminal implementation complexity and unnecessary information sharing between layers.

Accordingly, the base station may transmit to the terminal a UL grant including physical layer property information for use in the LCP operation in two methods as follows.

Method 1) The base station transmits the terminal a UL grant including a profile ID corresponding to a physical layer property. Detailed description is made thereof with reference to FIG. 4. In the disclosure the term "profile ID" may be interchangeably referred to as physical layer property ID.

Method 2) The base station may notify values of parameters included in a predetermined parameter set using a UL grant. Upon receipt of the UL grant, the terminal checks the values of the parameters included in the predetermined parameter set. Then, the terminal identifies the physical layer property ID corresponding to the resources allocated with the parameter values included in the parameter sets of the UL grant. Detailed description is made thereof with reference to FIG. 5.

The aforementioned methods 1 and 2 are described in a comparative manner as follows.

In the case of using Method 1, the terminal checks the physical layer properties of the allocated UL grant based on the profile ID notified by the base station regardless of the physical layer properties that are actually included in the UL grant transmitted by the base station. For example, the physical layer properties may be set as follows.

UL grant 1: Subcarrier spacing=S1 kHz, TTI length=T1 ms, MCS level=M1, TPC command=+1 dB→physical layer property ID=A UL grant 2: Subcarrier spacing=S1 kHz, TTI length=T1 ms, MCS level=M2, TPC command=+1 dB→physical layer property ID=B UL grant 3: Subcarrier spacing=S1 kHz, TTI length=T1 ms, MCS level=M1, TPC command=+4 dB→physical layer property ID=C UL grant 4: Subcarrier spacing=S2 kHz, TTI length=T2 ms, MCS level=M1, TPC command=+1 dB→physical layer property ID=A In reference to the above example, the UL grants 1 and 2 are identical with each other with the exception of difference in MCS level. Meanwhile, the UL grants 1 and 3 are identical with each other with the exception of difference in TPC command. Meanwhile, the UL grants 1 and 4 are identical with each other with the exception of difference in TTI length. In this situation, the profile IDs of the UL grants 1 and 2 have different profile IDs, and the UL grants 1 and 3 have different profile IDs. Meanwhile, the UL grants 1 and 4 have the same profile ID although they have different subcarrier spacings and different TTI lengths.

In this situation, although the base station configures and notifies the parameters (subcarrier spacing, TTI length, MCS level, TPC command, etc.) and profile ID according to its UL scheduling intent to the terminal, the terminal does not know which parameter of the UL grant determines the profile ID of the UL grant. This method has advantages as follows.

The MAC layer of the terminal is capable of identifying the intent of the UL grant based on the physical layer property ID although it cannot understand several parameters such as subcarrier spacing, TTI length, MCS level, and TPC command.

The base station may also freely configure the parameters related to the UL grant to associate the parameters with the profile ID of the UL grant.

In order to accomplish Method 1, however, the base station has to notify the UE the profile ID directly by means of the UL grant. That is, the base station has to include additional information in the UL grant.

Meanwhile, the base station may transmit to the terminal an LCH list corresponding to the profile ID. That is, the base station may transmit to the terminal the mapping information between the profile ID and LCH through RRC signaling.

Accordingly, upon receipt of the UL grant, the terminal may select an LCH corresponding to the profile ID included in the UL grant and perform the LCP on the selected LCH. Detailed description is made thereof with reference to FIG. 4.

Figure 4:
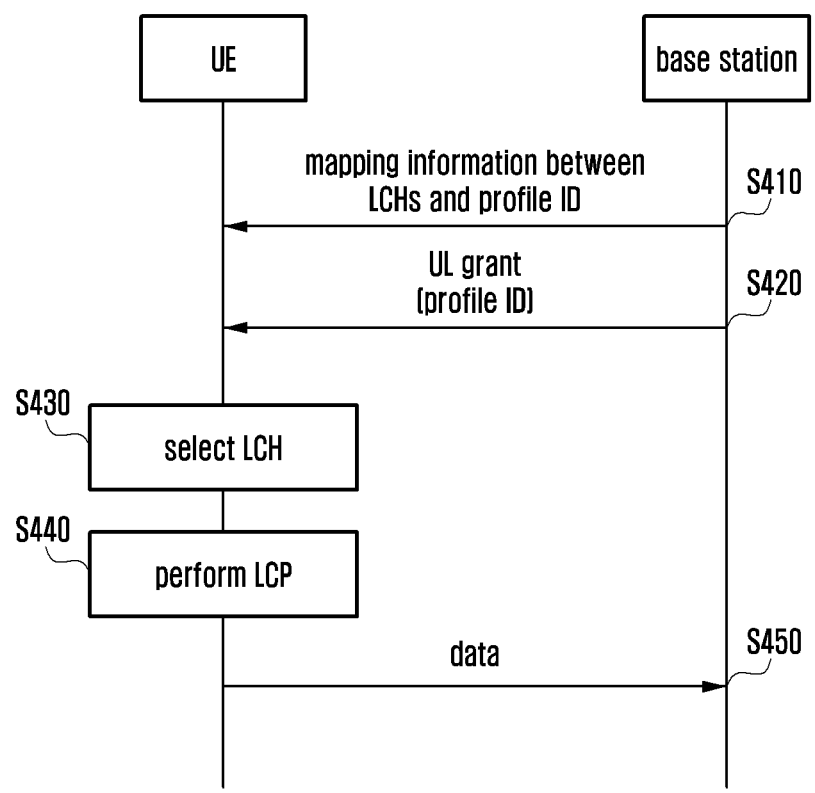
FIG. 4 is a signal flow diagram illustrating a method for a base station notify a terminal of a profile ID using a UL grant according to an embodiment of the disclosure.

FIG. 4 is a signal flow diagram illustrating a method for a base station notify a terminal of a profile ID using a UL grant according to an embodiment of the disclosure.

Referring to FIG. 4, the base station may transmit mapping information between profile IDs and LCHs (or LCH-related mapping information) to the terminal at operation S410. The mapping information may be configured in various manners to show the relationship between the LCHs and profile IDs. For example, the mapping information may be a list of LCHs corresponding to individual profile IDs or information on the mappings of the profiles IDs per LCH. It may also be possible to configure the relationship between the LCHs and profile IDs in any other method. For example, the mapping information may be configured as shown in Table 5.

Next, the base station may transmit a UL grant to the terminal at operation S420. The UL grant may include a profile ID. As described above, the profile ID may be configured regardless of the physical layer property information included in the UL grant.

Upon receipt of the UL grant, the terminal may select an LCH at operation S430. The terminal may select the LCH based on the received profile ID and mapping information.

Next, the terminal may perform the LCP at operation S440. That is, the terminal may allocate the data to be transmitted via the selected LCH to the resources indicated by the UL grant. The terminal may also process the data to generate a transport block corresponding in size to the resources indicated by the UL grant.

Next, the terminal may transmit data at operation S450.

The procedure depicted in the drawing may be applicable even to the case where the profile ID is not used. That is, the base station may transmit to the terminal the mapping information between profiles and LCHs. Accordingly, the terminal may select the LCH mapped to the profile of the received UL grant without checking for the profile ID.

In the case of using Method 2, the base station may notify the UE of the value of a parameter included in the predetermined parameter set using the UL grant in order for the terminal to identify the value of the parameter included in the predetermined parameter set. The terminal identifies the profile ID corresponding to the resources indicated by the UL grant. An example is as follows.

It is assumed that the parameters predetermined between the base station and the terminal for use in determining a profile ID are the subcarrier spacing and TTI length. Here, a UL grant may include the physical layer property information set as follows.

UL grant 1: Subcarrier spacing=S1 kHz, TTI length=T1 ms, MCS level=M1, TPC command=+1 dB→physical layer property ID=A UL grant 2: Subcarrier spacing=S1 kHz, TTI length=T1 ms, MCS level=M2, TPC command=+4 dB→physical layer property ID=A UL grant 3: Subcarrier spacing=S3 kHz, TTI length=T3 ms, MCS level=M1, TPC command=+1 dB→physical layer property ID=C In reference to the above example, the UL grants 1 and 2 are identical with other in terms of including the same subcarrier spacing and the same TTI length that are the parameters predetermined between the base station and the terminal in determining the physical layer property ID and different from each other in terms of including different MCS levels and different TPC commands that are not the parameters predetermined between the base station and the terminal in determining the physical layer property ID. Accordingly, the UL grants 1 and 2 may have the same profile ID.

Meanwhile, the UL grants 1 and 3 are different from each other in terms of including different subcarrier spacings and different TTI lengths and identical with each other in terms of including the same MCS level and the same TPC command. Accordingly, the UL grants 1 and 3 may have different profile IDs.

In Method 2, the profile ID of the terminal is determined based on only the parameters predetermined between the base station and the terminal regardless of other parameters. This method is advantageous in terms of no necessity of additional information in the UL grant.

Meanwhile, Method 2 differs from Method 1 in that the base station has to notify the terminal of parameters for use by the terminal in determining the physical layer property ID and parameter combinations corresponding to respective physical layer property IDs. An example thereof is as follows.

Assuming that the physical layer property ID is determined according to a combination of the numerology (or subcarrier spacing) and the TTI length, the base station may transmit to the terminal an RRC message including the information configured as shown in Table 3.

TABLE 3

| Numerology (subcarrier spacing) | TTI length | Profile ID |
| --- | --- | --- |
| S1 kHz | T1 ms | 1 |
|  | T2 ms | 1 |
|  | T3 ms | 2 |
| S2 kHz | T1 ms | 2 |
|  | T2 ms | 2 |
|  | T3 ms | 3 |
| S3 kHz | T1 ms | 3 |
|  | T2 ms | 4 |
|  | T3 ms | 4 |

Referring to Table 3, if the combination of the numerology and the TTI length is (S1, T1) or (S1, T2), this means that the UL grant indicates the profile ID 1.

Meanwhile, if the combination of the numerology and the TTI length is (S1, T3), (S2, T1), or (S2, T2), this means that the UL grant indicates the profile ID 2.

If the combination of the numerology and the TTI length is (S2, T3) or (S3, T1), this means that the UL grant indicates the profile ID 3.

If the combination of the numerology and the TTI length is (S3, T2) or (S3, T3), this means that the UL grant indicates the profile ID 4.

In this case, when a UL grant is received, the terminal may check the numerology and TTI length included in the UL grant for retrieving a profile ID indicated by the UL grant from Table 3.

In a case where the profile ID is determined the TTI length and the conservative MCS proposed in the disclosure, the base station transmits the terminal an RRC message including the information configured as shown in Table 4.

TABLE 4

| TTI length | Conservative MCS | Physical layer property ID |
| --- | --- | --- |
| T1 ms | 0 | 1 |
|  | 1 | 1 |
| T2 ms | 0 | 3 |
|  | 1 | 2 |
| T3 ms | 0 | 3 |
|  | 1 | 2 |
| T4 ms | 0 | 4 |
|  | 1 | 4 |

Referring to Table 4, if the combination of the TTI length and the Conservative MCS is (T1, 0) or (T1, 1), this means that the UL grant indicates the profile ID 1.

Meanwhile, if the combination of the TTI length and the Conservative MCS is (T2, 1) or (T3, 1), this means that the UL grant indicates the profile ID 2.

If the combination of the TTI length and the Conservative MCS is (T2, 0) or (T3, 0), this means that the UL grant indicates the profile ID 3.

If the combination of the TTI length and the Conservative MCS is (T4, 0) or (T4, 1), this means that the UL grant indicates the profile ID 4.

In this case, when a UL grant is received, the terminal may check the TTI length and the conservative MCS included in the UL grant for retrieving a profile ID indicated by the UL grant from Table 4.

As depicted in Table 4, the base station may transmit to the terminal an LCH list corresponding to the profile IDs. That is, the base station may transmit the mapping information between the profile IDs and LCHs to the terminal through RRC signaling.

The base station may also transmit to the terminal the information on the parameter set for use by the terminal in checking the profile ID.

Accordingly, if the terminal receives a UL grant, it may retrieve the profile ID based on the physical layer property information (parameters) included in the UL grant. Then, the terminal may select an LCH corresponding to the profile ID and perform the LCP. Detailed description is made thereof with reference to FIG. 5.

Figure 5:
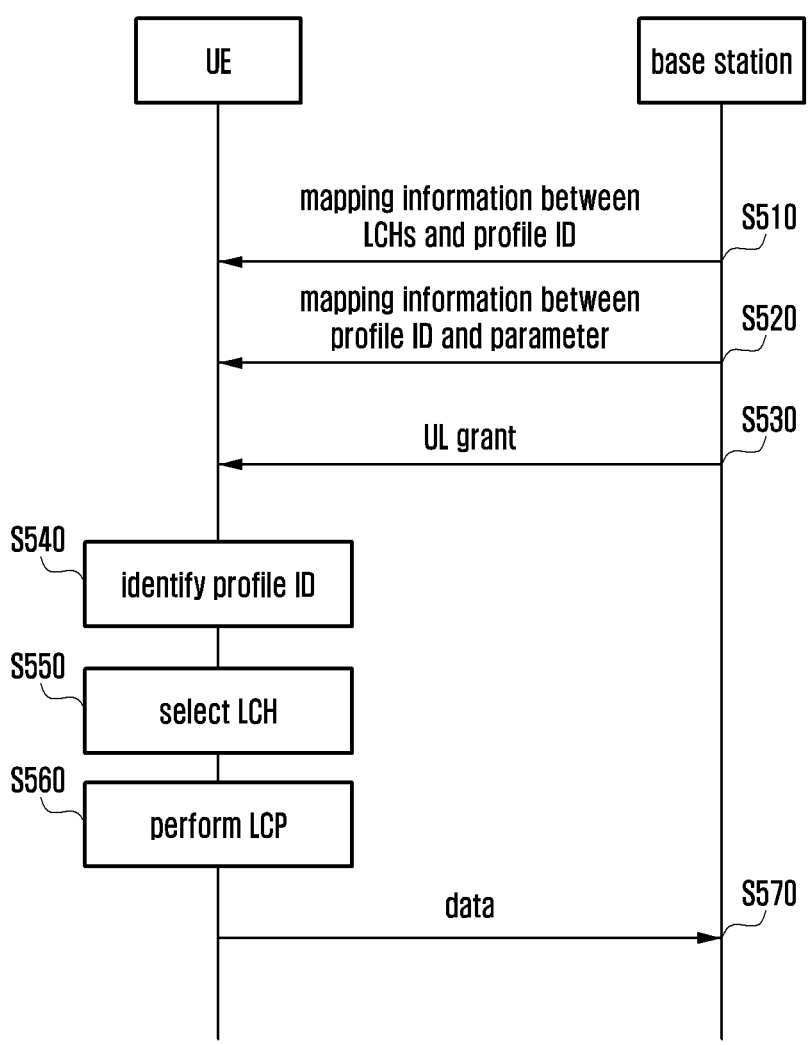
FIG. 5 is a signal flow diagram illustrating a method for deriving a profile ID according to an embodiment of the disclosure.

FIG. 5 is a signal flow diagram illustrating a method for deriving a profile ID according to an embodiment of the disclosure.

In this embodiment, the terminal derives the profile ID by comparing the parameters acquired directly or indirectly through a UL grant or other signaling with the mapping relationship predetermined between the profile IDs and the parameters rather than explicitly receiving the profile ID in the UL grant.

Referring to FIG. 5, the base station may transmit to the terminal the mapping information between profile IDs and LCHs (LCH-related mapping information or first mapping information) at operation S510. In this case, the mapping information may be transmitted in the same manner as described with reference to FIG. 4, and detailed description thereof is made later.

Next, the base station may transmit parameter set information to the terminal at operation S520. Here, the parameter set information may be configured in various manners for use in indicating a profile ID. For example, this information may be the information on the parameter sets corresponding to the respective profile IDs or the information mapping the profile IDs to the respective parameter sets. It may also be possible to configure the relationship between the parameter sets and profile IDs in a different manner. The parameter set information may be interchangeably referred to as parameter-profile ID mapping information, parameter-related mapping information, and second mapping information.

Next, the base station may transmit to the terminal a UL grant at operation S530. Here, the UL grant may include not profile ID.

Upon receipt of the UL grant, the terminal may derive, at operation S540, the profile ID based on the physical layer property information and the parameter-related mapping information included in the UL grant.

Next, the terminal may select an LCH at operation S550. The terminal may select the LCH based on the retrieved profile ID and the LCH-related mapping information.

Net, the terminal may perform the LCP at operation S560. That is, the terminal may map the data belonging to the selected LCH to the resources indicated by the UL grant. The terminal may also process the data to generate a transport block corresponding in size to the resources indicated by the UL grant.

Next, the terminal may transmit the data at operation S570.

The procedure depicted in the drawing may be applicable even to the case where the profile ID is not used. That is, the base station may transmit to the terminal the parameter set information (or profile) and mapping information between the parameter sets and LCHs. Accordingly, the terminal may select the LCH mapped to the corresponding parameter set.

The above descriptions are directed to a case where the base station transmits the terminal the UL grant including the information necessary for deriving a profile ID intended such as numerology, TTI length, MCS, TPC command, conservative MCS, and transmission power boost. However, it may also be possible for the terminal to acquire such information (particularly the numerology and TTI length) in a different manner, without receipt of a UL grant.

1. The base station configures bandwidth parts for transmitting control information or control channel such as a physical downlink control channel (PDCCH) and data or data channel such as a physical downlink shared channel (PDSCH) to the terminal. The bandwidth parts configuration may be performed through RRC signaling.

Here, each bandwidth part may correspond to a certain numerology or a certain TTI length. The base station may notify the terminal of the mapping relationship between the bandwidth part and the numerology or TTI length trough RRC signaling.

Upon receipt of the bandwidth part configuration from the base station, the terminal may determine the numerology or TTI length of the UL resources allocated thereto.

2. The base station may configure the bandwidth part to monitor for receipt of the control channel such as PDCCH. This configuration may be performed through RRC signaling.

Each bandwidth part may correspond to a certain numerology or a certain TTI length. The base station may notify the terminal of the mapping relationship between the bandwidth part and the numerology or TTI length through RRC signaling.

Accordingly, if the base station configures a certain bandwidth part for use by the terminal in receiving the control information such as PDCCH from the base station, the terminal may determine the numerology or TTI length of the UL resource allocated thereto based on the bandwidth part configuration.

3. The base station may notify the terminal of a time-frequency resource position for transmitting data such as PDSCH using the control information such as PDCCH in order for the terminal to determine the bandwidth part to which the resources allocated to the terminal belongs.

Here, the bandwidth part may correspond to a certain numerology or a certain TTI length. The base station may notify the terminal of the mapping relationship between the bandwidth part and the numerology or TTI length through RRC signaling.

Accordingly, if certain time-frequency resources of the bandwidth part are allocated for data transmission/reception, the terminal may determine the numerology or TTI length of the allocated UL resources based thereon.

4. The base station notifies the terminal of a subframe, slot, or symbol time interval, or a PDCCH monitoring occasion to monitor for receipt of the control information such as PDCCH.

Here, the subframe, slot, or symbol time interval or the PDCCH monitoring occasion to monitor for receipt of the control information may correspond to a certain numerology or a certain TTI length. The base station may notify the terminal of the mapping relationship between the PDCCH monitoring occasion and the numerology or TTI length through RRC signaling.

Accordingly, if the time interval or PDCCH monitoring occasion to monitor for receipt of the control information is configured, the terminal may determine the numerology or TTI length of the UL resources allocated thereto.

5. The base station may notify the terminal of a subframe, slot, or symbol time interval and a bandwidth part to monitor for receipt of the control information such as PDCCH. This notification is med through RRC signaling.

Here, a combination of the subframe, slot, or symbol time interval (or PDCCH monitoring occasion) and the bandwidth part may correspond to a certain numerology or a certain TTI length. This mapping relationship may be transmitted to the terminal through RRC signaling.

Accordingly, if a certain time interval and bandwidth part is allocated as a time interval and frequency region to monitor for receipt of the control information, the terminal may determine the numerology or TTI length of the UL resources allocated thereto.

6. There may be a mapping relationship between a downlink control information (DCI) format for the UL grant indicating resources allocated to the terminal and the numerology or TTI length (or combination of the numerology and TTI length).

For example, it may be predefined that the UL resources allocated with the UL grant in DCI format 1 have a numerology N1 and a TTI length T1. In this case, the terminal may determine the numerology or TTI length of the UL resources indicated by the UL grant based on the corresponding DCI format. Likewise, it may be predefined that the UL resources allocated with the UL grant in DCI format 2 have a numerology N2 or a TTI length T2. In this case, the terminal may determine the numerology or TTI length of the UL resources indicated by the UL grant based on the corresponding DCI format.

The mapping relationship between the DCI format and the numerology, TTI length, or the combination of the numerology and TTI length may be transmitted to the terminal through RRC signaling or preconfigured between the base station and the terminal in conformance to a standard.

The above description has been made of the method for determining the profile ID of the resources indicated by the UL grant received from the base station. The reason for classifying the physical layer properties of the resources that may be indicated by a UL grant is to make it possible for the terminal to transmit traffic belonging to a service (i.e., LCH) appropriate for the resources with specific physical layer properties as indicated by the UL grant.

In order to accomplish this, the base station defines the mapping relationship between the profile IDs and LCHs and notifies the terminal of the mapping relationship in order for the terminal, when it receives a UL grant including a profile ID and corresponding physical layer properties, to select the LCH of which data transmission is suitable for the physical layer properties. The base station may notify the terminal of the mapping relationship between the profile ID and LCH by transmitting a message such a logical channel configuration message through RRC signaling.

As described above, the profile ID may be included in the DCI for the UL grant in use by the base station for allocating resource to the terminal.

The mapping relationship between the profile ID and the LCH may be configured as shown in Table 5.

TABLE 5

| Physical layer property ID | LCH |
| --- | --- |
| 1 | LCH a, LCH b |
| 2 | LCH c, LCH d |
| 3 | LCH a, LCH b, LCH c, LCH d |

Table 5 shows the mapping relationship between the physical layer property IDs and LCHs. The base station may transmit an RRC message including the LCH information along with the corresponding profile ID.

Table 6 exemplifies an RRC IE in use by the base station for providing the terminal with the information on a certain logical channel, i.e., LCH configuration (LogicalChannelConfig) IE, including an explicit profile ID of profileIdentity.

TABLE 6

```
-                 LogicalChannelConfig
The IE LogicalChannelConfig is used to configure the logical channel parameters.
                        LogicalChannelConfig information element
-- ASN1START
LogicalChannelConfig ::= SEQUENCE {
    ul-SpecificParameters           SEQUENCE {
        priority                    INTEGER (1..16),
        profileIdentity             INTEGER (1,..8),
        prioritisedBitRate          ENUMERATED {
                                        kBps0, kBps8, kBps16,kBps32, kBps64,
                                        kBps128,kBps256, infinity, kBps512-
                                        v1020, kBps1024-v1020, kBps2048-
                                        v1020, spare5, spare4, spare3, spare2,
                                        spare1},
        bucketSizeDuration          ENUMERATED {
                                        ms50, ms100, ms150, ms300, ms500,
                                        ms1000, spare2, spare1},
        logicalChannelGroup         INTEGER (0..3)   OPTIONAL   -- Need OR
    }   OPTIONAL,                                               -- Cond UL
    ...,
    [[  logicalChannelSR-Mask-r9    ENUMERATED {setup}   OPTIONAL -- Cond
SRmask
    ]],
    [[  logicalChannelSR-Prohibit-r12   BOOLEAN   OPTIONAL   -- Need ON
    ]]
}
-- ASN1STOP
```

| LogicalChannelConfig field descriptions |
| --- |
| bucketSizeDuration |
| Bucket Size Duration for logical channel prioritization in TS 36.321 [6]. Value in milliseconds. Value ms50 corresponds to 50 ms, ms100 corresponds to 100 ms and so on. |
| logicalChannelGroup |
| Mapping of logical channel to logical channel group for BSR reporting in TS 36.321 [6]. |
| logicalChannelSR-Mask |
| Controlling SR triggering on a logical channel basis when an uplink grant is configured. See TS 36.321 [6]. |
| logicalChannelSR-Prohibit |
| Value TRUE indicates that the logicalChannelSR-ProhibitTimer is enabled for the logical channel. E-UTRAN only (optionally) configures the field (i.e. indicates value TRUE) if logicalChannelSR-ProhibitTimer is configured. See TS 36.321 [6]. |

LogicalChannelConfig field descriptions prioritisedBitRate
Prioritized Bit Rate for logical channel prioritization in TS 36.321 [6]. Value in kilobytes/second.
Value kBps0 corresponds to 0 kB/second, kBps8 corresponds to 8 kB/second, kBps16
corresponds to 16 kB/second and so on. Infinity is the only applicable value for SRB1 and SRB2
priority
Logical channel priority in TS 36.321 [6]. Value is an integer.
profileIdentity
Profile identity that corresponds to the logical channel. When UE receives a UL grant that
includes a certain profile identity, the UE selects a set of logical channels that have the same
profile identity and then perform the LCP procedure for the selected logical channels.

In Table 6, bucketSizeDuration is a parameter indicating the bucket size duration for the LCP operation as the maximum data sized allocable at LCP 1 operation.

The parameter logicalChannelGroup denotes the ID of a logical channel group to which the corresponding logical channel belongs. This parameter is used for buffer status report (BSR) (operation for reporting the data size in the buffer).

The parameter logicalChannelSR-Mask may control scheduling request (SR) triggering on each logical channel when UL resources have been allocated to the terminal.

The parameter logicalChannelSR-ProhibitTimer is sent to TRUE to indicate use of the logicalChannelSR-ProhibitTimer on the logical channel. In the case of the evolved universal terrestrial radio access (E-UTRA), the corresponding item can be applied only when the logicalChannelSR-ProhibitTimer is configured.

The parameter prioritisedBitRate may indicate a prioritized bit rate in use in the LCP operation (may indicate a parameter determining data size being allocated at LCP 1 phase).

The parameter priority may indicate the priority of the logical channel.

The parameter profileIdentity may indicate the profile ID corresponding to a certain logical channel. If the terminal is allocated UL resources identified by a certain profile ID, it may select a logical channel corresponding to the profile ID and perform the LCP operation on the selected logical channel.

Accordingly, upon receipt of the UL grant, the terminal checks the profile ID and, if the profile ID is 1, performs the LCP process on LCH a and LCH b.

Upon receipt of the UL grant, the terminal checks the profile ID and, if the profile ID is 2, performs the LCP process on LCH c and LCH d.

Upon receipt of the UL grant, the terminal checks the profile ID and, if the profile ID is 3, perform the LCP process on LCH a, LCH b, LCH c, and LCH d.

As described above, the profile ID determination may be made through a method for checking the profile ID included in the UL grant transmitted by the base station (method 1) or a method for determined the profile ID based on certain information included in the UL grant (method 2).

In the disclosure, the terminal receives a UL grant, determines a profile ID, and performs the LCP operation on the LCH corresponding to the profile ID, as described above. The disclosure includes a method for the base station to configure priorities of the LCHs per profile ID for the LCP operation of the terminal. Assuming the above case, the terminal may assign priorities to the LCHs in the order of LCH a>LCH b for the case of receiving the UL grant including the profile ID 1, LCH c>LCH d for the case of receiving the UL grant including the profile ID 2, and LCH d>LCH c>LCH b>LCH a for the case of receiving the UL grant including the profile ID 3.

A description is made of the fourth embodiment of the disclosure hereinafter.

In the 5G mobile communication or NR, a terminal may receive multiple UL grants including different numerologies or TTI lengths depending on the design of a physical layer. In this case, there is a need of a method for determining which of the multiple UL grants is to be first processed. The base station and the terminal may operate in different manner depending on the UL grand processing order. First, the impact of the UL grant processing order on the operations of the base station and the terminal is described.

The UL grant processing order of the terminal may affect the remaining traffic amount per LCH after LCP. Detailed description is made thereof hereinafter.

Figure 6:
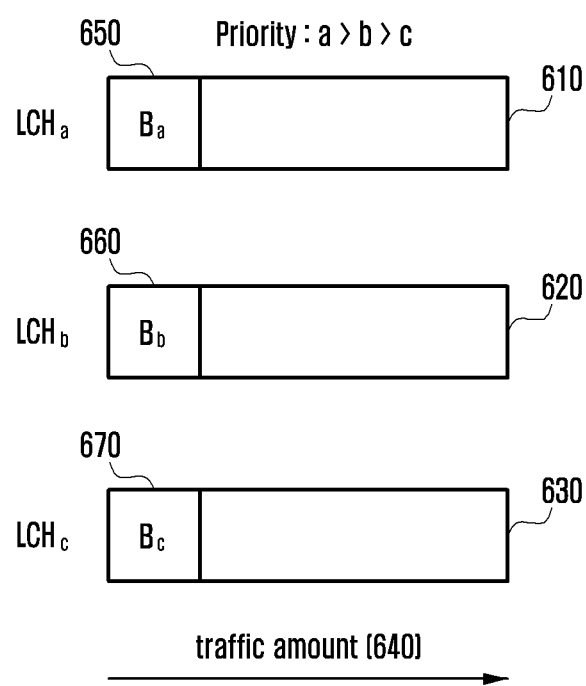
FIG. 6 is a diagram illustrating data amounts B belonging to respective logical channels (LCHs) according to an embodiment of the disclosure.

FIG. 6 is a diagram illustrating data amounts B belonging to respective LCHs according to an embodiment of the disclosure.

Here, it is assumed that the terminal uses three LCHs (LCH a 610, LCH b 620, and LCH c 630) and, the priority among the LCHs is assumed to be high in the order of LCH a, LCH b, and LCH c.

Referring to FIG. 6, reference number 640 denotes the data amount belonging to each of LCHs 610, 620, and 630; reference numbers 650, 660 and 670 denote data mounts $B_a$, $B_b$, and $B_c$ to be preferentially mapped to the allocated resources.

Also, it is assumed that the terminal receives two UL grants, i.e., UL grant X indicating resources for transmission of LCH a and LCH b and UL grant Y indicating resources for transmission of LCH a and LCH c. The data amounts that can be transmitted on the resources indicated by the respective UL grants are depicted in FIG. 7.

Figure 7:
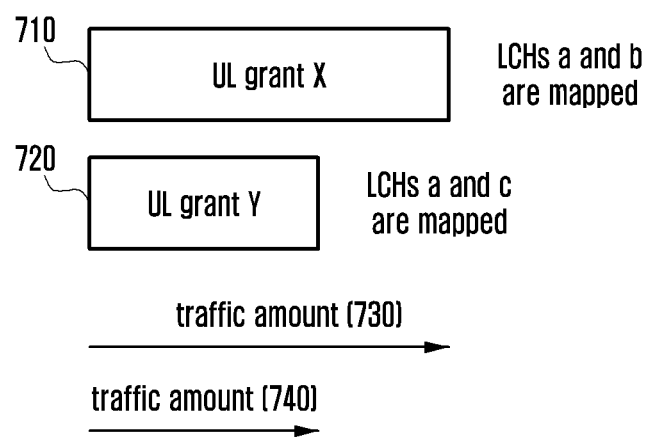
FIG. 7 is a diagram illustrating mapping relationships between resources which a base station allocates to a terminal by means of two UL grants and the LCHs of the terminal according to an embodiment of the disclosure.

FIG. 7 is a diagram illustrating mapping relationships between resources which a base station allocates to a terminal by means of two UL grants and the LCHs of the terminal according to an embodiment of the disclosure.

Referring to FIG. 7, the LCHs a and b are mapped the UL grant X, and the LCH a and c are mapped to the UL grant Y.

In FIG. 7, reference numbers 730 and 740 denote the data amounts that can be transmitted on the resources indicated by the respective UL grants 710 and 720.

In this situation, the UL grant processing order of the terminal may affect the remaining traffic amounts belonging to the respective LCHs, and detailed description thereof is made hereinafter with reference to FIGS. 8 and 9.

Figure 8:
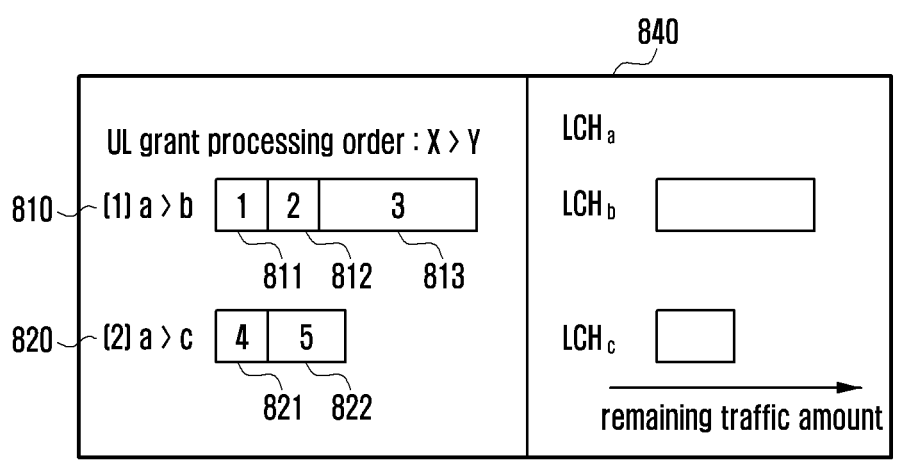
FIG. 8 is a diagram illustrating an operation of processing multiple UL grants in the order of UL grant X and UL grant Y according to an embodiment of the disclosure.

FIG. 8 is a diagram illustrating an operation of processing multiple UL grants in the order of UL grant X and UL grant Y according to an embodiment of the disclosure.

Referring to FIG. 8, the terminal maps the data Ba 811 of the LCH a with the high priority and then the data Bb 812 of the LCH b to the allocated resources because the data belonging to the LCH a and LCH b can be mapped to the resources indicated by the UL grant X 810. Afterward, the terminal maps the remaining data 813 of the LCH a to the remaining part of the resources indicated by the UL grant X.

Next, since all of the data belonging to the LCH a are mapped, the terminal maps the data 821 and 822 belonging to the LCH c to the resources indicated by the UL grant Y 820.

Figure 9:
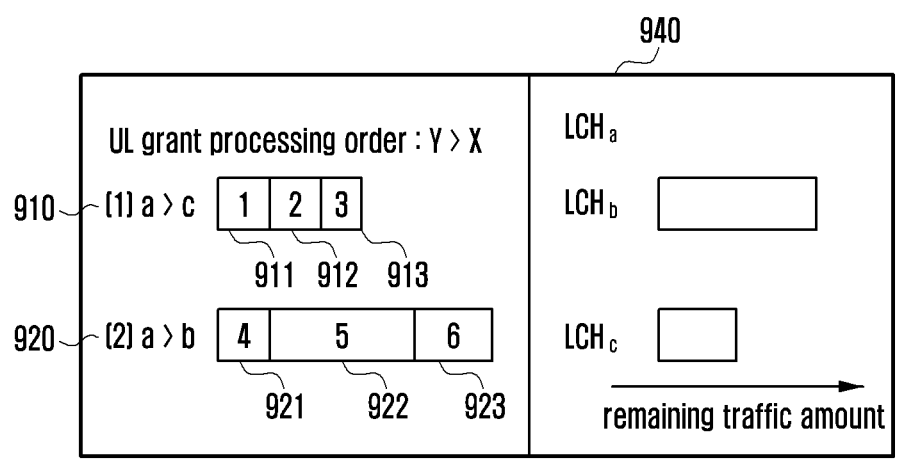
FIG. 9 is a diagram illustrating an operation of processing multiple UL grants in the order of UL grant Y and UL grant X according to an embodiment of the disclosure.

FIG. 9 is a diagram illustrating an operation of processing multiple UL grants in the order of UL grant Y and UL grant X according to an embodiment of the disclosure.

Referring to FIG. 9, the terminal maps the data Ba 911 belonging to the LCH a with the high priority and then the data Bc 912 belonging to the LCH c to the allocated resources because the data belonging to the LCHs a and c can be mapped to the resources indicated by the UL grant Y 910. Afterward, the terminal maps the remaining data 913 of the LCH a to the remaining part of the resources indicated by the UL grant Y.

Next, the terminal maps the data Bb 921 belonging to the LCH b to the resources indicated by the UL grant X 920. Afterward, the terminal maps the remaining data 922 of the LCH a and then the remaining data 923 of the LCH b to the allocated resources.

Reference numbers 840 in FIGS. 8 and 940 in FIG. 9 denote the remaining data amounts of the respective LCHs after LCP. The remaining data amounts of the respective LCHs after LCP vary depending on the UL grant processing order. This means that the UL grant processing order affect the per-LCH remaining data amounts after LCP.

The UL grant processing order of the terminal may also affect the hybrid automatic repeat request (HARQ) retransmission, and detailed description thereof is made hereinafter with reference to FIG. 10.

Figure 10:
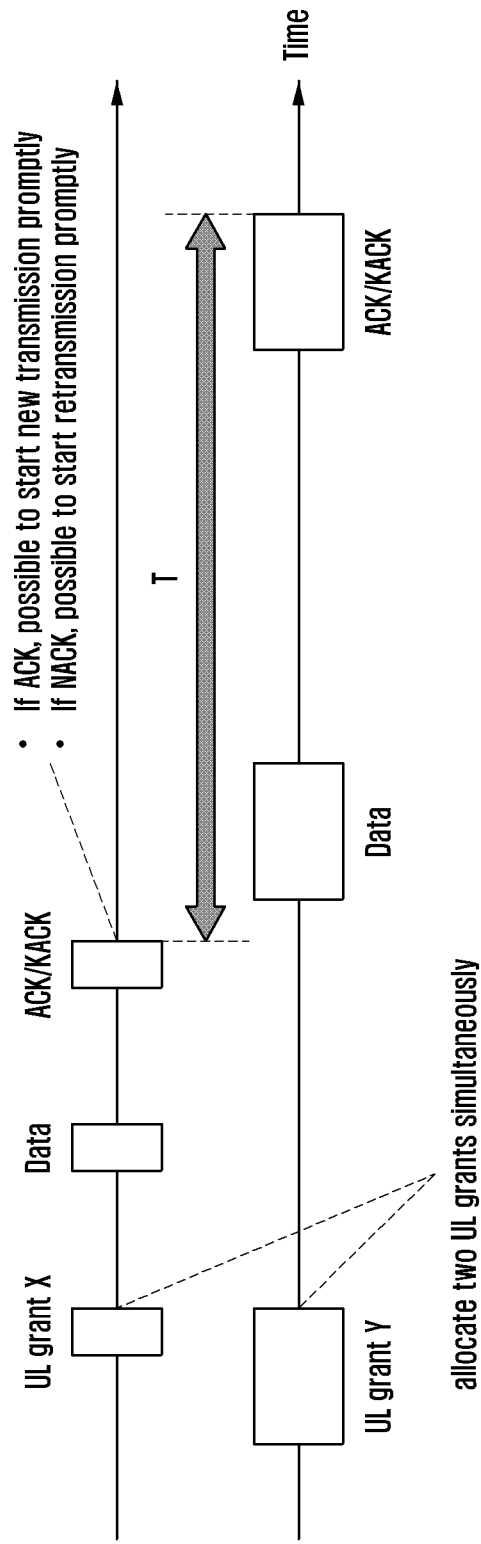
FIG. 10 is a diagram illustrating hybrid automatic repeat request (HARQ) timelines affected by different UL grants according to an embodiment of the disclosure.

FIG. 10 is a diagram illustrating HARQ timelines affected by different UL grants according to an embodiment of the disclosure.

It is assumed that data amount of 100 is present in a buffer of a terminal. Also, it is assumed that the terminal receives two UL grants (UL grant X and UL grant Y) simultaneously.

Referring to FIG. 10, the UL grant X has an HARQ timeline shorter than that of the UL grant Y. It is assumed that a data size limited by the UL grant X is 40, and the data size limited by the UL grant Y is 80. In this situation, it may be possible to consider two cases.

Case 1) The terminal processes the UL grant X first and then the UL grant Y.

Out of the data amount of 100 that is present in the buffer of the terminal, the terminal maps the data amount of 40 to the resources indicated by the UL grant X first and then the data amount of 60 to the resources indicated by the UL grant Y.

Case 2) The terminal processes the UL grant Y first and then the UL grant X.

Out of the data mount of 100 that is present in the buffer of the terminal, the terminal maps the data amount of 80 to the resources indicated by the UL grant Y first and then the data amount of 20 to the resource indicated by the UL grant X.

By comparing the above two cases, it is found that the data amount to be mapped to the resources indicated by the UL grant with the shorter HARQ timeline varies depending on the case. Since the UL grant X has a short HARQ timeline, it is advantageous to transmit more data through the allocated UL grant X from the viewpoint of latency. Accordingly, Case 1 for transmitting more data through the allocated UL grant X is advantageous in comparison with Case 2 from the viewpoint of latency. That is, if the data is allocated as in Case 1, the terminal is capable of receiving a HARQ ACK/NACK and transmitting new data/retransmitting redundancy promptly, thereby processing the data present in its buffer.

In order to mitigate the impact of the UL grant processing order on the remaining traffic amount and HARQ retransmission, there is a need of a method for processing multiple UL grants indicating resources with different properties efficiently. It may be possible to consider basic methods as follows.

Method 1: The base station determines the UL grant processing order of the terminal, i.e., which UL grant is to be first processed by the terminal, and transmits the terminal an RRC message including the UL grant processing order. When multiple UL grants are received, the terminal processes the multiple UL grants according to the UL grant processing order transmitted by the base station.

Method 2: A UL grant processing order is given in a standard document specifying operations of the base station and the terminal. In this case, the terminal processes the multiple UL grants in the UL grant processing order specific in the standard document.

Method 3: The terminal determines the UL grant processing order autonomously depending on the terminal implementation.

A UL grant processing order applicable to all of the above methods may be determined as follows.

When multiple UL grants are received, the terminal processes the UL grants in the ascending order of the TTI.

When multiple UL grants are received, the terminal checks the priorities of LCHs that can be transmitted on the resources indicated by the respective UL grants and processes the UL grants in the descending order of priority. Supposed that the terminal receives two UL grants, i.e., UL grant X and UL grant Y, LCHs 1 and 3 can be transmitted through the UL grant X, and LCHs 2 and 4 can be transmitted through the UL grant Y. If LCH 1 has the highest priority, LCH 2 has the next highest priority, LCH 3 has the next highest priority, and the LCH 4 has the lowest priority, the terminal may process the UL grant X indicating the resources allowed for transmitting LCH 1 with the highest priority and then the UL grant Y.

The terminal may decode a PDCCH to detect the UL grants in order. If the terminal detects multiple UL grants, it processes the UL grants in the order of detection. The base station determines the UL grant processing order of the terminal and encodes the UL grants into a PDCCH in order for the terminal to detect the UL grants in the UL grant processing order.

When multiple UL grants are received, the terminal may identify a number of bits available for data transmission per UL grant and process the UL grants in descending order of the number of bits. Using this method, it is possible to mitigate the situation of distribution of data belonging to one LCH to the resources with different logical channel properties as indicated by the multiple grants.

A description is made hereinafter of the method for determining a UL grant processing order of a terminal when the terminal receives multiple UL grants from a base station.

As described above, in the 5G mobile communication system or 3GPP new radio (NR) system, the base station and the terminal may communicate with each other using radio resources characterized by different numerologies (or subcarrier spacings or cyclic prefix lengths) and TTI lengths. For example, if the system supports subcarrier spacings of 15 kHz, 30 kHz, 60 kHz, and 120 kHz and TTI lengths of 1 symbol, 2 symbols, 1 slot, and 1 subframe, the base station and the terminal may communicate with each other using the radio resources categorized by resource type as shown in Table 7.

TABLE 7

| Resource type | Numerology | TTI length |
|---|---|---|
| 1 | 15 kHz | 1 symbol |
| 2 | 15 kHz | 2 symbols |
| 3 | 15 kHz | 1 slot |
| 4 | 15 kHz | 1 subframe |
| 5 | 30 kHz | 1 symbol |
| 6 | 30 kHz | 2 symbols |
| 7 | 30 kHz | 1 slot |
| 8 | 30 kHz | 1 subframe |
| 9 | 60 kHz | 1 symbol |
| 10 | 60 kHz | 2 symbols |
| 11 | 60 kHz | 1 slot |
| 12 | 60 kHz | 1 subframe |
| 13 | 120 kHz | 1 symbol |
| 14 | 120 kHz | 2 symbols |
| 15 | 120 kHz | 1 slot |
| 16 | 120 kHz | 1 subframe |

In the disclosure, consideration is given to a UL communication between a base station and a terminal. If the base station transmits multiple UL grants to the terminal simultaneously or during a predetermined time period, it may occur that the terminal has to process the multiple UL grants simultaneously. In this case, depending on the UL grant processing order of the terminal, per-LCH traffic amounts that the terminal transmits to the base station, i.e., that the base station receives from the terminal. This is because the UL grants may indicate the resources allowed for transmission of traffics belonging to different logical channels. Detailed description thereof has been made above.

If the base station knows the UL grant processing order of the terminal, it may perform resource allocation in the state of being aware of the per-LCH remaining traffic amounts of the terminal in the next UL grant. In this respect, when the terminal receives multiple UL grants from the base station, it is preferred for the terminal to generate transmission packets according to the UL grant processing order such that the base station reflects the per-channel remaining traffic amounts of the terminal that are estimated based on the UL grant processing order of the terminal in the next resource allocation process. There is therefore a need of a UL grant processing order determination method as proposed hereinafter.

There may be two possible situations where a terminal receives multiple UL grants to process simultaneously.

The terminal receives multiple UL grants on different component carriers (CCs).

The terminal receives multiple UL grants on different bandwidth parts of one CC.

Embodiment 4-1

In the 5G mobile communication or NR system, it may occur that data transmitted through a certain LCH can be transmitted based on a UL grant with specific properties. Here, the properties may include numerology, TTI length, transmit power, processing, time, CC, subcarrier spacing, and cyclic prefix (CP) length. For example, an LCH for eMBB can be transmitted on the resources with the TTI length of 1 symbol, 2 symbol, 1 slot, or 1 subframe as indicated by a UL grant. Meanwhile, an LCH for URLLC can be transmitted on the resources with the TTI length of 1 symbol or 2 symbols as indicated by a UL grant but cannot be transmitted on the resources with the TTI length of 1 slot or 1 subframe.

The LCHs may be prioritized. For example, the base station configures LCHs for the UE along with the priorities of the LCHs. Accordingly, when a UL grant is received, the terminal may perform an LCP operation based on the priorities of the LCHs. That is, the terminal maps predetermined amounts of traffics of the LCHs to the resources indicated by the UL grant in descending order of the priority and then the remaining traffics of the LCHs to the remaining part of the resources indicated by the UL grant in descending order. Detailed description thereof has been described above.

As described above, in the NR system, UL grants and LCHs are corresponded to each other (ii) the LCHs are prioritized. Accordingly, when a UL grant is received, the terminal is capable of identifying the LCHs that can be transmitted through the UL grant based on the preconfigured information and obtaining information as follows based on the priorities of the LCHs.

Smallest value of priority of LCH transmittable on resources indicated by UL grant. Here, the least value indicates the highest priority that can be assigned to an LCH.

Largest value of priority of LCH transmittable on resources indicated by UL grant. Here, the largest value indicates the lowest priority that can be assigned to an LCH.

Average value of priorities of LCHs transmittable on resources indicated by UL grant.

As an example, it is assumed that the base station configures LCH a, LCH b, and LCH c with respective priorities 1, 2, and 3 for the terminal. Supposed that the terminal receives three UL grants from the base station and can transmit the LCHs on the resources indicated by the respective UL grants as elaborated in Table 8. Then, the aforementioned information may be derived from Table 8.

TABLE 8

| | Transmittable LCH | Smallest value | Largest value | Average value |
|---|---|---|---|---|
| UL grant 1 | LCH a | 1 | 1 | 1 |
| UL grant 2 | LCH a, b | 2 | 3 | 2.5 |
| UL grant 3 | LCH a, b, c | 1 | 3 | 2 |

On the basis of the above assumptions and Table 8, when the terminal receives multiple UL grants, it may determine a UL grant processing order as follows.

The terminal ascertains (identifies) the LCHs to be transmitted (corresponding to) the resources indicated by the UL grant.

The terminal ascertains priorities of the LCHs.

The terminal derives at least one of the following values based on the priorities of the LCHs. Hereinafter, the derived value is referred to as LCH priority-related information.

Smallest value of priority of LCH transmittable on resources indicated by UL grant Largest value of priority of LCH transmittable on resources indicated by UL grant Average value of priorities of LCHs transmittable on resources indicated by UL grant ④ The terminal may determine the UL grant processing order using at least one of the following rules based on the derived LCH priority-related information.

The terminal processes the UL grants such that the LCHs transmittable through the allocated UL grants are mapped to the resources in ascending order of the smallest value of the priority.

The terminal processes the UL grants such that the LCHs transmittable through the allocated UL grants are mapped to the resources in ascending order of the largest value of the priority.

The terminal processes the UL grants such that the LCHs transmittable on the resource indicated by the UL grants are mapped to the resources in ascending order of the average value of the priority.

If there are multiple UL grants having the same LCH priority-related information (i.e., same smallest, largest, or average value of the priorities of the LCHs transmittable through the allocated UL grants), the processing order among these UL grants may be determined according to another method proposed in the disclosure.

Embodiment 4-2

Figure 11:
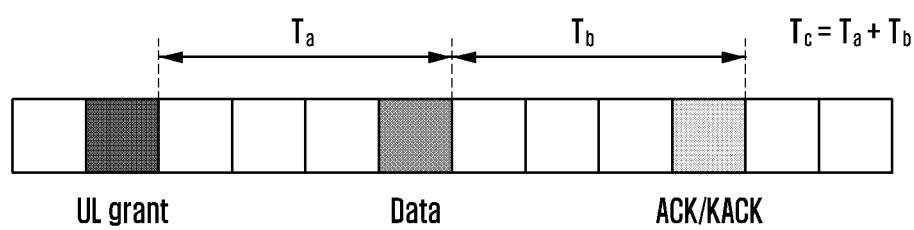
FIG. 11 is a diagram illustrating a HARQ timing relationship according to an embodiment of the disclosure.

FIG. 11 is a diagram illustrating a HARQ timing relationship according to an embodiment of the disclosure.

The NR system supports a flexible HARQ timeline. Referring to FIG. 11, a time period from the timing for a terminal to receive a UL grant from a base station until the timing for the terminal to transmit data may be represented as Ta, and a time period from the timing for the terminal to transmit the data until the timing for the base station to transmit an ACK/NACK corresponding to the data may be represented as Tb. The lengths of Ta and Tb may be determined differently according to the configuration provided by the base station, agreement between the base station and the terminal, or a predetermined standard.

Here, the base station may notify the terminal of Ta via a UL grant. The base station notifies the terminal of the information on the correlation between a resource profile and Ta through RRC signaling and of the resource profile via the UL grant in order for the terminal to ascertain the Ta upon receipt of the UL grant. Here, the information on the correlation between the resource profile and Ta may be the correlation between the whole or part of the information included in the UL grant and Ta or the correlation between the aforementioned profile ID and Ta.

The length of Tb may be determined when the base station allocates ACK/NACK feedback resources to the terminal, or the base station may notify the terminal of Ta through a UL grant or RRC signaling.

The sum of Ta and Tb, i.e., the time period from the timing for the terminal to receive the UL grant to the timing for the terminal to receive the ACK/NACK corresponding to the data is represented as Tc. In the disclosure, the time periods of Ta, Tb, and Tc are interchangeably referred to as first, second, and third time periods, respectively.

This embodiment embodies a method for a terminal, when it receives multiple UL grants, to process the UL grants in the earliest data transmission timing first order. That is, the terminal processes the UL grants in ascending order of Ta. Detailed description is made thereof with reference to FIG. 12.

Figure 12:
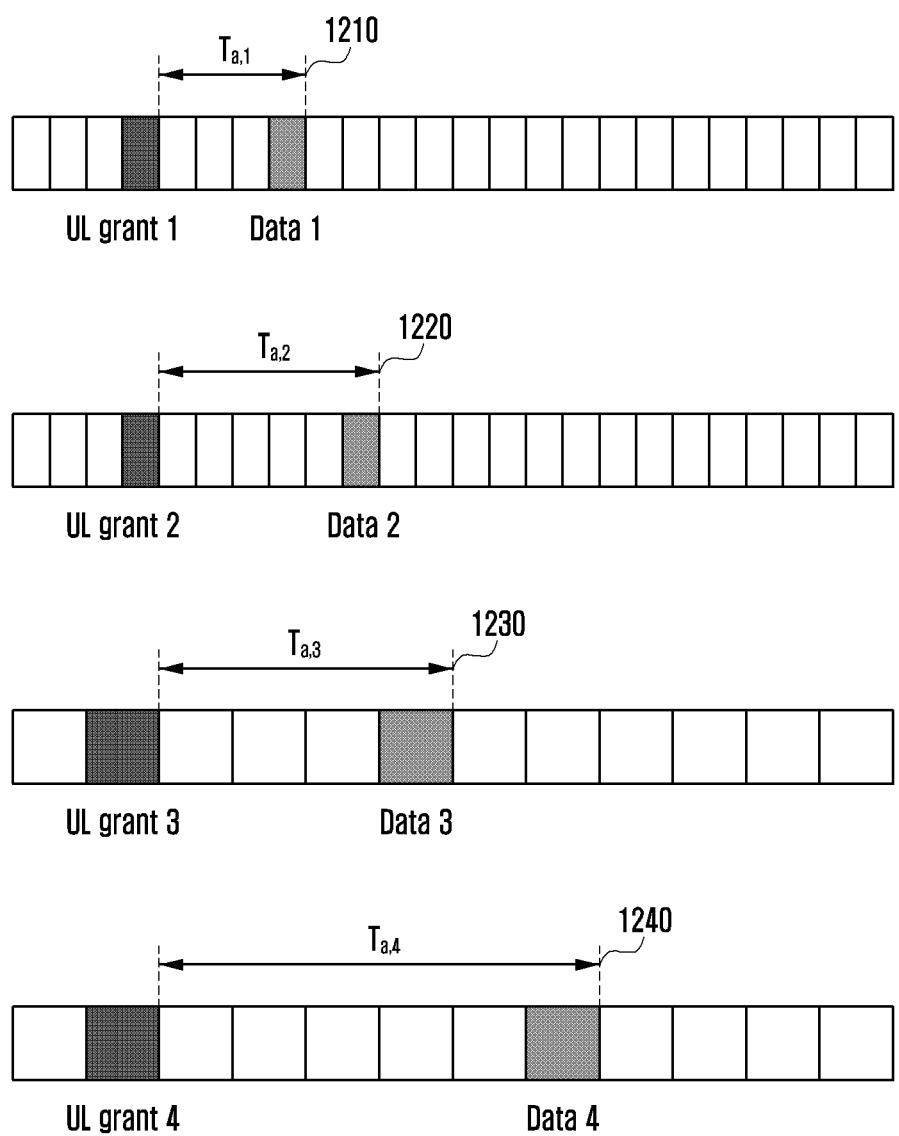
FIG. 12 is a diagram illustrating various timing relationships between a UL grant reception timing and data transmission timing according to an embodiment of the disclosure.

FIG. 12 is a diagram illustrating various timing relationships between a UL grant reception timing and data transmission timing according to an embodiment of the disclosure.

The terminal ascertains the time period from the receipt of the UL grant until the transmission of data, i.e., Ta. Here, Ta may be ascertained as follows.

Ta may be indicated in a predetermined field of DCI.

As another example, the terminal may ascertain Ta based on the profile ID included in DCI transmitted by the base station to allocate uplink resources and the mapping relationship between the profile ID and Tb that is received from the base station through RRC signaling.

As another example, the terminal may ascertain Ta based on the position of the bandwidth part to which the UL resources allocated by the base station belongs. In order to accomplish this, the base station may provide the terminal with the mapping relationship between the bandwidth part and Ta through RRC signaling. That is, the UL resources allocated within a predetermined bandwidth part may have a predetermined value of Ta. Detailed description thereof is made later.

As another example, the terminal may ascertain Ta based on time-frequency resource (or PDCCH monitoring occasion) received from the base station. In order to accomplish this, the base station may provide the terminal with the mapping relationship between the frequency-time resource of PDCCH and Ta through RRC signaling. That is, the UL resources allocated through a PDCCH received on a predetermined time-frequency resource (or PDCCH monitoring occasion) may have a predetermined Ta.

As another example, the terminal may ascertain Ta based on the type of DCI format received from the base station. In order to accomplish this, the base station may provide the terminal with the mapping relationship between the DCI format and Ta through RRC signaling. The mapping relationship between the DCI format and Ta is specified in the standard document specifying the physical layer and MAC layer operations at the base station and the terminal. That is, the UL resources allocated via a predetermined DCI format may have a predetermined Ta.

Then, the terminal processes the UL grants in shortest Ta first order.

If there are multiple UL grants having the same metric value, i.e., time period it takes from the receipt of the UL grant until the transmission data, that is derived at operation ①, the processing order among these UL grants may be determined according to another method proposed in the disclosure.

Referring to FIG. 12, the time period between the UL grant 1 reception timing and the data 1 transmission timing may be represented as $T_{a,1}$ 1210, the time period between the UL grant 2 reception timing and the data 2 transmission timing may be represented as $T_{a,2}$ 1220, the time period between the UL grant 3 reception timing and the data 3 transmission timing may be represented as $T_{a,3}$ 1230, and the time period between the UL grant 4 reception timing and the data 4 transmission timing may be represented as $T_{a,4}$ 1240.

According to an embodiment of the disclosure, the aforementioned time periods have a relationship of $T_{a,1}$ 1210<$T_{a,2}$ 1220<$T_{a,3}$ 1230<$T_{a,4}$ 1240 and, in this case, the terminal may process the UL grants in the order of UL grant 1, UL grant 2, UL grant 3, and UL grant 4.

Similarly, it may also be possible for the terminal to process multiple UL grants received from the base station in latest data-transmission-time-point first order. That is, the terminal processes the UL grants in descending order of Ta. Referring to FIG. 12, this means that the terminal processes the UL grants in sequential order of UL grant 4, UL grant 3, UL grant 2, and UL grant 1.

Another embodiment of the disclosure embodies a method for a terminal, when it receives multiple UL grants, to process the UL grants in the earliest ACK/NACK reception timing first order. That is, the terminal processes the UL grants in ascending order of Tc. Detailed description is made thereof with reference to FIG. 13.

Figure 13:
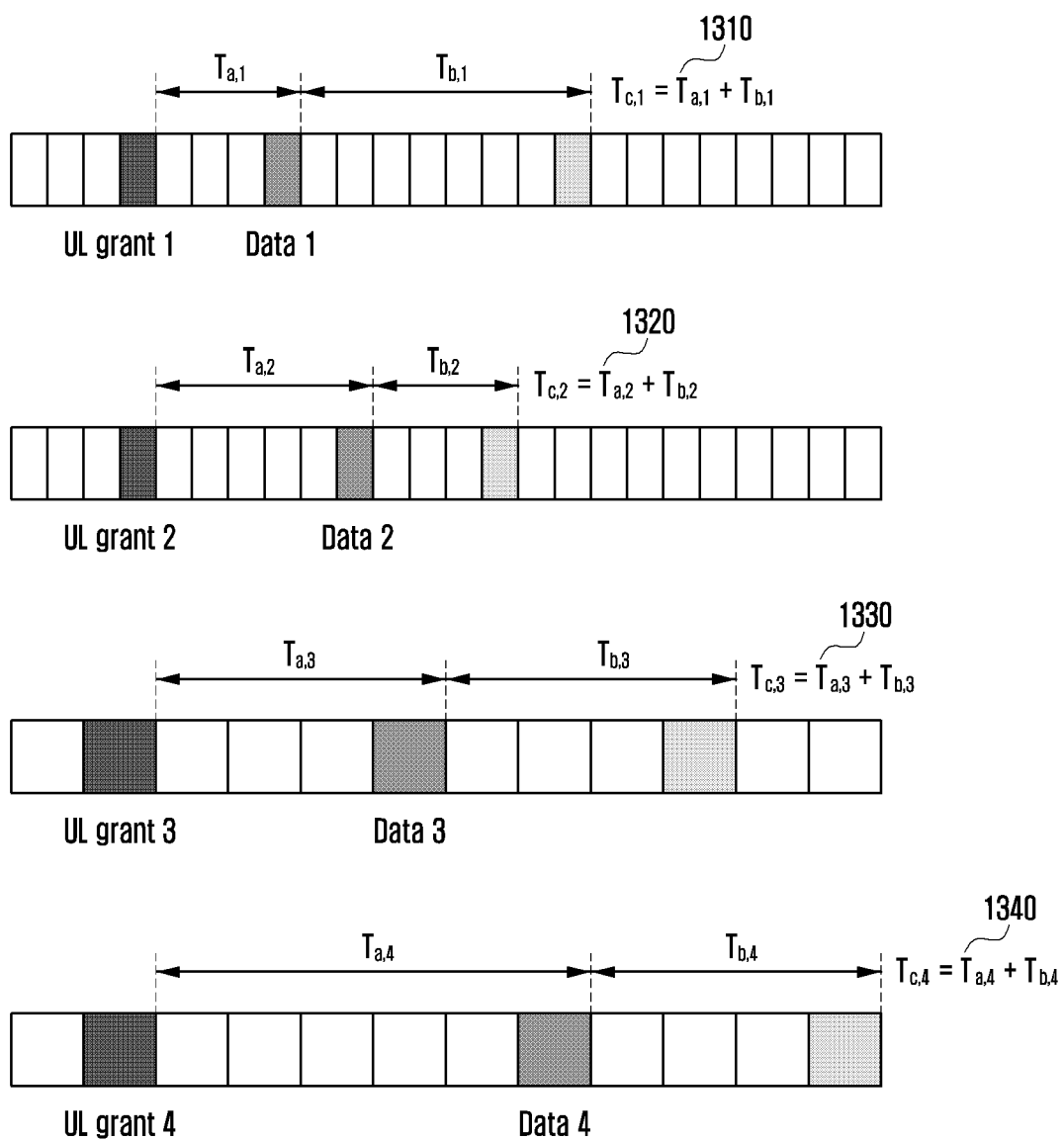
FIG. 13 is a diagram illustrating various timing relationships between a UL grant reception timing and an ACK/NACK reception timing according to an embodiment of the disclosure.

FIG. 13 is a diagram illustrating various timing relationships between a UL grant reception timing and an ACK/NACK reception timing according to an embodiment of the disclosure.

① The terminal ascertains the time period it takes from the receipt of the UL grant until the transmission of data, i.e., Ta. Here, Ta may be ascertained as follows.

Ta may be indicated in a predetermined field of DCI.

As another example, the terminal may ascertain Ta based on the mapping relationship between the profile ID and Ta that is from the base station through RRC signaling, the profile ID of UL resources allocated to the terminal being included in the DCI.

As another example, the terminal may ascertain Ta based on the position of the bandwidth part to which the UL resources allocated by the base station belongs. In order to accomplish this, the base station may provide the terminal with the mapping relationship between the bandwidth part and Ta through RRC signaling. That is, the UL resources allocated within a predetermined bandwidth part may have a predetermined value of Ta. Detailed description thereof is made later.

As another example, the terminal may ascertain Ta based on time-frequency resource (or PDCCH monitoring occasion) received from the base station. In order to accomplish this, the base station may provide the terminal with the mapping relationship between the frequency-time resource of PDCCH and TA through RRC signaling. That is, the UL resources allocated through a PDCCH received on a predetermined time-frequency resource (or PDCCH monitoring occasion) may have a predetermined Ta.

As another example, the terminal may ascertain Ta based on the type of DCI format received from the base station. In order to accomplish this, the base station may provide the terminal with the mapping relationship between the DCI format and Ta through RRC signaling. The mapping relationship between the DCI format and Ta is specified in the standard document specifying the physical layer and MAC layer operations at the base station and the terminal. That is, the UL resources allocated via a predetermined DCI format may have a predetermined Ta.

② Next, the terminal ascertains the time period it takes from the transmission of data until the receipt of ACK/NACK, i.e., Tb. Here, Tb may be ascertained as follows.

Tb may be determined when the base station allocates ACK/NACK feedback resources to the terminal.

As another example, the terminal may ascertain Tb based on the profile ID included in DCI transmitted by the base station to allocate uplink resources and the mapping relationship between the profile ID and Tb that is received from the base station through RRC signaling.

As another example, the terminal may ascertain Tb based on the position of the bandwidth part to which the UL resources allocated by the base station belongs. In order to accomplish this, the base station may provide the terminal with the mapping relationship between the bandwidth part and Tb through RRC signaling. That is, the UL resources allocated within a predetermined bandwidth part may have a predetermined value of Tb. Detailed description thereof is made later.

As another example, the terminal may ascertain Tb based on time-frequency resource (or PDCCH monitoring occasion) received from the base station. In order to accomplish this, the base station may provide the terminal with the mapping relationship between the frequency-time resource of PDCCH and Tb through RRC signaling. That is, the UL resources allocated through a PDCCH received on a predetermined time-frequency resource (or PDCCH monitoring occasion) may have a predetermined Tb.

As another example, the terminal may ascertain Tb based on the type of DCI format received from the base station. In order to accomplish this, the base station may provide the terminal with the mapping relationship between the DCI format and Tb through RRC signaling. The mapping relationship between the DCI format and Tb is specified in the standard document specifying the physical layer and MAC layer operations at the base station and the terminal. That is, the UL resources allocated via a predetermined DCI format may have a predetermined Tb.

③ Next, the terminal derives Tc by summing Ta and Tb.

Next, the terminal processes the UL grants in shortest Tc first order, i.e., in ascending order of the time period it takes from the receipt of the UL grant until the receipt of ACK/NACK.

If there are multiple UL grants having the same metric value, i.e., time period it takes from the receipt of the UL grant until the receipt of the ACK/NACK, that is at operation ④, the processing order among these UL grants may be determined according to another method proposed in the disclosure.

Referring to FIG. 13, the time period between the UL grant 1 reception timing and the ACK/NACK reception timing may be represented as $T_{c,1}$ 1310, the time period between the UL grant 2 reception timing and the ACK/NACK reception timing may be represented as $T_{c,2}$ 1320, the time period between the UL grant 3 reception timing and the ACK/NACK reception timing may be represented as $T_{c,3}$ 1330, and the time period between the UL grant 4 reception timing and the ACK/NACK reception timing may be represented as $T_{c,4}$ 1340.

According to an embodiment of the disclosure, the time periods between the UL grant reception timings and ACK/NACK reception timings have a relationship of $T_{c,1}$ 1310<$T_{c,2}$ 1320<$T_{c,3}$ 1330<$T_{c,4}$ 1340 and, in this case, the terminal may process the UL grants in the order of UL grant 1, UL grant 2, UL grant 3, and UL grant 4.

Similarly, it may also be possible for the terminal to process multiple UL grants received from the base station in descending order of the time period between the UL grant reception timing and the ACK/NACK reception timing, the ACK/NACK corresponding to the data transmitted by the terminal based on the UL grant. Referring to FIG. 13, this means that the terminal processes the UL grants in sequential order of UL grant 4, UL grant 3, UL grant 2, and UL grant 1.

Another embodiment of the disclosure embodies a method for a terminal, when it receives multiple UL grants, to process the UL grants in ascending order of the time period between the data transmission timing and the ACK/NACK reception time. That is, the terminal processes the UL grants in ascending order of Tb. Detailed description is made thereof with reference to FIG. 13.

Figure 14:
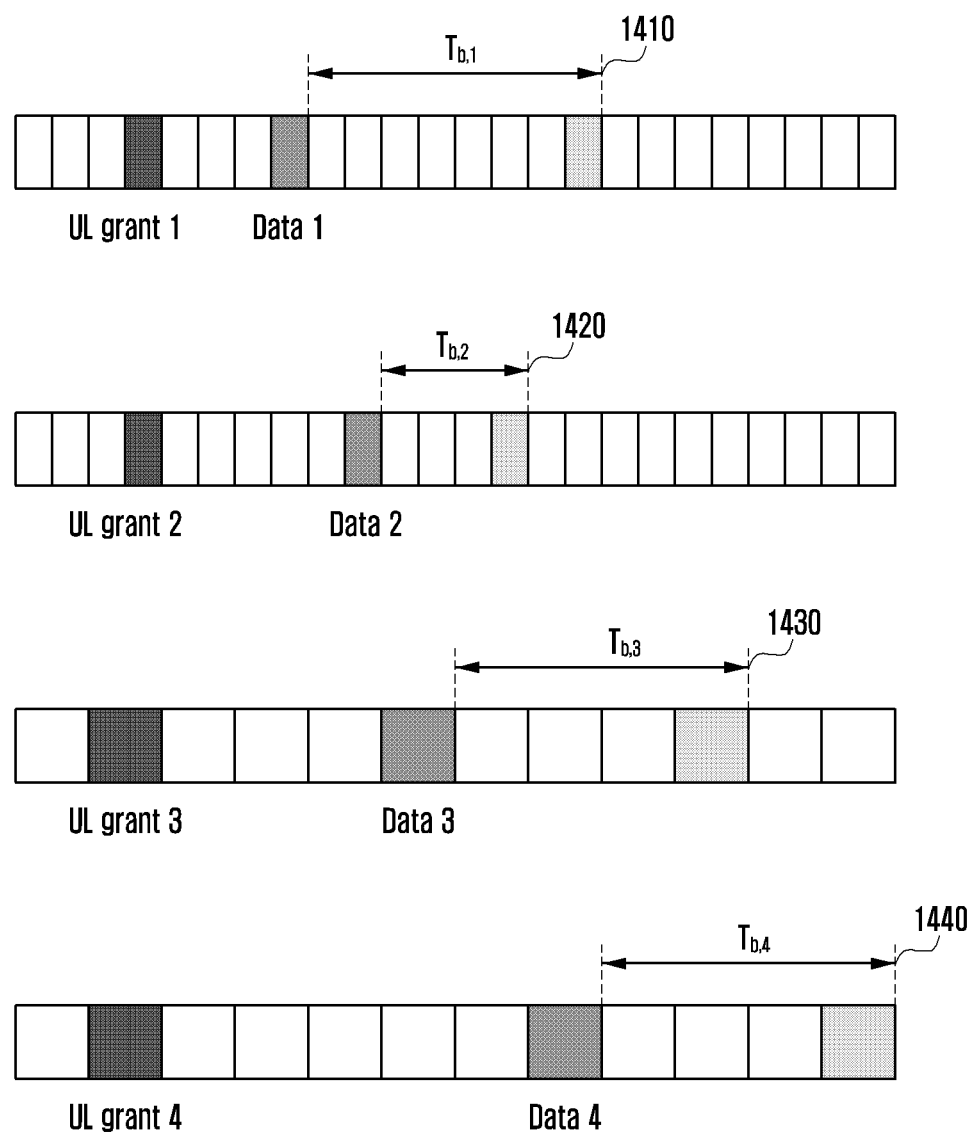
FIG. 14 is a diagram illustrating various timing relationships between data a transmission timing and an acknowledgement (ACK)/negative ACK (NACK) reception timing according to an embodiment of the disclosure.

FIG. 14 is a diagram illustrating various timing relationships between data a transmission timing and an ACK/NACK reception timing according to an embodiment of the disclosure.

The terminal ascertains the time period it takes from the transmission of the data until the reception of the ACK/NACK, i.e., Tb. How to ascertain Tb may has been described above and thus is omitted herein.

Next, the terminal processes the UL grants in ascending order of Tb ascertained at operation ①.

If there are multiple UL grants having the same metric value, i.e., time period it takes from the transmission of the data until the receipt of the ACK/NACK, that is derived by the terminal at operation ②, the processing order among these UL grants may be determined according to another method proposed in the disclosure.

Referring to FIG. 14, the time period between the data 1 transmission timing and the corresponding ACK/NACK reception timing may be represented as $T_{b,1}$ 1410, the time period between the data 2 transmission timing and the corresponding ACK/NACK reception timing may be represented as $T_{b,2}$ 1420, the time period between the data 3 transmission timing and the corresponding ACK/NACK reception timing may be represented as $T_{b,3}$ 1430, and the time period between the data 4 transmission timing and the corresponding ACK/NACK reception timing may be represented as $T_{b,4}$ 1440.

According to an embodiment of the disclosure, the time periods between the data transmission timings and the corresponding ACK/NACK reception timings have a relationship of $T_{b,1}$ (1410)<$T_{b,2}$ (1420)<$T_{b,3}$ (1430)<$T_{b,4}$ (1440) and, in this case, the terminal may process the UL grants in the order of UL grant 1, UL grant 2, UL grant 3, and UL grant 4.

On the other hands, it may also be possible for the terminal to process multiple UL grants received from the base station in descending order of the time period between the data transmission timing and the corresponding ACK/NACK reception timing. Referring to FIG. 14, this means that the terminal processes the UL grants in sequential order of UL grant 4, UL grant 3, UL grant 2, and UL grant 1. Referring to FIG. 14, this means that the terminal processes the UL grants in sequential order of UL grant 4, UL grant 3, UL grant 2, and UL grant 1.

By determining to process the UL grants in shortest Ta first, shortest Tb, and shortest Tc first orders as described above, the terminal is capable of processing the UL grants in shortest HARQ timeline first order. In this manner, it is possible to prevent the terminal from underusing the resources indicated by the UL grant with a short HARQ timeline in comparison with the resources indicated by the UL grant with a long HARQ timeline.

Embodiment 4-3

In the NR system, a base station may transmit multiple UL grants to allocate resources with different TTI lengths.

Figure 15:
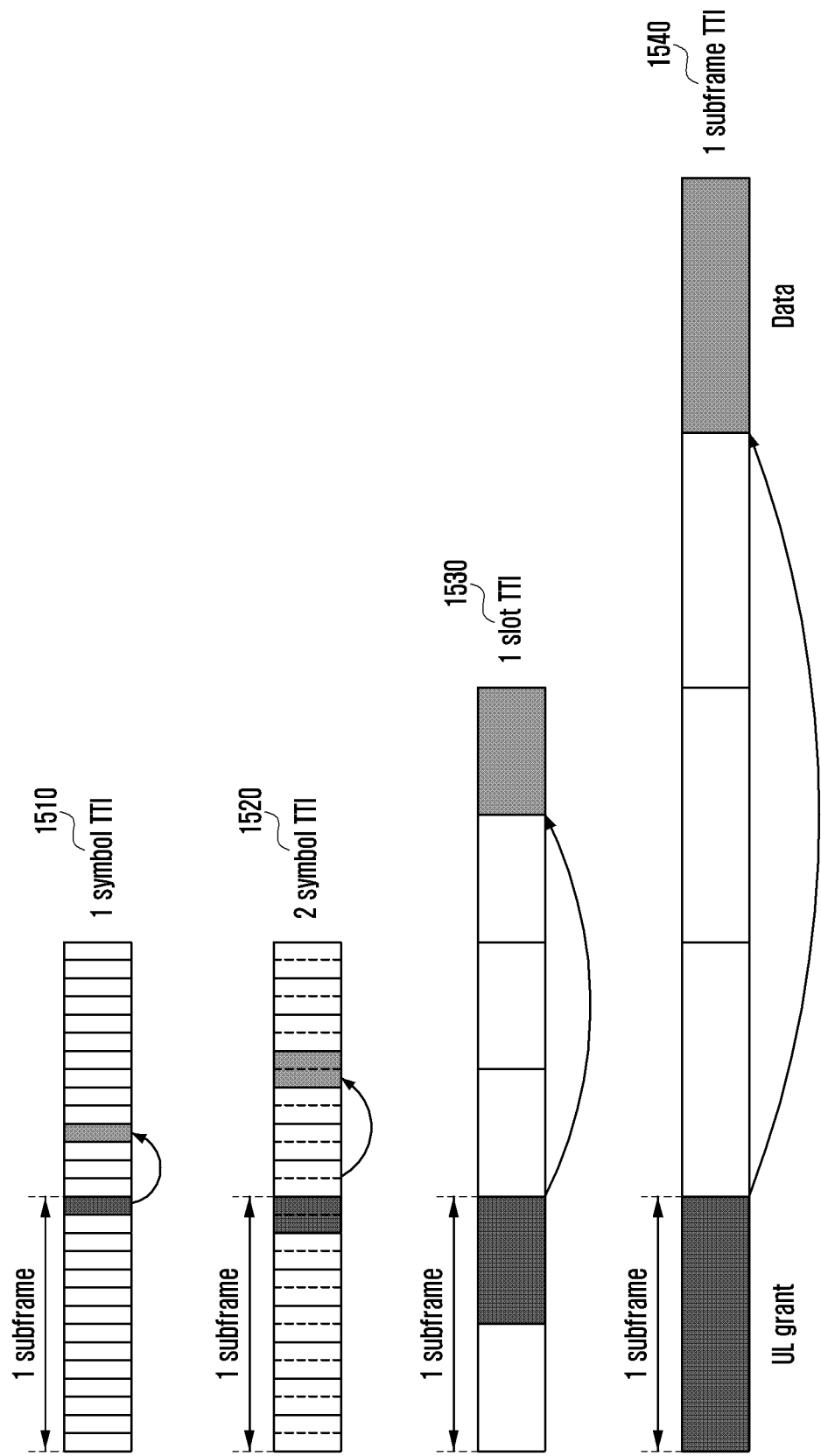
FIG. 15 is a diagram illustrating resources allocated via multiple UL grants with different time interval transmission (TTI) lengths and corresponding UL data transmission timings according to an embodiment of the disclosure.

FIG. 15 is a diagram illustrating resources allocated via multiple UL grants with different TTI lengths and corresponding UL data transmission timings according to an embodiment of the disclosure.

In the embodiment of FIG. 15, the base station allocates UL resources with a 1-symbol TTI length 1510, a 2-symbol TTI length 1520, a 1-slot TTI length 1530, and a 1-subframe TTI length 1540 to the terminal.

Here, the DCI including UL resource allocation information may be transmitted to the terminal by the TTI length of the allocated resources (e.g., symbol, slot, and subframe) or by the TTI length different from that of the allocated resources. It may also be possible that multiple DCIs for allocating multiple UL resources with different TTI lengths are transmitted to the terminal through one PDCCH. Detailed description is made thereof with reference to FIGS. 16 and 17.

Figure 16:
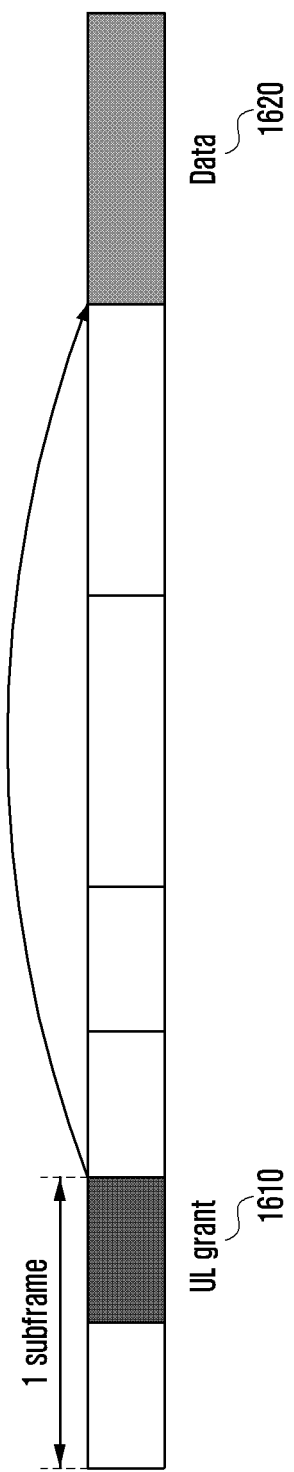
FIG. 16 is a diagram illustrating a resource configuration for transmitting a UL grant, by a TTI length, to allocate UL resources with another TTI length according to an embodiment of the disclosure.

FIG. 16 is a diagram illustrating a resource configuration for transmitting a UL grant, by a TTI length, to allocate UL resources with another TTI length according to an embodiment of the disclosure.

Referring to FIG. 16, the terminal may receive the UL grant transmitted by the 1-slot TTI length as denoted by reference number 1610, and the resources indicated by the UL grant has the 1-subframe TTI length as denoted by reference number 1620. In this manner, the DCI including UL resource allocation information may be transmitted to the terminal by a TTI length different from the TTI length of the resources allocated to the terminal.

Figure 17:
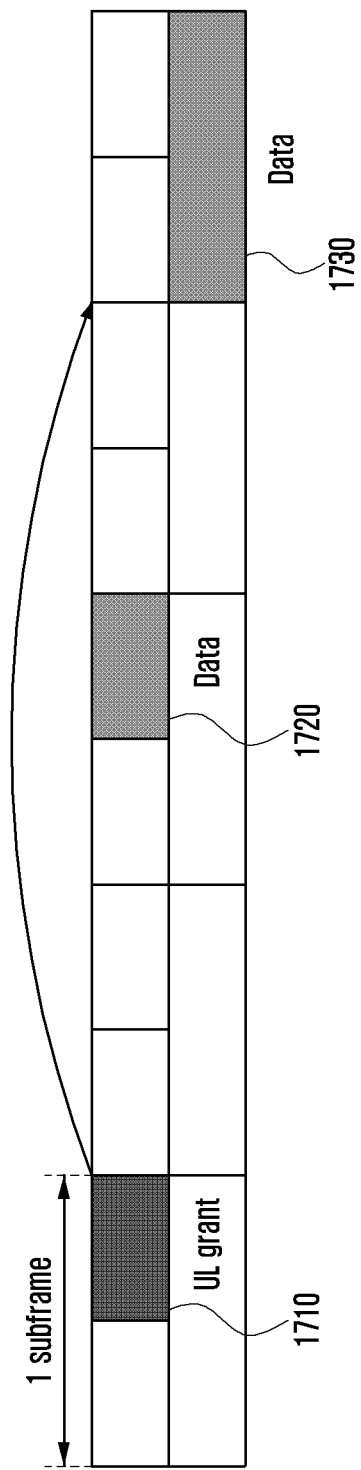
FIG. 17 is a diagram illustrating a resource configuration for allocating UL resources with different TTI lengths through a physical downlink control channel (PDCCH) being transmitted by one TTI length according to an embodiment of the disclosure.

FIG. 17 is a diagram illustrating a resource configuration for allocating UL resources with different TTI lengths through a PDCCH being transmitted by one TTI length according to an embodiment of the disclosure.

Referring to FIG. 17, the terminal may receive a UL grant by the 1-slot TTI length as denoted by reference number 1710, and the UL grant be transmitted to allocate multiple UL resources with different TTI lengths. As shown in the drawing, the UL grant allocates the UL resources with the 1-slot TTI length as denoted by reference number 1720 and the UL resources with the 1-subframe TTI length as denoted by reference number 1730. The principles described with FIGS. 15 to 17 may be applied to all embodiments of the disclosure.

The disclosure proposes a method for a terminal to process, when it receives multiple UL grants from a base station, the UL grants in ascending order of the TTI length of the resources indicated by the UL grants. Detailed description is made thereof hereinafter.

① Upon receipt of a UL grant, the terminal ascertains the TTI length of the resources indicated by the UL grant. Here, the TTI length may be ascertained as follows.

The base station may notify the UE of the TTI length of the UL resources via DCI.

The DCI includes a profile ID of the UL resources that the base station allocates to the terminal, and the base station notify the terminal with the mapping relationship between profile IDs and TTI lengths. Accordingly, when the terminal receives a UL grant, it can ascertain the TTI length of the UL resources based on the profile ID ascertained from the DCI and the mapping relationship between the profile IDs and TTI lengths.

The base station provides the terminal with the mapping relationship between DCI formats and TTI lengths through RRC signaling. In this case, when the terminal receives a UL grant, it may check the DCI format and the TTI and ascertain the TTI length of the UL resources based on the mapping relationship between the DCI formats and TTI lengths.

The base station provides the terminal with the mapping relationship between bandwidths parts to which UL resources belong and TTI lengths. In this case, when the terminal receives a UL grant, it may check the bandwidth part to which the UL resources indicated by the UL grant and ascertain the TTI length of the UL resources based on the mapping relationship between the bandwidth parts and the TTI lengths. The mapping relationship between the bandwidth parts and the TTI lengths is described with reference to FIGS. 18A and 18B.

The base station provides the terminal with the mapping relationship between PDCCH monitoring occasions and TTI lengths through RRC signaling. This is the case under the assumption that the UL resources configured with only one TTI length is allocated at one PDCCH monitoring occasion. In this case, when the terminal receives a UL grant, it may check the PDCCH monitoring occasion and ascertain the TTI length of the UL resources based on the mapping relationship between the PDCCH monitoring occasions and TTI lengths. Detailed description is made thereof with reference to FIGS. 19A to 19C.

The base station provides the terminal with the mapping relationship between PDCCH monitoring periodicity of the terminal and TTI lengths through RRC signaling. This is the case under the assumption that the base station allocates UL resources configured with only one TTI length through a PDCCH being transmitted at a predetermined periodicity. In this case, when the terminal receives a UL grant, it may check the PDCCH monitoring periodicity and ascertain the TTI length of the UL resources based on the mapping relationship between the PDCCH monitoring periodicities and TTI lengths.

The base station provides the terminal with the mapping relationship between transmission durations and TTI lengths through RRC signaling. This may be exemplified as follows. Here, the transmission duration means a period during which the terminal continues transmitting radio signals and is different in concept from the TTI length. In this embodiment, however, it is assumed that the transmission duration is proportional to the TTI length. This is because there is no need to allocate resources with a short TTI length for transmission during a long period and, likewise, no need to allocate resources with a long TTI length transmission a short period. The base station may notify the terminal of the transmission duration via DCI. In this case, when the terminal receives a UL grant, it may check the transmission duration and ascertain the TTI length of the UL resources based on the mapping relationship between the transmission durations and TTI lengths. The mapping relationship between the transmission durations and TTI lengths may be exemplified as shown in Table 9.

TABLE 9

| | |
|---|---|
| Ti <= transmission duration < Ti + 1 | Assume equal to $i^{th}$ TTI length |
| Ti + 1 <= transmission duration < Ti + 2 | Assume equal to $(i + 1)^{th}$ TTI length |
| Ti + 2 <= transmission duration < Ti + 3 | Assume equal to $(i + 2)^{th}$ TTI length |
| . . . | . . . |

The base statin provides the terminal with the mapping relationship between PDCCH monitoring time or frequency resources and TTI lengths. This is the case under the assumption that the base station allocates the UL resources only with one TTI length on one PDCCH monitoring time or frequency resource. In this case, when the terminal receives a UL grant, it may check the PDCCH monitoring time or frequency resource and ascertain the TTI length based on the mapping relationship between the PDCCH monitoring time and frequency resources and TTI lengths. Detailed description is made thereof with reference to FIGS. 20 and 21.

② The terminal processes the UL grants in ascending order of the TTI lengths of the UL resources that have been ascertained at operation ①.

If there are multiple UL grants having the same metric value, i.e., TTI length of the allocated UL resources, that is derived by the terminal at operation ①, the processing order among these UL grants may be determined according to another method proposed in the disclosure.

In the same principle, when the terminal receives multiple UL grants from the base station, it may process the UL grants in descending order of TTI lengths of the resources indicated by the UL grants.

A description is made of the method for ascertain the TTI length hereinafter.

Figure 18A:
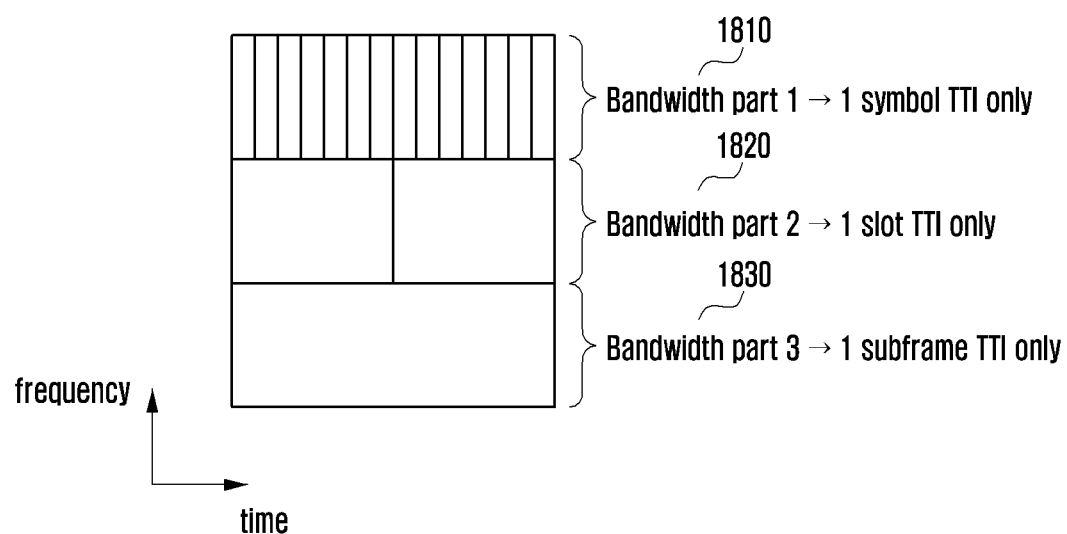
FIGS. 18A and 18B are diagrams illustrating resource configurations in a component carrier composed of multiple bandwidth parts for use with different TTI lengths according to an embodiment of the disclosure.
Figure 18B:
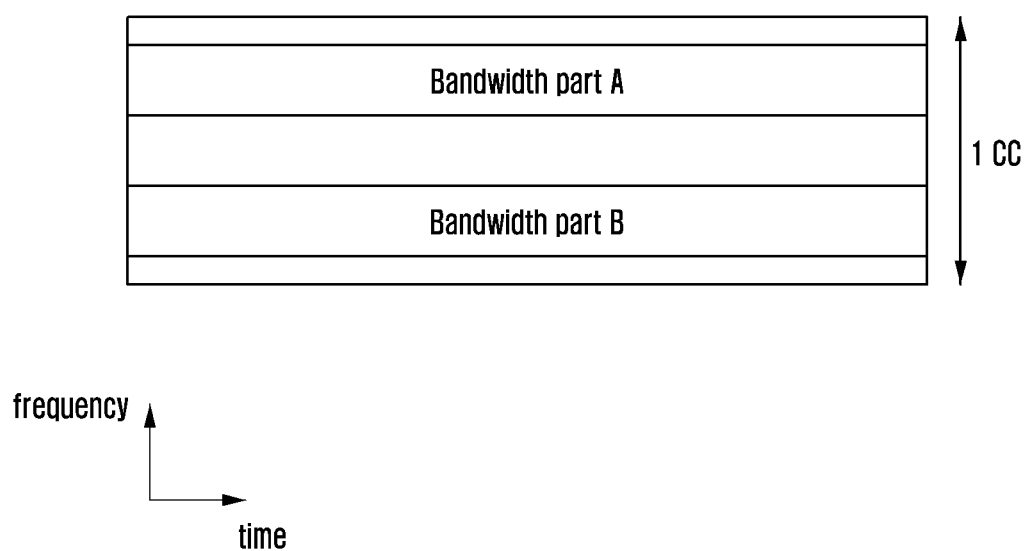

FIGS. 18A and 18B are diagrams illustrating resource configurations in a component carrier composed of multiple bandwidth parts for use with different TTI lengths according to an embodiment of the disclosure.

A base station may divide a bandwidth of UL resources into a predetermined number of bandwidth parts and configures the mapping relationship between the bandwidth parts and TTI lengths. Referring to FIG. 18A, bandwidth part 1 1810 is mapped to the 1-symbol TTI length, bandwidth part 2 1820 is mapped to 1-slot TTI length, and bandwidth part 3 1830 is mapped to 1-subframe TTI length. However, the disclosure is not limited to this embodiment but may include other embodiments embodied with a different number of bandwidth parts, e.g., 2 bandwidth parts as shown FIG. 18B or different mappings between the bandwidth parts and the TTI lengths. In this case, the terminal may check the bandwidth part to which the allocated UL resources belong and ascertain the TTI length corresponding to the bandwidth part.

However, the disclosure is not limited to this embodiment. As described above, the terminal may determine the lengths of Ta, Tb, and Tc according to the bandwidth part as described above. For example, the length of Ta may be mapped to the respective bandwidth parts, and the terminal may determine the Ta corresponding to the bandwidth part to which the allocated UL resources belong. This method may also be applied to determined Tb and Tc.

The terminal may determine a subcarrier spacing (SCS) according to the bandwidth part as to be described later.

Figure 19A:
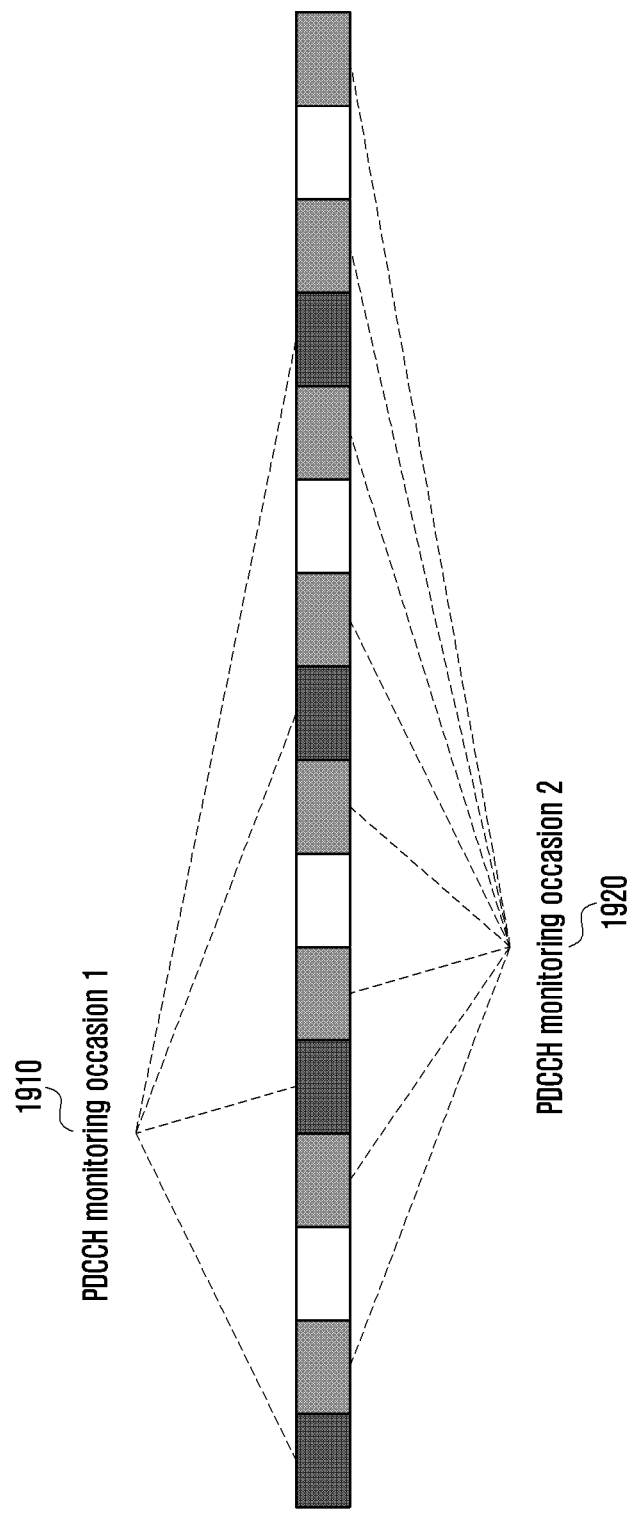
FIGS. 19A, 19B, and 19C are diagrams illustrating resource configurations for allocating UL resources with different TTI lengths at different PDCCH monitoring occasions according to various embodiments of the disclosure.
Figure 19B:
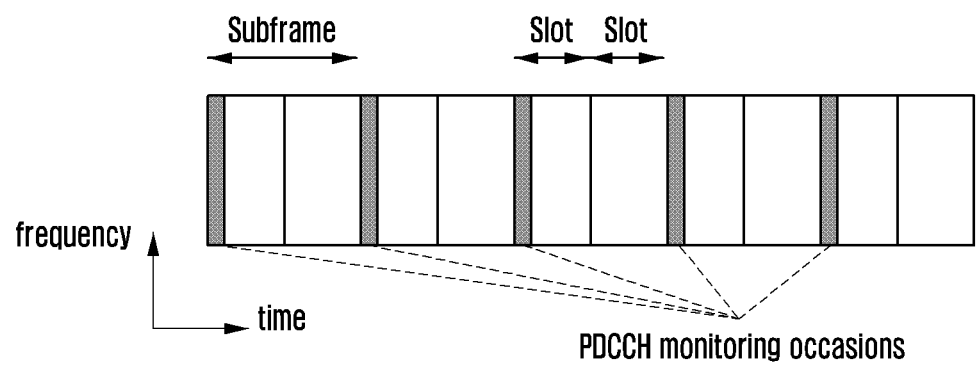
Figure 19C:
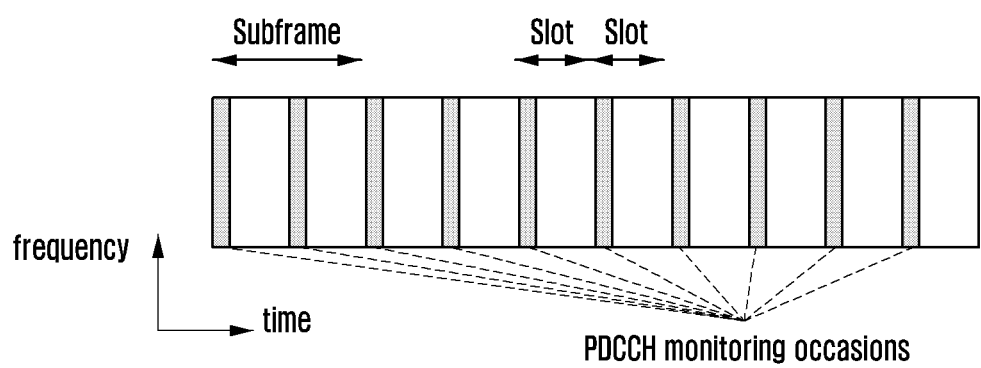

FIGS. 19A, 19B, and 19C are diagrams illustrating resource configurations for allocating UL resources with different TTI lengths at different PDCCH monitoring occasions according to various embodiments of the disclosure.

The base station categorizes the PDCCH monitoring occasions and maps the categorized monitoring occasions to different TTI lengths. Referring to FIG. 19A, the base station categorizes PDCCH monitoring occasions into PDCCH monitoring occasion 1 1910 and PDCCH monitoring occasion 2 1920. For example, the PDCCH monitoring occasion 1 1910 is mapped to the 1-subframe TTI length, and the PDCCH monitoring occasion 2 1920 is mapped to 1-slot TTI length. In this case, the UL resources allocated with the PDCCH monitoring occasion 1 1910 may have the TTI length of 1 subframe, and the UL resources allocated with the PDCCH monitoring occasion 2 1920 may have the TTI length of 1 slot. Likewise, it may be possible to determine multiple PDCCH monitoring occasions and map the monitoring occasions to different TTIs as shown in FIGS. 19B and 19C.

However, the disclosure is not limited to this embodiment but encompasses other embodiments embodied with different numbers of PDCCH monitoring occasions configured by a base station and TTI lengths mapped to the different PDCCH monitoring occasions in different manners.

In this case, the terminal may determine the TTI length of the UL resources based on the PDCCH monitoring occasions of the UL resources.

However, the disclosure is not limited to the above embodiments. As described above, it may be possible for the terminal to determine the length of Ta, Tb, or Tc according to the PDCCH monitoring occasion. For example, the terminal may determine the length of Ta according to the PDCCH monitoring occasion of the UL resources based on the mapping between the PDCCH monitoring occasions and different lengths of Ta. This method may also be applied for determining the length of Tb or Tc.

The terminal may also determine the SCS according to the PDCCH monitoring occasion as to be described later.

Figure 20:
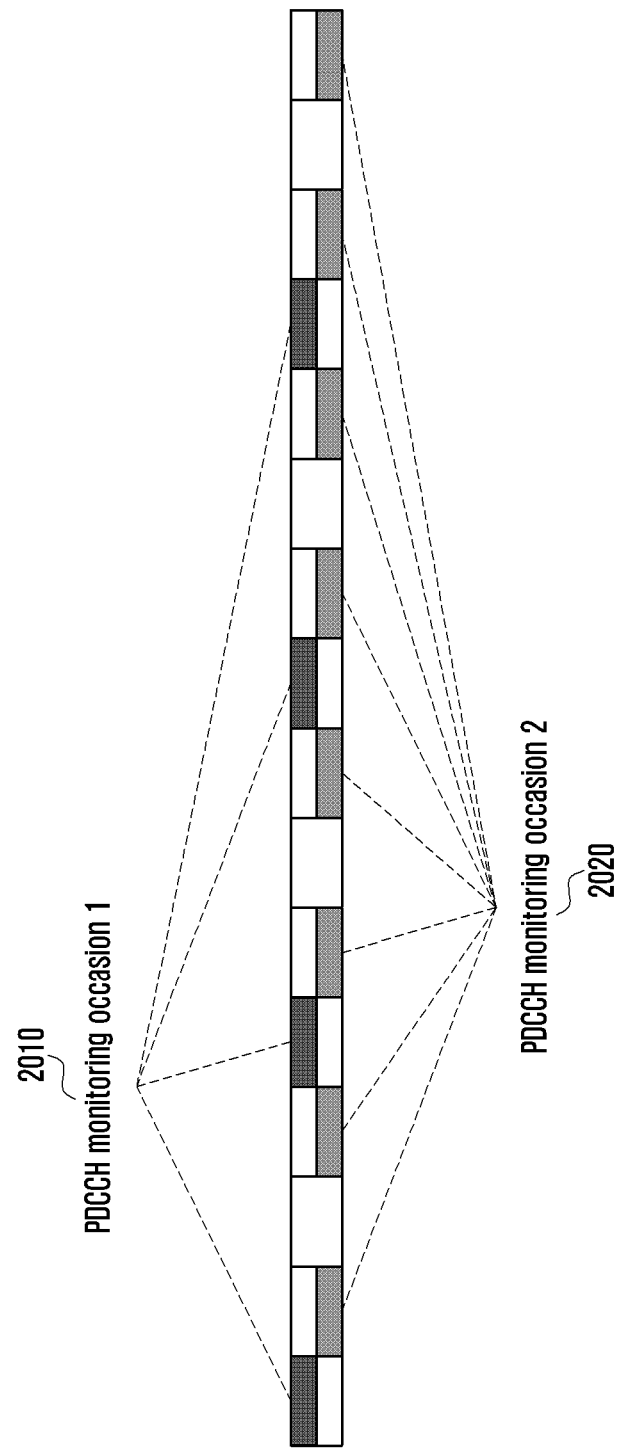
FIG. 20 is a diagram illustrating a resource configuration for allocating UL resources with different TTI lengths according to PDCCH monitoring time and frequency resources according to an embodiment of the disclosure.

FIG. 20 is a diagram illustrating a resource configuration for allocating UL resources with different TTI lengths according to PDCCH monitoring time and frequency resources according to an embodiment of the disclosure.

The base station may categorize PDCCH monitoring occasions as time and frequency resources and determine a mapping relationship between the time and frequency resources of the PDCCH monitoring occasions and TTI length.

Referring to FIG. 20, the base station may categorize the PDCCH monitoring occasions into PDCCH monitoring occasion 1 2010 and PDCCH monitoring 2 2020 according to their time and frequency resources. In this case, the time and frequency resources of the PDCCH monitoring occasion 1 2010 and the time and frequency resources of the PDCCH monitoring occasion 2 2020 are configured so as not to be overlapped.

For example, the PDCCH monitoring occasion 1 2010 may be mapped to the 1-subframe TTI length, and the PDCCH monitoring occasion 2 202 may be mapped to the 1-slot TTI length. In this case, the UL resources allocated with the PDCCH monitoring occasion 1 2010 may have the TTI length of 1 subframe, and the UL resources allocated with the PDCCH monitoring occasion 2 2020 may have the TTI length of 1 slot.

However, the disclosure is not limited to this embodiment but may encompass other embodiments embodied with different numbers of PDCCH monitoring occasions configured by a base station and TTI lengths mapped to the different PDCCH monitoring occasions.

In this case, the terminal may determine the TTI length of the UL resource according to the time and frequency resources of the PDCCH monitoring occasion at which the UL resources are allocated.

However, the disclosure is not limited to this embodiment. As described above, the terminal may determine the lengths of Ta, Tb, or Tc according to the time and frequency resources of the PDCCH monitoring occasion. For example, the length of Ta may be mapped to the time and frequency resources of each PDCCH monitoring occasion, and the terminal may determine the Ta according to the PDCCH monitoring occasion allocated UL resources. This method may also be applied for determining the lengths of the Tb or Tc.

The terminal may also determine the SCS according to the time and frequency resources of the PDCCH monitoring occasion as to be described later.

Figure 21A:
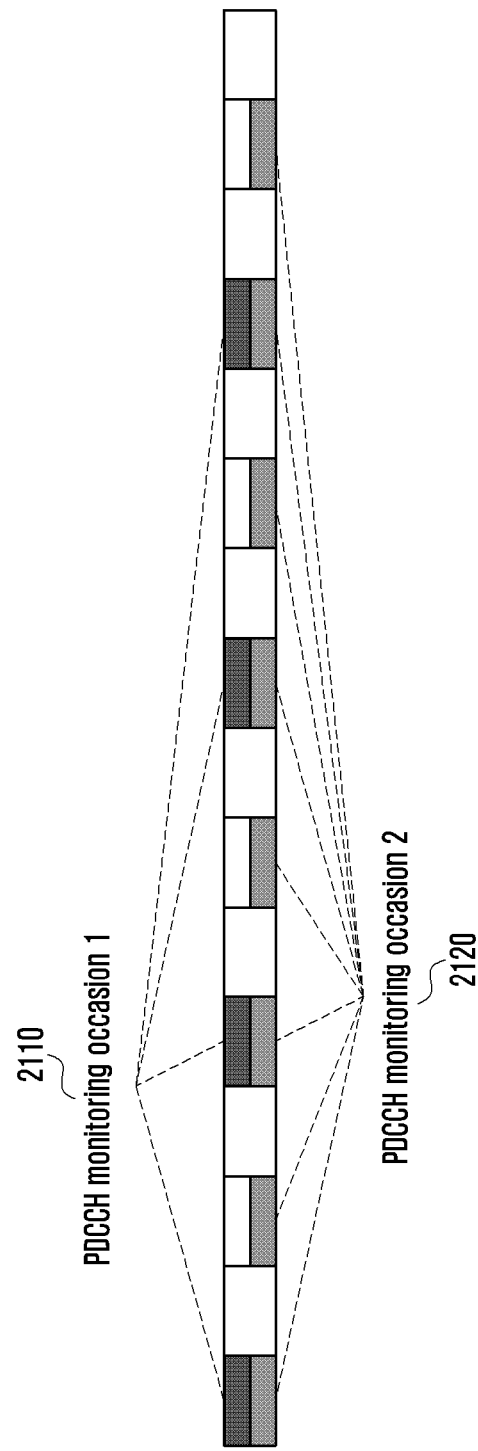
FIGS. 21A and 21B are diagrams illustrating resource configurations for allocating UL resources with different TTI lengths at different PDCCH monitoring occasions according to an embodiment of the disclosure.
Figure 21B:
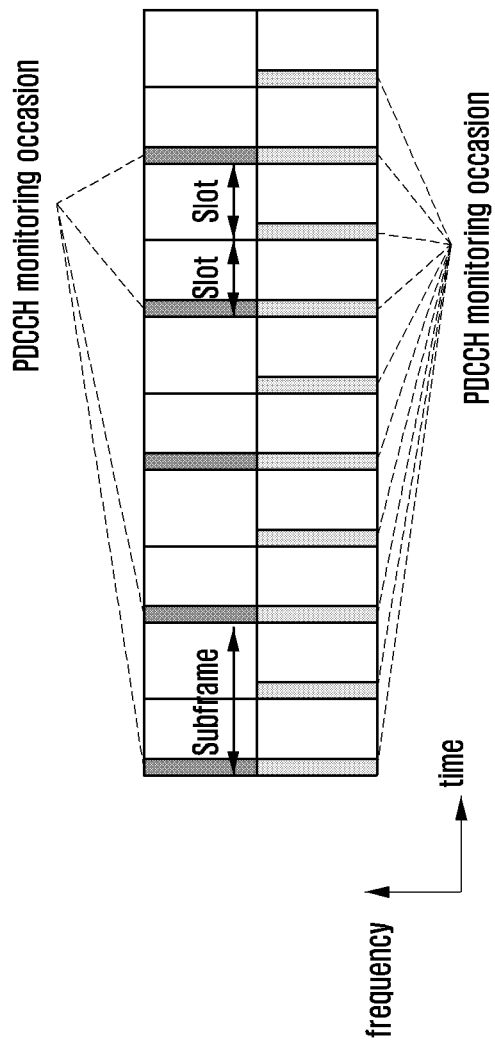

FIGS. 21A and 21B are diagrams illustrating resource configurations for allocating UL resources with different TTI lengths at different PDCCH monitoring occasions according to an embodiment of the disclosure.

Similar to the embodiment of FIG. 20, the base station may categorize the PDCCH monitoring occasions according to their time and frequency resources and maps the time frequency resources of the PDCCH monitoring occasions to different TTI lengths.

Referring to FIG. 21A, the base station may categorize PDCCH monitoring occasions into PDCCH monitoring occasion 1 2110 and PDCCH monitoring occasion 2 2120. The frequency resources with the PDCCH monitoring occasion 1 2110 and the frequency resources with the PDCCH monitoring occasion 2 2120 may be configured to be non-overlapped with each other in the frequency domain but alternately overlapped with each other in the time domain.

For example, the PDCCH monitoring occasion 1 2110 may be mapped to the TTI length of 1 subframe, and the PDCCH monitoring occasion 2 2120 may be mapped to the TTI length of 1 slot. In this case, the UL resources allocated at PDCCH monitoring occasion 1 2110 may have the TTI length of 1 subframe, and the UL resources allocated at PDCCH monitoring occasion 2 2120 may have the TTI length of 1 slot. The above described principle may be applied to FIG. 21B.

However, the disclosure is not limited to this embodiment but encompasses other embodiments embodied with different numbers of PDCCH monitoring occasions configured by a base station and TTI lengths mapped to the different PDCCH monitoring occasions in different manners.

For example, the base station may use a PDCCH monitoring occasion-TTI length mapping scheme and, in this case, the terminal may determine the TTI length of the UL resources based on the periodicity of the PDCCH monitoring occasion of the allocated UL resources.

In this case, the terminal may determine the TTI length of the UL resources according to the time and frequency resources of the PDCCH monitoring occasions of the UL resources.

However, the disclosure is not limited to the above embodiments. As described above, it may be possible for the terminal to determine the lengths of Ta, Tb, or Tc according to the time and frequency resources of the PDCCH monitoring occasions or the periodicity of the PDCCH monitoring occasions. For example, it may be possible to map the lengths of Ta to the time and frequency resources of the PDCCH monitoring occasions or the periodicities of the PDCCH monitoring occasions and, in this case, the terminal may determine the Ta according to the PDCCH monitoring occasions. This method may also be applied for determining the length of Tb or Tc.

The terminal may also determine the SCS according to the time and frequency resources of the PDCCH monitoring occasion or the periodicity of the PDCCH monitoring occasions as to be described later.

Embodiment 4-4

Radio resources are expressed in the form a combination of time-domain resources and frequency-domain resources.

Here, the time domain resources may be allocated by unit size of a multiple of a symbol length, and the time domain resources may be allocated by unit size of a multiple of a subcarrier spacing. Accordingly, it is possible to increase the radio resource allocation amount by increasing the frequency domain resource allocation amount although a small amount of time domain resources is allocated. Likewise, it is possible to increase the radio resource allocation amount by increasing the time domain resource allocation amount although a small amount of frequency domain resources is allocated.

It is assumed that a terminal receives multiple UL grants. If the terminal processes the UL grants in descending order of radio resource amounts indicated by the UL grants, it may transmit to the base station the traffic present in its buffer on the UL resources indicated by as small number of UL grants as possible. In this case, the terminal is capable of reducing UL grant processing overhead.

Whereas, if the terminal processes the UL grants in ascending order of radio resource amounts indicated by the UL grants, it may transmit to the base station on the UL resources indicated by as large number of UL grants as possible. In this case, the UL grant processing overhead of the terminal increases.

The disclosure proposes a method for a terminal to process, when it receives multiple UL grants from a base station, the UL grants in descending order of the allocated radio resource amounts indicated by the UL grants. Detailed description thereof is made hereinafter.

The terminal ascertains allocated radio resource amounts indicated by the received UL grants.

Here, the allocated radio resource amount may be expressed by a number of resource blocks (RBs), a number or resource elements (REs), or a number of another basic resource allocation units.

The allocated radio resource amount may also be expressed by a number of bits available for the terminal to transmit data on the corresponding resources.

The terminal processes the UL grants in the descending order of the radio resource amounts ascertained at operation ①.

If there are multiple UL grants having the same metric value, i.e., same resource amount allocated by the base station, the processing order among these UL grants may be determined according to another method proposed in the disclosure.

In the same principle, when the terminal receives multiple grants from the terminal, it may process the UL grants in ascending order of the allocated radio resource amounts indicated by the UL grants.

Embodiment 4-5

The disclosure proposes a method for a terminal to process, when it receives multiple UL grants from a base station, the UL grants in a random order. Detailed description thereof is made hereinafter.

If the terminal receives multiple UL grants, it ascertains a number of the UL grants received (or to be processed). Assuming that the number of received UL grants is N, the terminal assigns an index selected in a range from 1 to N to each UL grant. In this process, different UL grants are not assigned the same index.

The terminal processes the UL grants in ascending (or descending) order of the indices assigned to the respective UL grants.

Embodiment 4-6

The NR system supports multiple SCSs. For example, the UL resources allocated to the terminal may be configured in order for the terminal to transmit a signal with one of SCSs of 15 kHz, 30 kHz, 60 kHz, and 120 kHz. The disclosure proposes a method for a terminal to process, when it receives multiple UL grants, the UL grants in an order configured by the terminal on the basis of SCS. Detailed description thereof is made hereinafter.

If the terminal receives multiple UL grants, it ascertains the SCSs for use in the UL resources indicated by the UL grants.

The base station may notify the terminal of the SCSs for use in UL resources using DCI.

The DCI includes profile IDs of the UL resources allocated to the terminal, and the base station provides the terminal with the mapping relationship between profile IDs and SCSs. In this case, when the terminal receives a UL grant, it can ascertain the SCS of the UL resources based on the mapping relationship between the profile IDs and SCSs.

The base station provides the terminal with the mapping relationship between DCI formats and SCSs through RRC signaling. In this case, when the terminal receives a UL grant, it may check the DCI format and look up the mapping relationship between the DCI formats and TTI lengths to ascertain the SCS of the UL resources.

The base station provides the terminal with the mapping relationship between bandwidths parts to which UL resources belong and SCSs. In this case, the terminal may check the bandwidth part of the allocated UL resources and look up the mapping relationship between bandwidths parts to which UL resources belong and SCSs to ascertain the SCS of the UL resources. The method of exploiting the bandwidth part to ascertain the SCS of the UL resources is similar to the methods described with reference to FIGS. 18A and 18B.

The base station provides the terminal with the mapping relationship between PDCCH monitoring occasions and SCSs through RRC signaling. This is the case under the assumption that the UL resources configured with only one SCS is allocated at one PDCCH monitoring occasion. In this case, when the terminal receives a UL grant, it may check the PDCCH monitoring occasion and look up the mapping relationship between the PDCCH monitoring occasions and SCSs to ascertain the SCS of the UL resources.

The base station provides the terminal with the mapping relationship between PDCCH monitoring cycle of the terminal and SCSs through RRC signaling. This is the case under the assumption that the base station allocates UL resources configured with only one SCS through a PDCCH being transmitted at a predetermined cycle. In this case, when the terminal receives a UL grant, it may check the PDCCH monitoring cycle and look up the mapping relationship between the PDCCH monitoring cycles and TTI lengths to ascertain the SCS of the UL resources.

The base station provides the terminal with the mapping relationship between PDCCH monitoring time or frequency resources and SCSs. This is the case under the assumption that the base station allocates UL resources configured with only one SCS in one PDCCH monitoring time or frequency resource. In this case, when the terminal receives a UL grant, it may check the PDCCH monitoring time or frequency resource and looks up the mapping relationship between PDCCH monitoring time or frequency resources and SCSs to ascertain the SCS of the UL resources.

The methods of exploiting the PDCCH monitoring occasion or monitoring occasion time or frequency resource to ascertain the SCS of the UL resources are similar to the methods described with reference to FIGS. 19A to 21.

The terminal processes the UL grants in ascending order of the SCSs of the UL resources that have been ascertained. As another example, the terminal may process the UL grants in descending order of the SCSs of the UL resources. As another example, the terminal may process the UL grants in an order of SCSs that is notified by the base station through RRC signaling.

If there are multiple UL grants having the same metric value, i.e., SCS of the allocated UL resources, that is derived by the terminal at operation ①, the processing order among these UL grants may be determined according to another method proposed in the disclosure.

Embodiment 4-7

In the NR system, a base station may transmit resource configuration information for use by a terminal in monitoring one or more time and frequency resources for PDCCH as a control channel conveying UL resource allocation information. Detailed description thereof is made with reference to FIG. 22.

Figure 22:
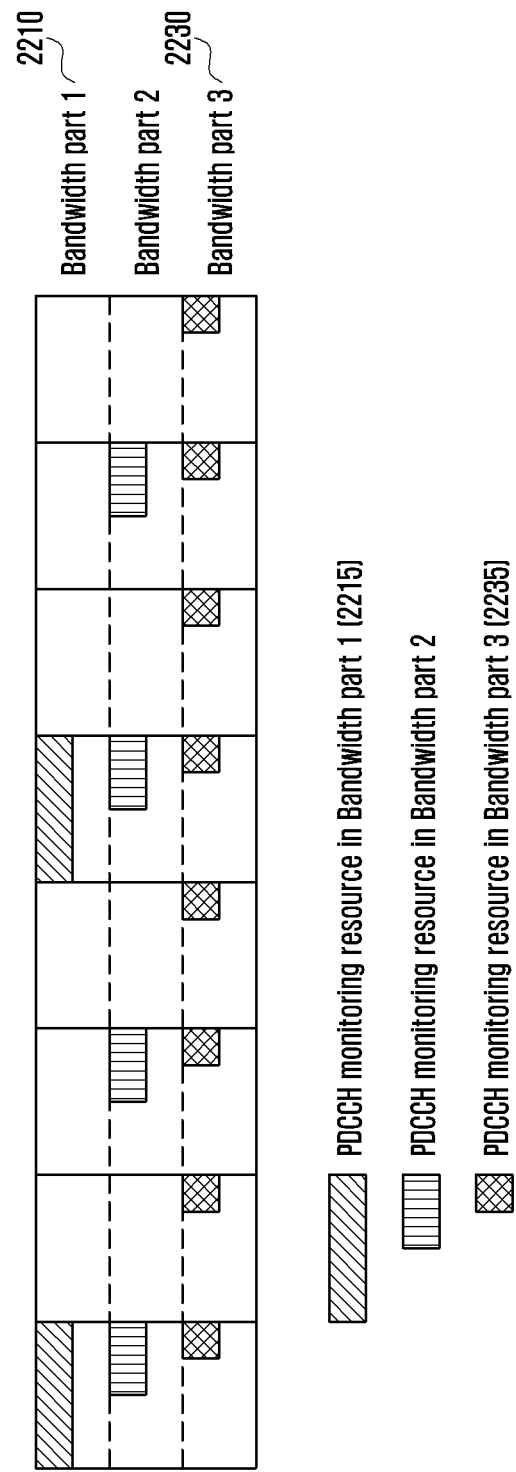
FIG. 22 is a diagram illustrating a configuration of resources composed of multiple bandwidth parts with different PDCCH monitoring time and frequency resources according to an embodiment of the disclosure.

FIG. 22 is a diagram illustrating a configuration of resources composed of multiple bandwidth parts with different PDCCH monitoring resources according to an embodiment of the disclosure.

Referring to FIG. 22, if multiple PDCCH monitoring resources are configured periodically for the terminal, it may occur that the terminal has to monitor multiple PDCCHs at a certain time point. In detail, the base station may divide the system bandwidth into multiple bandwidth parts, which are configured with PDCCH monitoring occasions with different cycles. In this case, if one or more PDCCHs convey resource allocation information for the corresponding terminal, the terminal has to determine a processing order of UL grants in the PDCCHs.

The disclosure proposes a method for the terminal to process, when it receives multiple UL grants, the UL grants according to periodicity of the PDCCH monitoring time and frequency resources. Detailed description thereof is made hereinafter.

If the terminal receives multiple UL grants, the terminal identifies a periodicity of the PDCCH monitoring time and frequency resources at which the UL grants are detected. In this case, the base station may provide the terminal with the periodicity when the base station transmits the PDCCH monitoring time and frequency resource information through RRC signaling.

The terminal may process the UL grants in ascending order of periodicities of the PDCCH monitoring resources ascertained at operation ①. As another example, the terminal may process the UL grants in descending order of periodicities of the PDCCH monitoring resources.

If there are multiple UL grants having the same metric value, i.e., same periodicity of the PDCCH monitoring resource, the processing order among these UL grants may be determined according to another method proposed in the disclosure.

Referring to FIG. 22, the bandwidth part 1 2210 has the longest periodicity of the PDCCH monitoring resource as denoted by reference number 2215, the bandwidth part 3 2230 has the shortest periodicity of PDCCH monitoring resource as denoted by reference number 2235. According to an embodiment of the disclosure, in this case, the terminal may process the control information received at the PDCCH monitoring resource of the bandwidth part 1 2210 last. According to another embodiment of the disclosure, the terminal may process the control information received at the PDCCH monitoring resource of the bandwidth part 1 2210 first.

Embodiment 4-8

The NR system is designed to operate on multiple frequency bands with different propagation properties. For example, it is considered to design a system operating on the frequency bands below 6 GHz which incorporate the frequency bands occupied by existing 2G/3G/4G systems and frequency bands above 6 GHz that requires transmission/reception beamforming to overcome significant propagation loss in a high frequency band, e.g., 28 GHz frequency band.

Such frequency bands may have different properties. For example, a frequency band above 6 GHz is advantageous in terms of facilitating massive data transmission because it has a broad bandwidth in comparison with a frequency band below 6 GHz but disadvantageous in terms of frequent radio link breakage caused by significant propagation loss. The power consumption of a radio frequency (RF) module operating in a frequency band below 6 GHz and the power consumption of an RF module operating in a frequency band above 6 GHz may differ from each other.

Accordingly, when a terminal receives multiple UL grants, it may determine the UL grant processing order based on the frequency band to which the allocated UL resources belong. A description is made there of hereinafter.

If the terminal receives multiple UL grants, it ascertains the frequency band to which the allocated resources, i.e., carrier frequency or component carrier, indicated by the UL grant belongs.

The terminal processes the UL grants in ascending order of the carrier frequencies ascertained at operation ①.

- As another example, the terminal may process the UL grants in descending order of the carrier frequencies of the allocated UL resources.
- As another example, the terminal may process the UL grants in processing order notified by the base station through RRC signaling.
- As another example, the terminal may first process the UL grant received on a component carrier configured as a primary cell (PCell) and then the UL grants received on a component carrier configured as a secondary cell (SCell).
- As another example, the terminal may first process the UL grant configured for a component carrier of the PCell and then the UL grant configured for a component carrier of an SCell.

③ If there are multiple UL grants having the same metric value, i.e., UL grants received in the same frequency band, that is derived at operation ①, the processing order among these UL grants may be determined according to another method proposed in the disclosure.

Embodiment 4-9

In the NR system, a terminal may receive multiple services with different properties simultaneously. For example, the terminal may us a logical channel for an eMBB service requiring a high throughput and a logical channel for a URLLC service requiring a low latency and high reliability. In this case, when traffic belonging to a logical channel representing eMBB or URLLC occurs, the terminal may transmit a scheduling request signal to the base station according to a scheduling request procedure. If the base station receives a scheduling request signal from the terminal, it may transmit to the terminal a UL grant for allocating UL resources to give the terminal to transmit the traffic.

Accordingly, when the terminal receives a UL grant, it has to determine the logical channel having the traffic to be transmitted through the UL grant. This is because the services of the terminal to which the traffics to be transmitted belong require different properties of uplink resources that are indicated by a UL grant.

For example, the UL resources configured with the SCS of 15 kHz and the TTI length of 0.5 ms may be appropriate for transmitting the traffic belong to a logical channel representing an eMBB service, and the UL resources configured with the SCS of 30 kHz and the TTI length of 0.25 ms may be appropriate for a logical channel representing a URLLC service. If the terminal processes a UL grant for eMBB, i.e., uses the UL resources configured with the SCS of 15 kHz and the TTI of 0.5 ms, to transmit the traffic belonging to the logical channel representing a URLLC service, the requirements of the URLLC service may not be met.

In order to overcome the above problem, the disclosure proposes a method for a terminal to ascertain, when it receives a UL grant from a base station, the physical layer properties of the UL resources indicated by the UL grant and to determine the logical channel to be transmitted through the UL grant.

The terminal checks the physical layer properties, e.g., SCS and TTI length, of the resources indicated by the received UL grant and ascertain the logical channel appropriate for being transmitted on the resources configured with the corresponding physical layer properties. Detailed description is made thereof with reference to FIG. 23.

Figure 23:
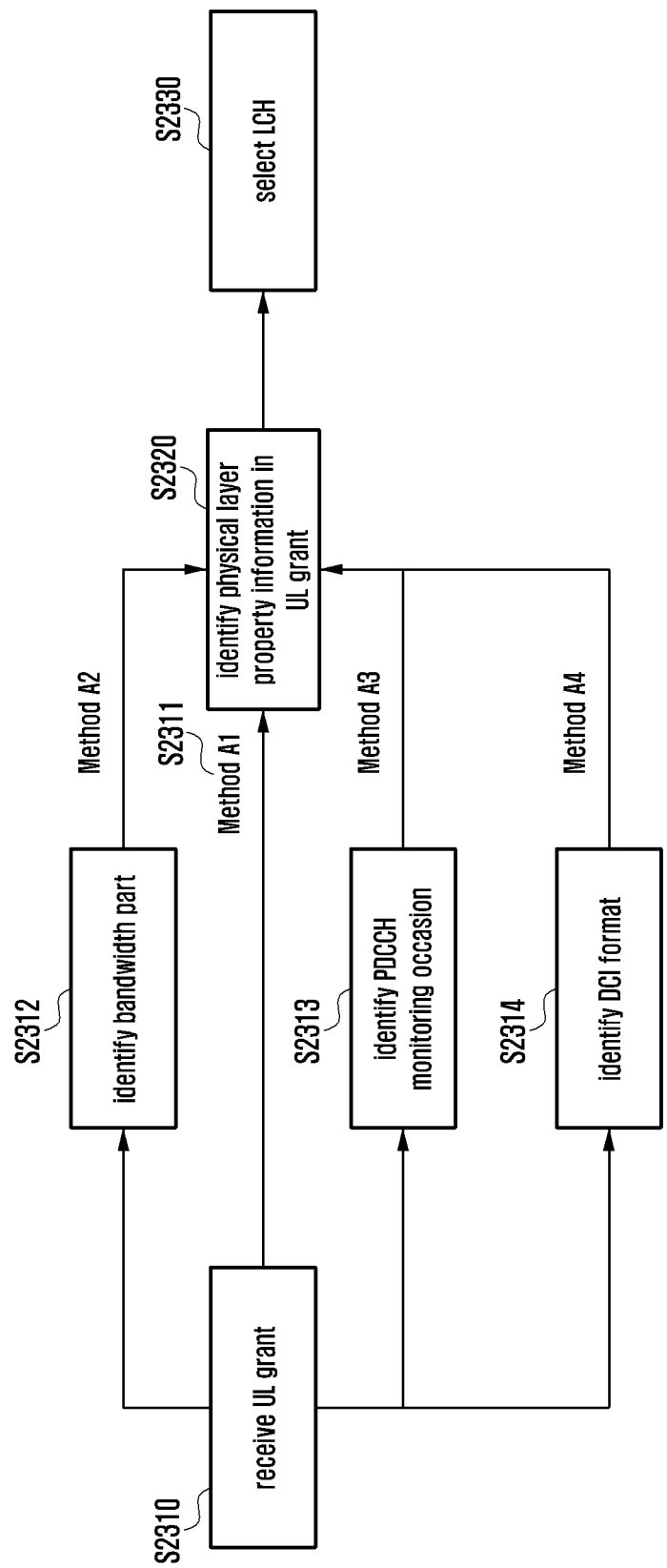
FIG. 23 is a diagram illustrating a method for a terminal to check, when it receives a UL grant, physical layer properties of the UL grant and select LCHs to be transmitted through the UL grant according to an embodiment of the disclosure.

FIG. 23 is a diagram illustrating a method for a terminal to check, when it receives a UL grant, physical layer properties of the UL grant and select LCHs to be transmitted through the UL grant according to an embodiment of the disclosure.

Referring to FIG. 23, the terminal may receive a UL grant at operation S2310. Next, the terminal may check, at operation S2320, the UL grant to ascertain physical layer properties of the UL resources indicated by the UL grant. Herein, the physical layer properties may include the aforementioned SCS and TTI length.

Next, the terminal may select an LCH based on the physical layer properties at operation S2330.

The terminal may ascertain the physical layer properties of the allocated UL grant and select LCHs based on the physical layer properties using various methods as follows.

Method A1

The terminal may use Method A1 at operation S2311. In Method A1, the base station transmits the terminal the DCI including an SCS and a TTI length with which the terminal can ascertain the physical layer properties of the UL resources indicated by the UL grant. Table 10 exemplifies the SCSs and TTI lengths. When the terminal receives the UL grant, it can obtain the SCS and TTI length of the allocated resources from the UL grant.

TABLE 10

| UL grant | |
|---|---|
| SCS | X kHz |
| TTI length | Y ms |

The base station transmits logical channel lists, each containing logical channels that can be transmitted on the resources configured with specific physical layer properties (SCS and TTI length). Such information may be transmitted through RRC signaling. Table 11 exemplifies the logical channel lists.

TABLE 11

| RRC information element | |
|---|---|
| SCS/TTI length set 1 = (X1 kHz SCS, Y1 ms TTI) | LCH 1, LCH 2, LCH 3, . . . |
| SCS/TTI length set 2 = (X2 kHz SCS, Y2 ms TTI) | LCH 11, LCH 12, LCH 13, . . . |
| SCS/TTI length set 3 = (X3 kHz SCS, Y3 ms TTI) | LCH 21, LCH 22, LCH 23, . . . |
| . . . | . . . |

In this way, the terminal ascertains the physical layer properties of the allocated resources indicated by the UL grant from the DCI and selects logical channels to be transmitted on the resource configured with the physical layer properties from the logical channel lists received through RRC signaling. Then, the terminal performs an LCP operation on the selected logical channels and, as a consequence, UL transmission.

This method is advantageous in term of being relatively simply implemented by adding the SCS and TTI length information to the DCI but disadvantageous in terms of increasing DCI overhead.

Method A2

The terminal may use Method A2.

In detail, the terminal ascertains (identifies), at operation S2312, the bandwidth part to which the allocated UL resources belong.

The base station uses bandwidth part-specific physical layer properties, e.g., bandwidth part-specific SCS and TTI length, and transmits the terminal the bandwidth part-specific physical layer properties through RRC signaling. Table 12 exemplifies bandwidth part-specific physical layer properties.

TABLE 12

| RRC information element | |
|---|---|
| Bandwidth part 1 of PUSCH | SCS/TTI length set 1 = (X1 kHz SCS, Y1 ms TTI) |
| Bandwidth part 2 of PUSCH | SCS/TTI length set 2 = (X2 kHz SCS, Y2 ms TTI) |
| Bandwidth part 3 of PUSCH | SCS/TTI length set 3 = (X3 kHz SCS, Y3 ms TTI) |
| . . . | . . . |

Then, the base station transmits the terminal logical channel lists, each containing logical channels that can be transmitted on the resources configured with specific physical layer properties (SCS and TTI length). Such information may be transmitted through RRC signaling. Table 13 exemplifies the logical channel lists.

TABLE 13

| RRC information element | |
| --- | --- |
| SCS/TTI length set 1 = (X1 kHz SCS, Y1 ms TTI) | LCH 1, LCH 2, LCH 3, ... |
| SCS/TTI length set 2 = (X2 kHz SCS, Y2 ms TTI) | LCH 11, LCH 12, LCH 13, ... |
| SCS/TTI length set 3 = (X3 kHz SCS, Y3 ms TTI) | LCH 21, LCH 22, LCH 23, ... |
| ... | ... |

The terminal ascertains the physical layer properties (e.g., SCS and TTI length) of the allocated resources indicated by the UL grant from the information on the bandwidth part to which the allocated UL resources belongs and selects logical channels that can be transmitted on the resources configured with the physical layer properties as indicated by the UL grant. Then, the terminal performs an LCP operation on the selected logical channels and, as a consequence, UL transmission.

Method A3

The terminal may use Method A3.

In detail, the terminal ascertains (identifies), at operation S2313, the time and frequency resources on which the UL grant is received or PDCCH monitoring occasion.

The base station uses PDCCH monitoring occasion-specific physical layer properties, e.g., PDCCH monitoring occasion-specific SCS and TTI length, to allocate uplink resources and notifies the terminal of the PDCCH monitoring occasion-specific physical layer properties through RRC signaling. Table 14 exemplifies the DCCH monitoring occasion-specific physical layer properties

TABLE 14

| RRC information element | |
| --- | --- |
| PDCCH monitoring occasion 1 | SCS/TTI length set 1 = (X1 kHz SCS, Y1 ms TTI) |
| PDCCH monitoring occasion 2 | SCS/TTI length set 2 = (X2 kHz SCS, Y2 ms TTI) |
| PDCCH monitoring occasion 3 | SCS/TTI length set 3 = (X3 kHz SCS, Y3 ms TTI) |
| ... | ... |

Then, the base station transmits the terminal logical channel lists, each containing logical channels that can be transmitted on the resources configured with specific physical layer properties (SCS and TTI length). Such information may be transmitted through RRC signaling. Table 15 exemplifies the logical channel lists.

TABLE 15

| RRC information element | |
| --- | --- |
| SCS/TTI length set 1 = (X1 kHz SCS, Y1 ms TTI) | LCH 1, LCH 2, LCH 3, ... |
| SCS/TTI length set 2 = (X2 kHz SCS, Y2 ms TTI) | LCH 11, LCH 12, LCH 13, ... |
| SCS/TTI length set 3 = (X3 kHz SCS, Y3 ms TTI) | LCH 21, LCH 22, LCH 23, ... |
| ... | ... |

The terminal ascertains the physical layer properties (e.g., SCS and TTI length) of the allocated resources based on the PDCCH time-frequency resource or PDCCH monitoring occasion at which the UL grant is received and selects logical channels that can be transmitted on the resources configured with the physical layer properties as indicated by the UL grant. Then, the terminal performs an LCP operation on the selected logical channels and, as a consequence, UL transmission.

Method A4

The terminal may use Method A4.

In detail, the terminal ascertains (identifies), at operation S2314, the DCI format used by the terminal to allocate UL resources.

The base station uses DCI format-specific physical layer properties, e.g., DCI format-specific SCS and TTI length, and notifies the terminal DCI format-specific physical layer properties, e.g., DCI format-specific SCS and TTI length through RRC signaling. Table 16 exemplifies DCI format-specific physical layer properties.

TABLE 16

| RRC information element | |
| --- | --- |
| DCI format 1 | SCS/TTI length set 1 = (X1 kHz SCS, Y1 ms TTI) |
| DCI format 2 | SCS/TTI length set 2 = (X2 kHz SCS, Y2 ms TTI) |
| DCI format 3 | SCS/TTI length set 3 = (X3 kHz SCS, Y3 ms TTI) |
| ... | ... |

Then, the base station transmits the terminal logical channel lists, each containing logical channels that can be transmitted on the resources configured with specific physical layer properties (SCS and TTI length). Table 17 exemplifies the logical channel lists.

TABLE 17

| RRC information element | |
| --- | --- |
| SCS/TTI length set 1 = (X1 kHz SCS, Y1 ms TTI) | LCH 1, LCH 2, LCH 3, ... |
| SCS/TTI length set 2 = (X2 kHz SCS, Y2 ms TTI) | LCH 11, LCH 12, LCH 13, ... |
| SCS/TTI length set 3 = (X3 kHz SCS, Y3 ms TTI) | LCH 21, LCH 22, LCH 23, ... |
| ... | ... |

The terminal ascertains the physical layer properties (e.g., SCS and TTI length) of the allocated resources indicated by the UL grant based on the DCI format used for allocating the UL resources and selects logical channels that can be transmitted on the resources configured with the physical layer properties as indicated by the UL grant. Then, the terminal performs LCP operation on the selected logical channels and, as a consequence, L transmission.

Method A2/A3/A4 imposes a constraint in that it is necessary to predefine bandwidth part-specific logical layer properties (SCSs and TTI lengths), PDCCH time and frequency-specific (or PDCCH monitoring occasion-specific) logical layer properties (SCSs and TTI lengths), or DCI format-specific logical layer properties (SCSs and TTI lengths) to allocate UL resources. However, these methods are advantageous in terms of being implemented without increase of the number of bits of DCI because there is no need to add the SCS and TTI length information to the DCI unlike Method A1.

The above descriptions have been made of the two-operation methods including each the first operation of ascertain the physical layer properties of the allocated UL grant and the second operation of selecting logical channels appropriate for being transmitted through the UL grant.

Descriptions are made of the single-operation methods for selecting logical channels appropriate for being transmitted on the UL resources indicated by a UL grant, instead of the above-described two-operation methods, hereinafter. The descriptions of the single-operation methods are made with reference to FIG. 24.

Figure 24:
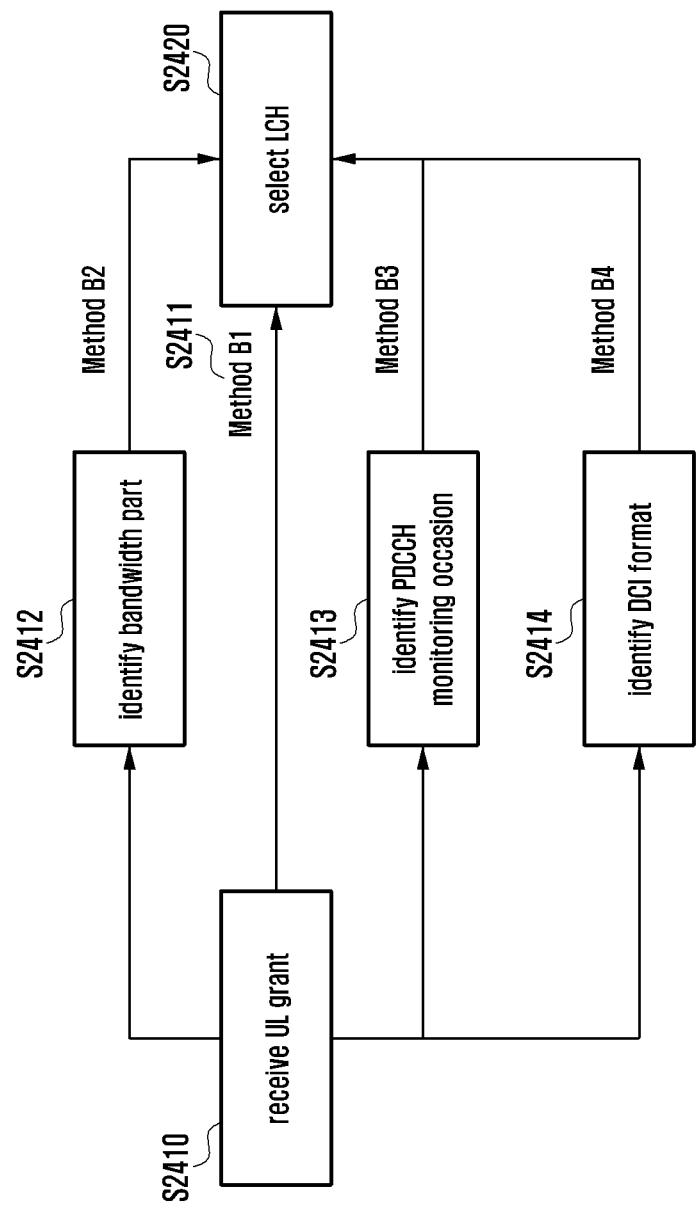
FIG. 24 is a diagram illustrating a method for a terminal to select, when it receives a UL grant, LCHs to be transmitted through the UL grant according to an embodiment of the disclosure.

FIG. 24 is a diagram illustrating a method for a terminal to select, when it receives a UL grant, LCHs to be transmitted through the UL grant according to an embodiment of the disclosure.

Referring to FIG. 24, the terminal may receive a UL grant at operation S2410. Next, the terminal may select LCHs at operation S2420.

The terminal may receive a UL grant and select LCHs using various methods as follows.

Method B1

The terminal may use Method B1 at operation S2411.

Method B1 is characterized in that the base station transmits the terminal a list of LCH IDs of LCHs that can be transmitted through the corresponding UL grant via DCI to notify the terminal of the LCHs transmittable through the allocated UL grant. Table 18 exemplifies the LCH ID list.

TABLE 18

| UL grant | |
| --- | --- |
| LCH ID list | LCH 1, LCH 2, LCH 3 |

In this case, the terminal ascertains the LCHs transmittable through the allocated UL grant based on the information included in the DCI and performs an LCP operation for UL transmission.

This method is advantageous in terms of being relatively simply implemented by adding the transmittable LCH information to the DCI but disadvantageous in terms of increasing DCI overhead.

Method B1'

The terminal may use Method B1'.

Method B1' is characterized in that the base station transmits the terminal an ID of a set of LCHs that can be transmitted through the corresponding UL grant via DCI to notify the terminal of the LCHs transmittable through the allocated UL grant. Table 19 exemplifies the LCH set ID. In this case, the base station may notify the terminal of the ID of a set of LCHs through RRC signaling.

TABLE 19

| UL grant | |
| --- | --- |
| LCH set ID | X |

As described above, the base station may transmit to the terminal the lists of LCHs belonging to respective LCH sets. This information may be transmitted through RRC signaling. In detail, each LCH set may be identified by an LCH set ID, and the base station may transmit to the terminal LCH set IDs and LCH lists corresponding to the LCH sets identified by the LCH set IDs. Table 20 exemplifies the LCH set lists.

TABLE 20

| RRC information element | |
| --- | --- |
| LCH set 1 | LCH 1, LCH 2, LCH 3, . . . |
| LCH set 2 | LCH 11, LCH 12, LCH 13, . . . |
| LCH set 3 | LCH 21, LCH 22, LCH 23, . . . |
| . . . | . . . |

In this case, the terminal may ascertain the ID of the LCH set containing the LCHs transmittable through the allocated UL grant based on the information included in the DCI. Then, the terminal ascertains the LCH set corresponding to the LCH set ID included in the UL grant received through RRC signaling. The terminal performs the LCP operation on the logical channels included in the LCH set for UL transmission.

This method is advantageous in terms of mitigating the DCI overhead by adding the LCH set ID which is smaller in size than the LCH ID list to the DCI.

Method B2

The terminal may use Method B2.

In detail, the terminal checks, at operation S2412, the bandwidth part to which the allocated resources belong.

The base station transmits the bandwidth part-specific LCH lists containing each the LCHs transmittable in specific bandwidth part through RRC signaling. Table 21 exemplifies the bandwidth part-specific LCH lists.

TABLE 21

| RRC information element | |
| --- | --- |
| Bandwidth part 1 of PUSCH | LCH 1, LCH 2, LCH 3, . . . |
| Bandwidth part 2 of PUSCH | LCH 11, LCH 12, LCH 13, . . . |
| Bandwidth part 3 of PUSCH | LCH 21, LCH 22, LCH 23, . . . |
| . . . | . . . |

The terminal ascertains the LCHs transmittable through the allocated UL grant by checking the bandwidth part to which the allocated UL resources and looking up the mapping between the bandwidth parts and LCHs that is received through the RRC signaling.

Method B3

The terminal may use Method B3.

In detail, the terminal checks, at operation S2413, the PDCCH time-frequency resource or PDCCH monitoring occasion at which the UL grant is received.

The base station transmits the terminal the PDCCH time-frequency resource-specific or PDCCH monitoring occasion-specific LCH lists containing each the LCHs transmittable in specific UL resources through RRC signaling. Table 22 exemplifies the PDCCH monitoring occasion-specific LCH lists.

TABLE 22

| RRC information element | |
| --- | --- |
| PDCCH monitoring occasion 1 | LCH 1, LCH 2, LCH 3, . . . |
| PDCCH monitoring occasion 2 | LCH 11, LCH 12, LCH 13, . . . |
| PDCCH monitoring occasion 3 | LCH 21, LCH 22, LCH 23, . . . |
| . . . | . . . |

The terminal ascertains the LCHs transmittable through the allocated UL grant by checking the PDCCH time-frequency resource or PDCCH monitoring occasion at which the UL grant is received and looking up the mapping between PDCCH monitoring occasions and LCHs that is received through the RRC signaling. The terminal performs the LCP on the ascertained LCHs for UL transmission.

Method B4

The terminal may use Method B4.

In detail, the terminal checks (identifies), at operation S2414, the DCI format used for by the base station for allocating UL resources.

The base station transmits the terminal the DCI format-specific LCH lists containing each the LCH transmittable in specific UL resources through RRC signaling. Table 23 exemplifies the DCI format-specific LCH lists.

TABLE 23

| RRC information element | |
|---|---|
| DCI format 1 | LCH 1, LCH 2, LCH 3, . . . |
| DCI format 2 | LCH 11, LCH 12, LCH 13, . . . |
| DCI format 3 | LCH 21, LCH 22, LCH 23, . . . |
| . . . | . . . |

The terminal ascertains the LCHs transmittable through the allocated UL grant by checking the DCI format used by UL resource allocation and looking upon the mapping between DCI formats and LCHs that is received through the RRC signaling.

Method B2/B3/B4 imposes a constraint in that it is necessary to transmit bandwidth part-LCHs, PDCCH time and frequency-specific (or PDCCH monitoring occasion-specific) LCHs, or DCI format-LCHs to the terminal in advance. However, these methods are advantageous in terms of being implemented with increase of the number of bits of DCI because there is no need to add the LCH-related information to the DCI unlike Method B1.

The above descriptions have been made of the method for ascertain the SCS and TTI length of the allocated UL resources. However, the proposed methods may be used to ascertain various parameters, e.g., CP length and transmission duration, as well as the SCS and TTI length in the same principle.

The above descriptions are directed to the method for ascertaining the SCS and the TTI length in pair. However, the terminal may check the SCH according to a method and the TTI length according to another method.

For example, the terminal may use one of Method A1, Method A2, Method A3, and Method A4 to ascertain the SCS, and one of the Method B1, Method B2, Method B2, and Method B4 to ascertain the TTI length. Although the above descriptions are directed to the embodiments where a terminal ascertains the SCS and TTI length, the disclosure is not limited thereto but may encompass other embodiments where a terminal ascertains a combination of various parameters. For example, the disclosure may include the embodiments where a terminal ascertains a combination of the SCS and transmission duration.

The methods described with reference to FIG. 24 are applicable to all embodiments of the disclosure, e.g., a method for checking a parameter for use in determining a UL grant processing order.

Fifth Embodiment

Typically, a normal UL scheduling procedure is performed as follows.

1) A base station allocates resources for use by a terminal in transmitting a scheduling request (SR), i.e., PUCCH.

2) When outgoing traffic occurs, the terminal transmits a SR to the base station according to a predefined buffer status report (BSR) and SR procedure.

3) Upon receipt of the SR, the base station allocates resources for use by the terminal in transmitting data, i.e., PUSCH.

4) The terminal transmits the data using the resources allocated by the base station.

In a 5G or NR system, grant-free (GF) transmission is proposed along with the normal UL scheduling procedure. A GF transmission procedure is performed as follows.

1) A base station allocates resources for use by a terminal in transmitting data. This resource allocation is performed in a similar method to the semi-persistent scheduling (SPS) in which the base station allocates resources to the terminal in advance before traffic occurrence unlike the normal UL scheduling for allocating resources after traffic occurrence.

A. The base station may allocate resources for GF transmission of the terminal as follows.

i) The base station notifies the terminal of GF resources through RRC configuration.

ii) The base station notifies the terminal of candidate GF resources through RRC configuration and then actually available GF resources through L1 signaling.

B. The base station may transmit to the terminal the information as follows when allocating the GR transmission resources.

i) Periodicity and offset of a resource with respect to SFN=0 ii) Time domain resource allocation iii) Frequency domain resource allocation iv) UE-specific DMRS configuration v) An MCS/TBS value vi) Number of repetitions K vii) Power control related parameters viii) HARQ related parameters ix) Offset associated with the periodicity with respect to a timing reference indicated by L1 signaling for activation 2) When outgoing traffic occurs, the terminal may transmit the traffic using the GF resources allocated at operation 1).

Such a GF transmission method is advantageous is advantageous in terms of saving the time required for the terminal to transmit an SR to the base station, receive a UL grant from the base station, and perform related-processing. Accordingly, if the terminal that typically has multiple services active simultaneously is allocated UL resources for GF transmission from the base station, it may be preferred for the terminal to transmit the traffic belonging to a URLLC service requiring a low latency rather than the traffic belonging to an eMBB service tolerating a high latency.

In comparison with the normal UL scheduling method, the GF transmission method is characterized by capability of allocating the same GF resources to multiple terminals as well as low latency. The base station notifies the terminal of a terminal-specific demodulation reference signal (DM-RS) configuration along with time-frequency resource information, MCS, HARQ, and power control information related to the GF resources when allocating the GF resources.

The base station may allocate the same GF resources to multiple terminal and transmit terminal-specific DMRS configuration to the corresponding terminals. In this case, although the multiple terminals perform transmissions on the same resources, the base station may identify the terminals based on the properties of the received DMRSs. This makes it possible for the base station to improve data reception performance or request for retransmission. When multiple terminals perform data transmissions on the same resources, whether or not the base station can successfully receive the data depends on the physical layer performance. That is, the base station may receive the data transmitted by the multiple terminals on the same resources successfully or not depending on the detailed design of the physical layer for GF transmission.

The above described characteristics of the GF transmission method may be summarized as follows.

(1) Save time required for SR and UL grant transmission/reception (2) Possible to allocate same GF resources to multiple terminals (3) Possible to degrade transmission/reception performance dependent on detailed design of physical layer for GF transmission Here, it is assumed that multiple services, e.g., eMBB and URLLC services are simultaneously active in the terminal. Considering the characteristic (1), when the base station allocates GF resources to the terminal, it is preferred for the terminal to transmit URLLC data requiring low latency.

However, considering the characteristic (2), the GF resources allocated to a terminal may be allocated to other terminals too. Also, considering the characteristic (3), if multiple terminals perform GF transmissions, this may degrade the data reception performance of the base station. In such a case, it is not appropriate for the terminal to transmit URLLC data on the allocated GF resources. This is because the URLLC data transmission performed in such a situation may not meet the reliability requirement, i.e., error rate and latency requirements, of the URLLC service.

Figure 25:
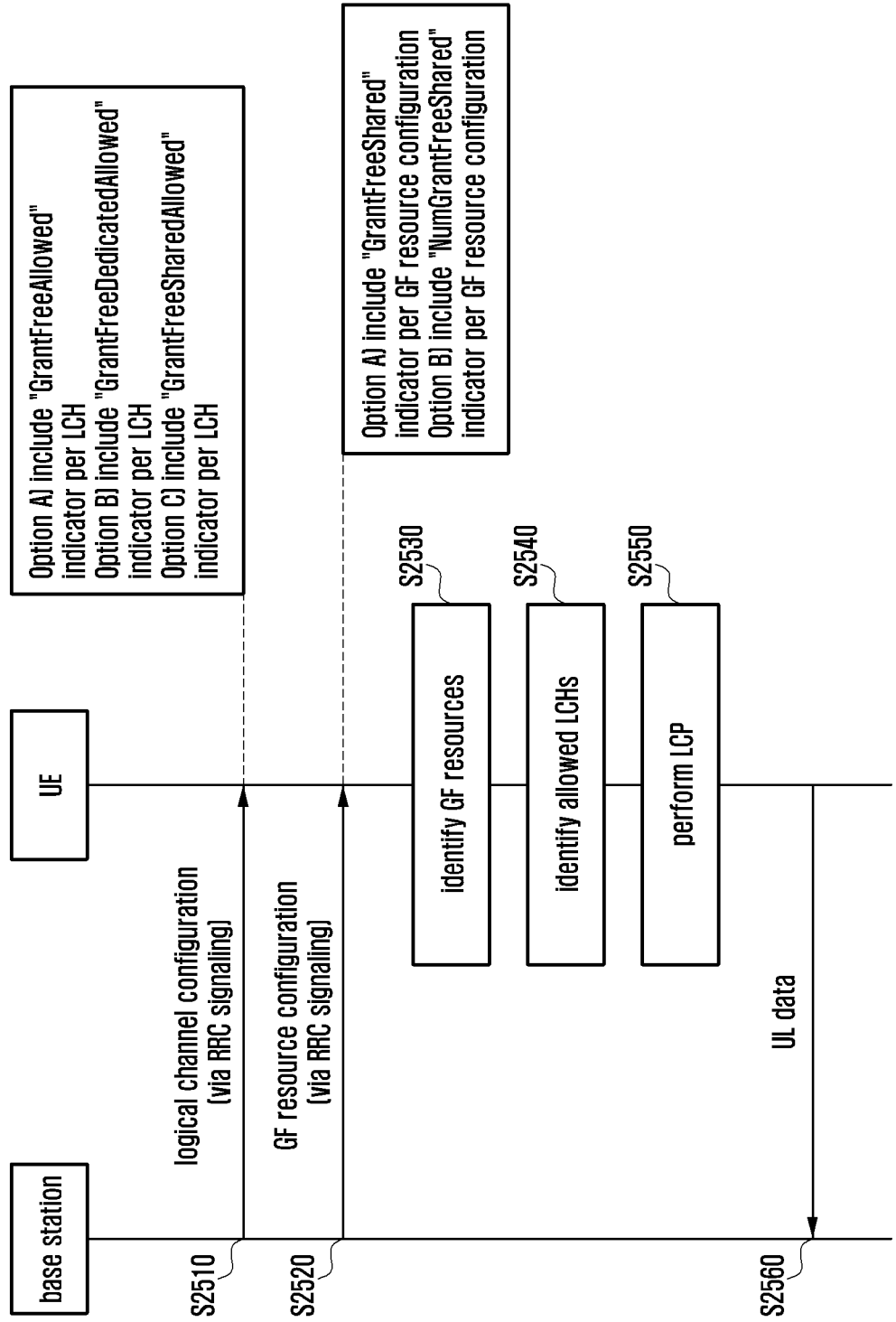
FIG. 25 is a diagram illustrating a UL data transmission method according to an embodiment of the disclosure.

In order to overcome the above problems, the disclosure proposes a procedure depicted in FIG. 25.

FIG. 25 is a diagram illustrating a UL data transmission method according to an embodiment of the disclosure.

A base station transmits LCH configuration information about individual logical channels to a terminal at operation S2510. The LCH configuration information may be transmitted via RRC signaling.

According to an embodiment of the disclosure, the LCH configuration information may include at least one of the followings:

1) Information indicating whether the traffic belonging to the corresponding logical channel is transmittable on the GF resources (referred to as GrantFreeAllowed)

2) Information indicating whether the traffic belonging to the corresponding logical channel is transmittable on the GF resources allocated to only one terminal (referred to as GrantFreeDedicatedAllowed)

3) Information indicating whether the traffic belonging to the corresponding logical channel is transmittable on the GF resources allocated to multiple terminals (referred to as GrantFreeSharedAllowed)

Next, the base station allocates GF resources to the terminal at operation S2520. The GF resources may be indicated by a GF transmission resource configuration information transmitted via RRC signaling.

According to an embodiment of the disclosure, the GF resource configuration information may include at least one of the followings.

1) Information indicating whether the corresponding GF resources are allocated to only one terminal or multiple terminals (referred to as GrantFreeShared)

2) Information indicating a number of terminals allocated the corresponding GF resources (referred to as NumGrantFreeShared)

Through this, the terminal obtains a chance to perform UL transmission on the GF resources allocated by the base station.

Then, the terminal may ascertain (identify) the GF resources at operation S2530.

Next, the terminal may identify allowed LCHs at operation S2540. The terminal selects LCHs to be transmitted on the GF resources based on the information ascertained from the LCH configuration and GF resource configuration.

A. If neither the GrantFreeShared nor the NumGrantFreeShared is not received at operation S2520, the terminal may select the LCHs corresponding to the GrantFreeAllowed ascertained at operation S2530.

B. If the GrantFreeShared or the NumGrantFreeShared is received at operation S2520, the terminal operates as follows.

i) If the GrantFreeShared received at operation S2520 is set to True (this means that the corresponding GF resources are shared by multiple terminals) or if the NumGrantFreeShared received at operation S2520 is greater than 1, the terminal selects LCHs based on the GrantFreeAllowed or GrantFreeSharedAllowed received at operation S2510.

ii) If the GrantFreeShared received at operation S2520 is set to False (this means that the corresponding GF resources is allocated to only one terminal) or if the NumGrantFreeShared received at operation S2520 is set to 1, the terminal selects LCHs based on the GrantFreeDedicatedAllowed received at operation S2510.

The terminal performs an LCP operation on the selected logical channels at operation S2550. Next, the terminal transmits, at operation S2560, a packet generated as a consequence of the LCP operation on the GF resources.

Figure 26:
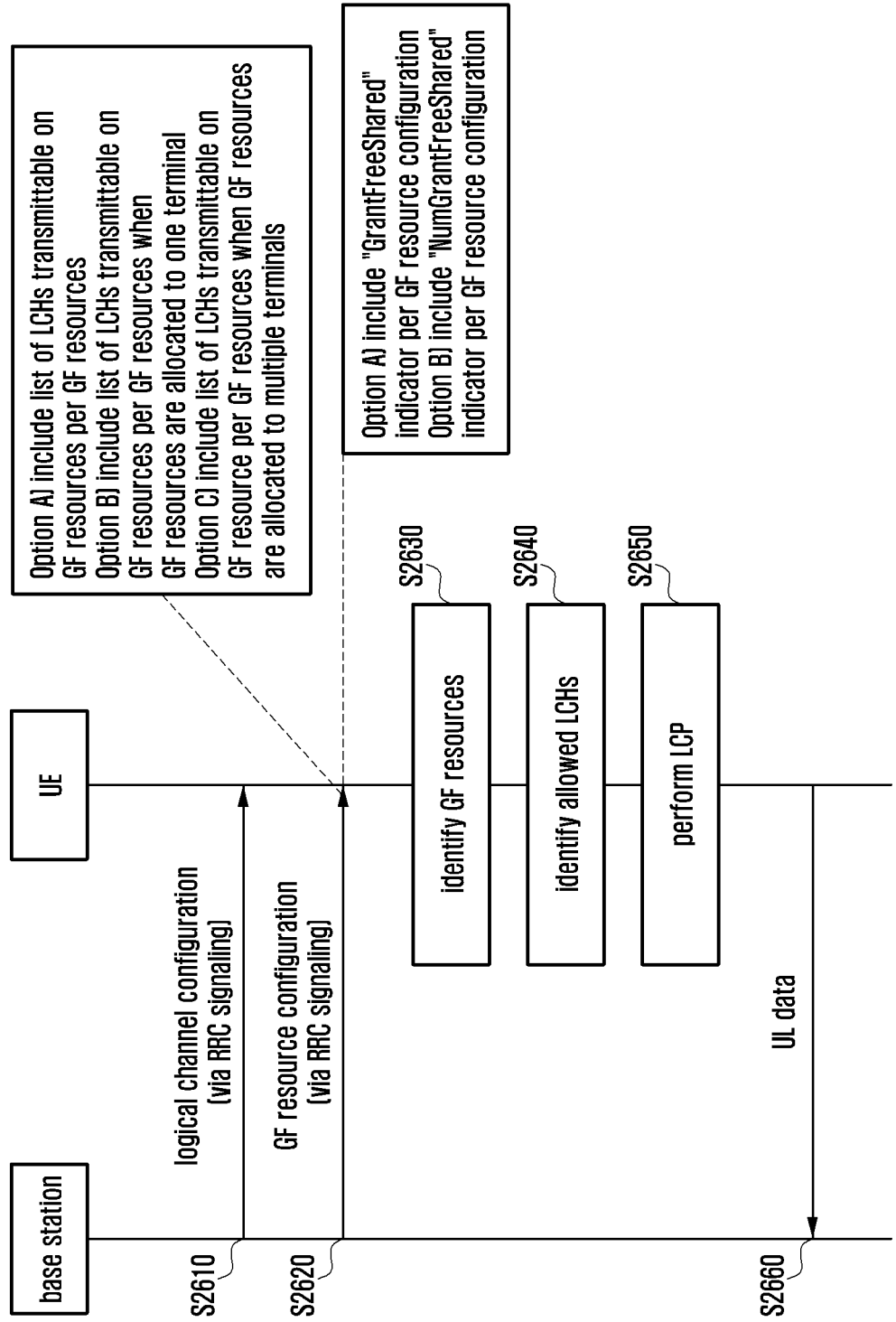
FIG. 26 is a diagram illustrating a UL data transmission method according to another embodiment of the disclosure.

The disclosure also proposes a procedure depicted in FIG. 26.

FIG. 26 is a diagram illustrating a UL data transmission method according to an embodiment of the disclosure.

A base station transmits LCH configuration information about individual logical channels to a terminal at operation S2610. The LCH configuration information may be transmitted via RRC signaling.

The base station allocates GF resources to the terminal at operation S2620. The GF resources may be indicated by a GF transmission resource configuration information transmitted via RRC signaling.

A. According to an embodiment of the disclosure, the GF resource configuration information may include at least one of the followings.

1) Information indicating whether the corresponding GF resources are allocated to only one terminal or multiple terminals (referred to as GrantFreeShared)

2) Information indicating a number of terminals allocated the corresponding GF resources (referred to as NumGrantFreeShared)

B. According to an embodiment of the disclosure, the GF resource configuration information may include at least one of the followings.

1) A list of LCHs transmittable on the corresponding GF resources

2) A list of LCHs transmittable on the GF resources when the corresponding GF resources are allocated to one terminal 3) A list of LCHs transmittable on the GF resources when the corresponding GF resources are allocated to multiple terminals Through this, the terminal obtains a chance to perform UL transmission on the GF resources allocated by the base station.

Then, the terminal may identify the GF resources at operation S2630.

Next, the terminal may identify allowed LCHs at operation S2640. The terminal selects LCHs to be transmitted on the GF resources based on the information ascertained from the LCH configuration and GF resource configuration.

A. If neither the GrantFreeShared nor the NumGrantFreeShared is not received, the terminal may select the LCHs contained in the list of LCHs transmittable on the corresponding GF resources.

B. If the GrantFreeShared or the NumGrantFreeShared is received, the terminal operates as follows.

i) If the GrantFreeShared is set to True (this means that the corresponding GF resources are shared by multiple terminals) or if the NumGrantFreeShared is greater than 1, the terminal selects LCHs contained in the list of LCHs transmittable on the GF resources when the corresponding GF resources are allocated to multiple terminals.

ii) If the GrantFreeShared is set to False (this means that the corresponding GF resources is allocated to only one terminal) or if the NumGrantFreeShared is set to 1, the terminal selects LCHs contained in the list of LCHs transmittable on the GF resources when the corresponding GF resources are allocated to only one terminal.

The terminal performs an LCP operation on the selected logical channels at operation S2650. Next, the terminal transmits, at operation S2660, a packet generated as a consequence of the LCP operation using the GF resources.

Figure 27:
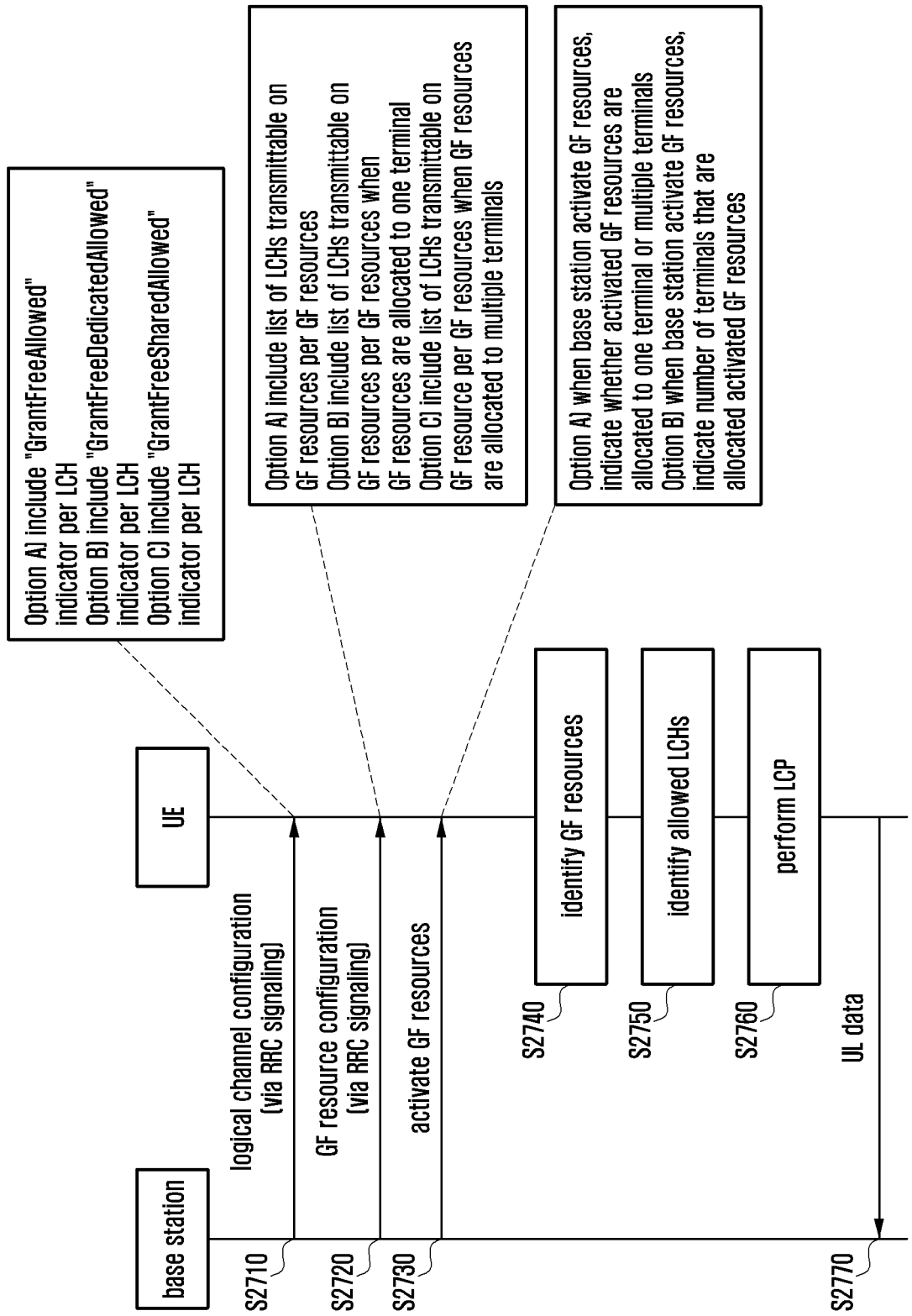
FIG. 27 is a diagram illustrating a UL data transmission method according to another embodiment of the disclosure.

The disclosure also proposes a procedure depicted in FIG. 27.

FIG. 27 is a diagram illustrating a UL data transmission method according to an embodiment of the disclosure.

A base station transmits LCH configuration information about individual logical channels to a terminal at operation S2710. The LCH configuration information may be transmitted via RRC signaling.

According to an embodiment of the disclosure, the LCH configuration information may include at least one of the followings:

1) Information indicating whether the traffic belonging to the corresponding logical channel is transmittable on the GF resources (referred to as GrantFreeAllowed)

2) Information indicating whether the traffic belonging to the corresponding logical channel is transmittable on the GF resources allocated to only one terminal (referred to as GrantFreeDedicatedAllowed)

3) Information indicating whether the traffic belonging to the corresponding logical channel is transmittable on the GF resources allocated to multiple terminals (referred to as GrantFreeSharedAllowed)

Next, the base station allocates GF resources to the terminal at operation S2720. The GF resources may be indicated by a GF transmission resource configuration information transmitted via RRC signaling.

A. According to an embodiment of the disclosure, the GF resource configuration information may include at least one of the followings.

1) A list of LCHs transmittable on the corresponding GF resources

2) A list of LCHs transmittable on the GF resources when the corresponding GF resources are allocated to one terminal 3) A list of LCHs transmittable on the GF resources when the corresponding GF resources are allocated to multiple terminals B. The information received at operation S2710 and the information received at operation S2720 may be identical with each other. Accordingly, the UL data transmission method of the disclosure may operate even through one of the LCH configuration information and the GF resource configuration information is given. In this embodiment, it is assumed that the corresponding information is transmitted at operation S2710.

At operation S2730, the base station activates the GF resources allocated to the terminal. The GF resources may be activated via DCI or L1 signaling.

According to an embodiment of the disclosure, the base station may transmit to the terminal the DCI including at least one of the followings to activate the GF resources.

1) Information indicating whether the activated GF resources are allocated to one terminal or multiple terminals 2) Information indicating the number of terminals that are allocated the activated GF resources Then, the terminal may identify the GF resources at operation S2740.

Next, the terminal may identify the allowed LCHs at operation S2750. The terminal selects LCHs to be transmitted on the GF resources based on the information ascertained from the LCH configuration and the DCI for activating the GF resources.

A. If neither the information indicating whether the activated GF resources are allocated to one terminal or multiple terminals nor the information indicating the number of terminals that are allocated the activated GF resources is received at operation S2730, the terminal selects LCHs based on the GrantFreeAllowed ascertained at operation S2710.

B. If the information indicating whether the activated GF resources are allocated to one terminal or multiple terminals the number of terminals that are allocated the activated GF resources is received at operation S2730, the terminal operates as follows.

i) If the activated GR resources are allocated to multiple terminals, the terminal selects LCHs based on the GrantFreeAllowed and GrantFreeSharedAllowed ascertained at operation S2710.

ii) If the activated GF resources are allocated to one terminal, the terminal selects LCHs based on the GrantFreeDedicatedAllowed ascertained at operation S2710.

The terminal performs an LCP operation on the selected logical channels at operation S2760. Next, the terminal transmits, at operation S2770, a packet generated as a consequence of the LCP operation using the GF resources.

Figure 28:
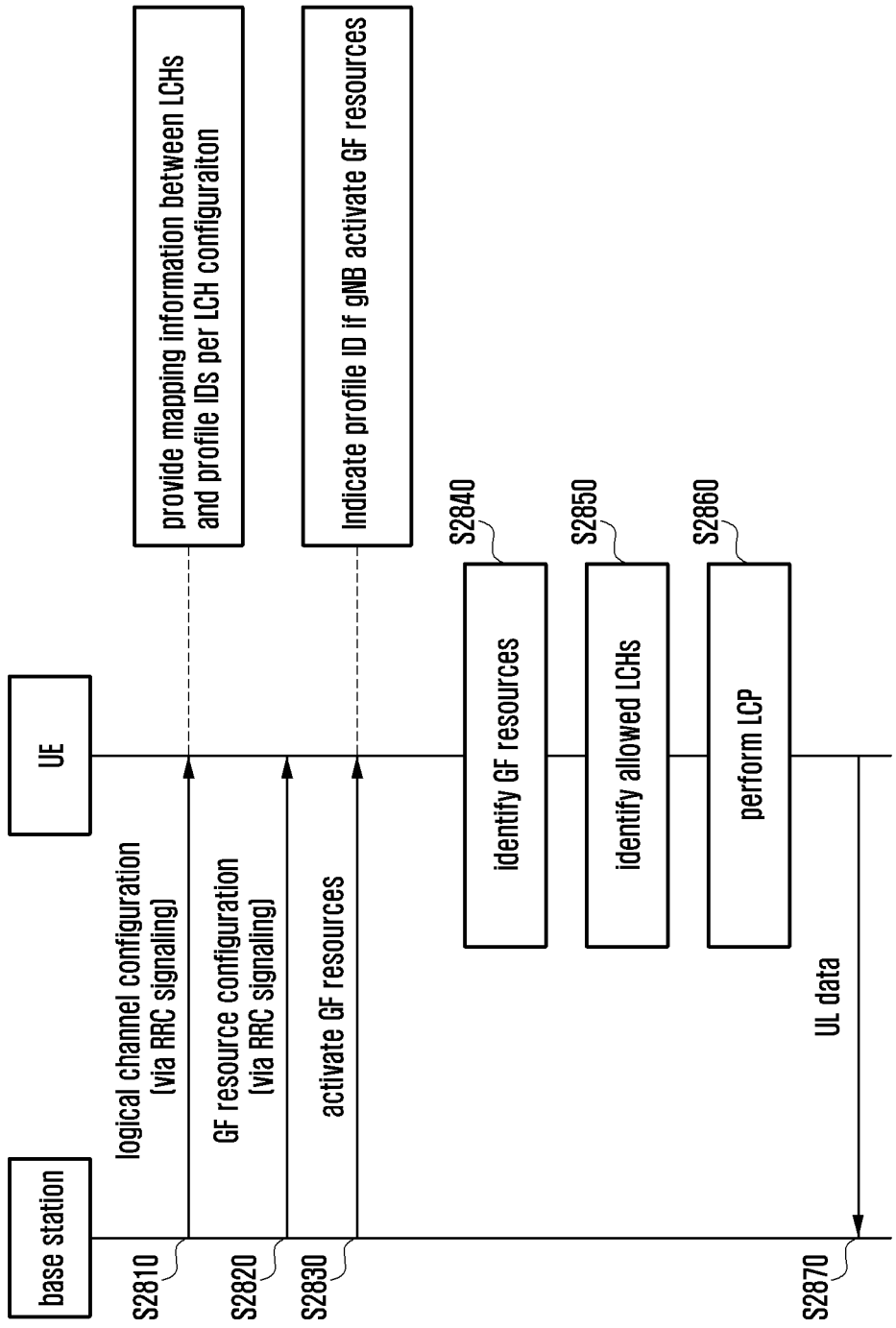
FIG. 28 is a diagram illustrating a UL data transmission method according to another embodiment of the disclosure.

The disclosure also proposes a procedure depicted in FIG. 28.

FIG. 28 is a diagram illustrating a UL data transmission method according to an embodiment of the disclosure.

A base station transmits LCH configuration information about individual logical channels to a terminal at operation S2810. The LCH configuration information may be transmitted via RRC signaling.

According to an embodiment of the disclosure, the LCH configuration information may include at least one of the followings:

1) Profile IDs corresponding to individual logical channels

The base station allocates GF resources to the terminal at operation S2820. The GF resources may be indicated by a GF transmission resource configuration information transmitted via RRC signaling.

At operation S2830, the base station activates the GF resources allocated to the terminal. The GF resources may be activated via DCI or L1 signaling.

According to an embodiment of the disclosure, the base station may transmit to the terminal the DCI including at least one of the followings to activate the GF resources.

1) profile ID of activated GF resources

Then, the terminal may identify the GF resources at operation S2840.

Next, the terminal may identify the allowed LCHs at operation S2850. The terminal selects LCHs to be transmitted on the GF resources based on the information ascertained from the LCH configuration and the DCI for activating the GF resources.

A. That is, the terminal selects the LCHs having the profile ID of the activated GF resources by comparing the profile ID of the activated GF resources that is ascertained from the DCI received at operation S2830 and the profile IDs corresponding to the individual logical channels that are ascertained from the LCH configuration information received at operation S2810.

The terminal performs an LCP operation on the selected logical channels at operation S2860. Next, the terminal transmits, at operation S2870, a packet generated as a consequence of the LCP operation using the GF resources.

Although a UL data transmission method of the disclosure have been embodied as described with reference to FIGS. 25 to 28, the disclosure may include any combination of the embodiments.

FIGS. 25, 26, 27, and 28 are directed to the operations of the terminal and the terminal for uplink data transmission on the GF resources allocated by the base station to the terminal. Such operations may be applied for UL transmission on the resources allocated by SPS. It may be exemplified as follows.

1. A base station provides a terminal with LCH configuration information about individual logical channels. The LCH configuration information is transmitted through RRC signaling.

A. According to an embodiment of the disclosure, the LCH configuration information may include following information:

1) Information indicating whether the traffic belonging to the corresponding logical channel is transmittable on SPS-allocated resources (referred to as SPSAllowed)

2. The base station allocates resources to the terminal through SPS. The SPS is performed through RRC signaling.

3. The terminal obtains a chance to perform UL transmission on the resources allocated by the base station through SPS.

4. The terminal selects LCHs to be transmitted on the resources allocated through based on the information ascertained form the LCH configuration information received at operation 1.

A. In this case, the terminal selects the LCHs for which the SPSAllowed described at operation 1 is set to True and does not select the LCHs for which the SPSAllowed is set to False.

5. The terminal performs an LCP operation on the LCHs selected at operation 4.

6. The terminal transmits a packet generated as a consequence of the LCP operation using the resources allocated through.

It may also be exemplified as follows.

1. A base station provides a terminal with LCH configuration information about individual logical channels. The LCH configuration information is transmitted through RRC signaling.

2. The base station allocates resources to the terminal through SPS. The SPS is performed through RRC signaling.

A. According to an embodiment of the disclosure, the SPS configuration information for allocating resources through SPS may include following information.

1) A list of LCHs transmittable on the resources allocated through SRS

3. The terminal obtains a chance to perform UL transmission on the resources allocated by the base station through SPS.

4. The terminal selects LCHs to be transmitted on the resources allocated through based on the information ascertained form the SPS configuration information received at operation 2.

A. In this case, the terminal selects the LCHs included in the list of LCHs transmittable on the resources allocated through SRS that has been described at operation 2 and does not select the LCHs that are not included in the list.

5. The terminal performs an LCP operation on the LCHS selected at operation 4.

6. The terminal transmits a packet generated as a consequence of the LCP operation using the resources allocated through.

Figure 29:
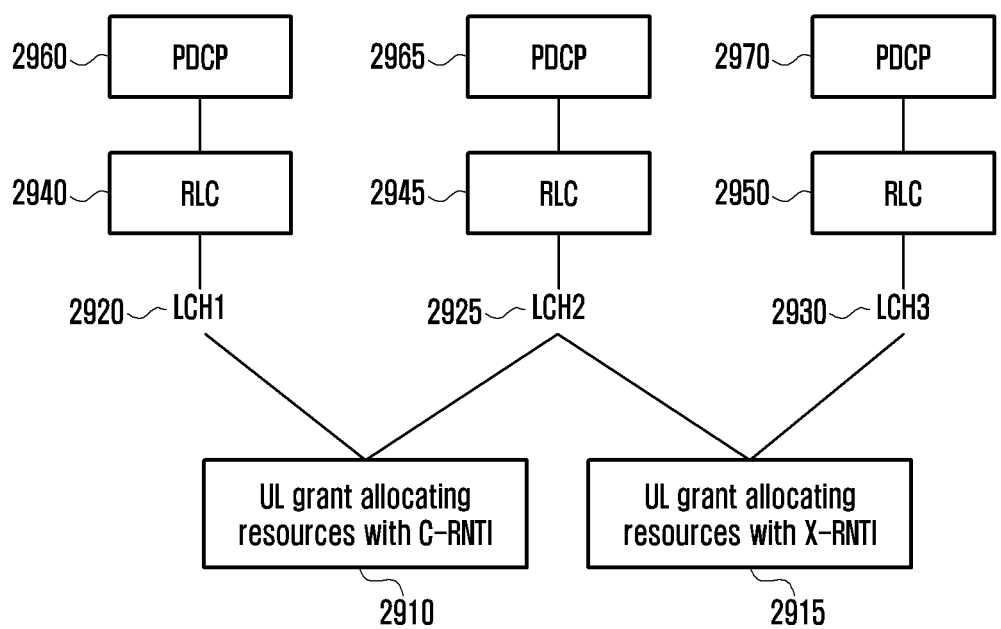
FIG. 29 is a diagram illustrating a method for selecting LCHs to be transmitted on the resources allocated via a UL grant according to an embodiment of the disclosure.

FIG. 29 is a diagram illustrating a method for selecting LCHs to be transmitted on the resources allocated via a UL grant according to an embodiment of the disclosure.

Referring to FIG. 29, packet data convergence protocol (PDCP) entities 2960, 2965, and 2970 and radio link control entities 2940, 2945, and 2950 are activated in a logical channel-specific manner. Here, the logical channels may be identified with different terminal IDs. The terminal ID may be one of several types of IDs in use in a communication protocol; although a radio network temporary identifier (RNTI) is used as the terminal ID in the embodiment of FIG. 29, other types of identifiers can be used as the terminal ID.

Basically, a terminal is assigned a cell-radio network temporary identifier (C-RNTI) when it attaches to a base station; in order to use the RNTI for identifying a logical channel, another type of RNTI is required. In the disclosure, such an ID is referred to as X-RNTI.

The terminal attempts to decode a DCI with the assigned RNTI value in the procedure of receiving the DCI and, if the decoding succeeds with the assigned RNTI value, it identifies the resource allocation for the corresponding RNTI.

In the embodiment of FIG. 29, LCH1 2920 may use the resources allocated with the C-RNTI, LCH2 2925 may use the resources allocated with the C-RNTI and X-RNTI, and LCH3 2930 may use the resources allocated with the X-RNTI. The base station may notify the terminal of the mapping between logical channels and types of RNTI that are used to allocate resources using an RRC configuration message.

The base station may allocate radio resources with different types of terminal ID according to the reliability requirements for traffic. For example, the base station may allocate resources with an X-RNTI (at operation 2915) for the traffic requiring a high reliability such as URLLC services and a C-RNTI (at operation 2910) for other traffic. According to an embodiment of the disclosure, the base station may allocate resources with both the X-RNTI and C-RNTI for the traffic that does not require a high reliability. In this case, it may be possible to perform the LCP such that the high liability traffic has a high priority on the resources allocated with the X-RNTI. In this case, the MCS level on the resources allocated with the X-RNTI may have an error rate lower than that of the MCS level on the resources allocated with the C-RNTI.

Figure 30:
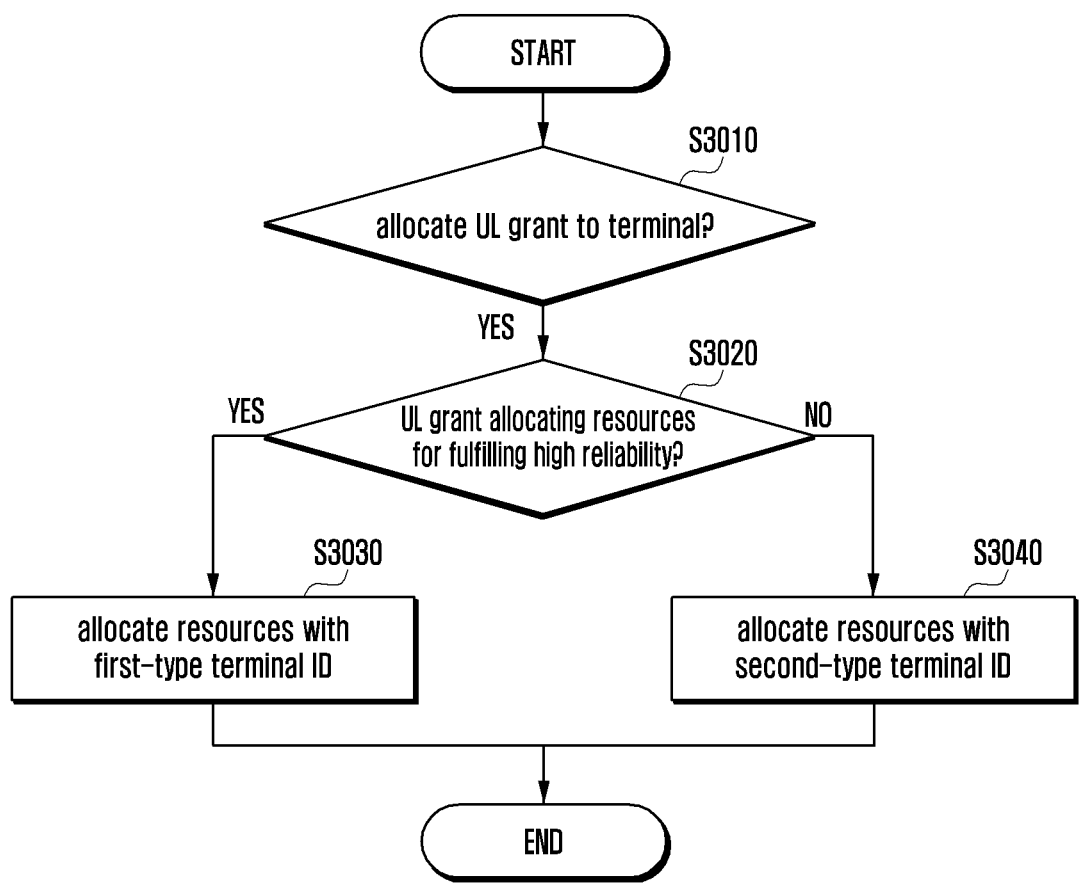
FIG. 30 is a flowchart illustrating a UL resource allocation method of a base station using different terminal ID according to an embodiment of the disclosure.

FIG. 30 is a flowchart illustrating a UL resource allocation method of a base station using different terminal ID according to an embodiment of the disclosure.

If the base station makes an uplink resource allocation (UL grant) to a terminal at operation S3010, it may allocate the UL resources with a different type of terminal ID depending on the target reliability of the corresponding resources.

In order to accomplish this, the base station determines at operation S3020 whether the UL resources is allocated for traffic requiring a high target reliability.

If the UL resources is allocated for the traffic requiring the high target reliability, the base station may allocate the resources with a first-type terminal ID at operation S3030. Here, the first-type terminal ID may be the X-RNTI described in the embodiment of FIG. 29. However, the disclosure is not limited to this embodiment but may encompass other embodiments where any of various types of IDs in use in the communication protocol with the exception of the aforementioned C-RNTI.

If the UL resources is not allocated for the traffic requiring the high target reliability, the base station may allocate the resources with a second-type terminal ID at operation S3040. Here, the second-type terminal ID may be the C-RNTI described in the embodiment of FIG. 29.

The embodiment of FIG. 30 may be performed as an independent procedure or along with at least one of the methods for identifying resources based on the information of bandwidth part, PDCCH monitoring occasion, DCI format, and physical layer properties of the UL resources allocated via a UL grant as described with reference to FIGS. 23 and 24.

Figure 31:
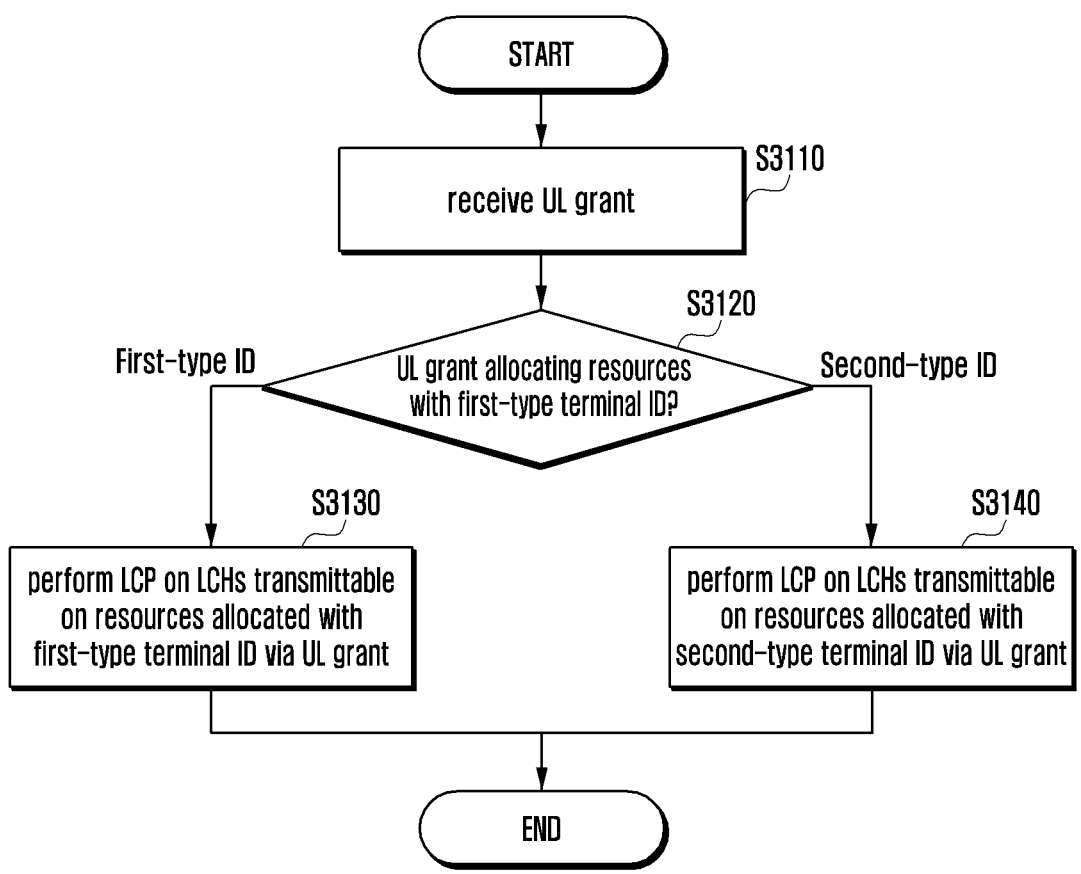
FIG. 31 is a flowchart illustrating a UL resource identification method of a terminal using different terminal ID according to an embodiment of the disclosure.

FIG. 31 is a flowchart illustrating a UL resource identification method of a terminal using different terminal ID according to an embodiment of the disclosure.

The terminal attempts to decode DCI with an assigned RNTI value and, if the decoding succeeds with the assigned RNTI value, identifies the resource allocation for the corresponding RNTI. The terminal may perform the LCP operation differently depending on the type of the terminal ID with which the base station allocates UL resources.

The terminal may receive a UL grant from the base station at operation S3110. Next, the terminal determines at operation S3120 whether the radio resources are allocated with a first-type terminal ID.

If it is determined that the radio resources are allocated with the first-type terminal ID, the terminal performs the LCP operation, at operation S3130, on the LCHs that can be transmitted on the resources allocated with the first-type terminal ID. Here, the first-type terminal ID may be the X-RNTI described with reference to FIG. 29. However, the disclosure is not limited to this embodiment but may encompass other embodiments where any of various types of IDs in use in the communication protocol with the exception of the aforementioned C-RNTI.

If it is determined that the radio resources are allocated with the second-type terminal ID, the terminal performs the LCP operation, at operation S3140, on the LCHs that can be transmitted on the resources allocated with the second-type terminal ID. Here, second-type terminal ID may be the C-RNTI described in the embodiment of FIG. 29. However, the disclosure is not limited to this embodiment but may encompass other embodiments where any of various types of IDs in use in the communication protocol with the exception of the aforementioned C-RNTI.

The embodiment of FIG. 31 may be performed as an independent procedure or along with at least one of the methods for identifying resources based on the information of bandwidth part, PDCCH monitoring occasion, DCI format, and physical layer properties of the UL resources allocated via a UL grant as described with reference to FIGS. 23 and 24.

Figure 32:
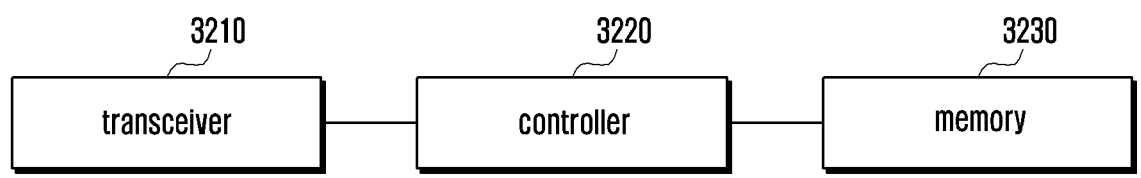
FIG. 32 is a block diagram illustrating a configuration of a terminal according to an embodiment of the disclosure.

FIG. 32 is a block diagram illustrating a configuration of a terminal according to an embodiment of the disclosure.

Referring to FIG. 32, the terminal may include a transceiver 3210, a controller 3220, and a storage unit 3230 (e.g., a memory). According to an embodiment of the disclosure, the controller 3220 may be defined as a circuit, an application-specific integrated circuit, or at least one processor.

The transceiver 3210 may transmit and receive signals. For example, the transceiver 3210 may receive system information, synchronization signals, and reference signals from the base station.

The controller 3220 may control overall operation of the terminal according to an embodiment of the disclosure. For example, the controller 3220 may control signal flows among the internal components of the terminal to accomplish the procedures described with reference to the flowcharts.

For example, the controller 3220 may control the transceiver 3210 to receive LCH-profile mapping information and UL grants from a base station.

The controller 3220 may select data to be transmitted to the terminal based on the profile information included in the UL grants.

The controller 3220 may also receive the information on a parameter set from the base station and select data to be transmitted to the base station based on the parameter set information and the profile information included in the UL grant.

The controller 3220 may also ascertain the profile information in various manners.

The storage unit 3230 may store at least one of the information transmitted and received by the transceiver 3210 and the information generated by the controller 3220.

Figure 33:
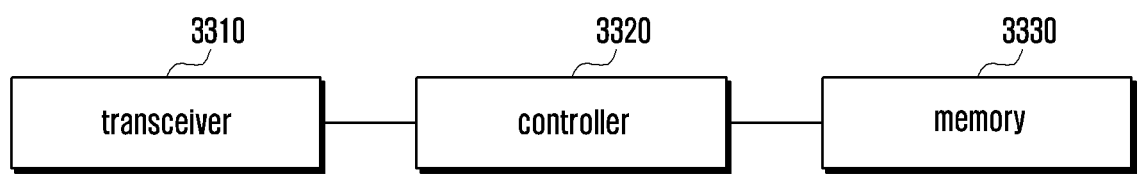
FIG. 33 is a block diagram illustrating a configuration of a base station according to an embodiment of the disclosure.

FIG. 33 is a block diagram illustrating a configuration of a base station according to an embodiment of the disclosure.

Referring to FIG. 33, the base station may include a transceiver 3310, a controller 3320, and a storage unit 3330 (e.g., a memory). According to an embodiment of the disclosure, the controller 3320 may be defined as a circuit, an application-specific integrated circuit, or at least one processor.

The transceiver 3310 may transmit and receive signals. For example, the transceiver 3310 may transmit system information, synchronization signals, and reference signals.

The controller 3320 may control overall operation of the base station according to an embodiment of the disclosure. For example, the controller 3320 may control signal flows among the internal components of the base station to accomplish the procedures described with reference to the flowcharts.

For example, the controller 3320 may transmit LCH-profile mapping information and UL grants to a terminal.

The controller 3320 may control the transceiver 3310 to receive data transmitted by the terminal, the data being selected to be transmitted based on the profile information included in the UL grant.

The controller 3320 may also control the transceiver 3310 to transmit parameter set information to the terminal and receive the data transmitted by the terminal, the data being selected to be transmitted based on the parameter set information and the profile information included in the UL grants.

The controller 3320 may also control the transceiver to transmit the profile information in various manners.

The storage unit 3330 may store at least one of the information transmitted and received by the transceiver 3310 and the information generated by the controller 3320.

As described above, the disclosure is advantageous in terms of making it possible for a terminal having multiple simultaneously active services to select, when UL resources with specific physical properties are allocated to the terminal, a service or logical channel based on the physical layer properties of the UL resources, generate a packet with the data belonging to the selected service or logical channel, and transmit the packet on the UL resources. Also, the disclosure is advantageous in terms of making it possible to meet requirements and qualities of services in use by the terminal more efficiently.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, control information including an uplink grant;
   identifying an identifier of the terminal for decoding the control information, the identifier being identified from a first identifier that is a cell-radio network temporary identifier (C-RNTI) or a second identifier;
   in case that the uplink grant is associated with the second identifier, allocating resources included in the uplink grant to a first logical channel with a higher priority than a second logical channel; and
   transmitting data based on the resources,
   wherein an error rate for a modulation coding scheme (MCS) level of the uplink grant associated with the second identifier is lower than an error rate for an MCS level of an uplink grant associated with the C-RNTI.

2. The method of claim 1, wherein the identifier of the terminal for decoding the control information is determined based on a type of the data.

3. The method of claim 1,
   wherein the data includes at least one of enhanced mobile broadband (eMBB) data or ultra reliable and low latency communication (URLLC) data.

4. The method of claim 1, wherein the allocating of the resources comprises allocating resources to a logical channel based on at least one of subcarrier spacing information, a transmission time interval (TTI), or bandwidth part information.

5. A method performed by a base station in a wireless communication system, the method comprising:
   generating an uplink grant including resource information based on an identifier of a terminal, the identifier of the terminal being identified from a first identifier that is a cell-radio network temporary identifier (C-RNTI) or a second identifier;
   transmitting, to the terminal, control information including the uplink grant; and
   receiving, from the terminal, data based on resources that are allocated to a logical channel based on the identifier of the terminal,
   wherein, in case that the uplink grant is associated with the second identifier, the resources included in the uplink grant associated with the second identifier are allocated to a first logical channel with higher priority than a second logical channel, and
   wherein an error rate for a modulation coding scheme (MCS) level of the uplink grant associated with the second identifier is lower than an error rate for an MCS level of an uplink grant associated with the C-RNTI.

6. The method of claim 5, wherein the identifier of the terminal for decoding the control information is determined based on a type of the data.

7. The method of claim 5,
   wherein the data includes at least one of enhanced mobile broadband (eMBB) data or ultra reliable and low latency communication (URLLC) data.

8. The method of claim 5, wherein the resources are allocated to the logical channel based on at least one of subcarrier spacing information, a transmission time interval (TTI), or bandwidth part information.

9. A terminal in a wireless communication system, the terminal comprising:
   a transceiver; and
   at least one processor configured to:
      receive, via the transceiver from a base station, control information including an uplink grant,
      identify an identifier of the terminal for decoding the control information, the identifier being identified from a first identifier that is a cell-radio network temporary identifier (C-RNTI) or a second identifier,
      in case that the uplink grant is associated with the second identifier, allocate resources included in the uplink grant to a first logical channel with a higher priority than a second logical channel, and
      transmit, via the transceiver to the base station, data based on the resources,
      wherein an error rate for a modulation coding scheme (MCS) level of the uplink grant associated with the second identifier is lower than an error rate for an MCS level of an uplink grant associated with the C-RNTI.

10. The terminal of claim 9, wherein the identifier of the terminal for decoding the control information is determined based on a type of the data.

11. The terminal of claim 9,
    wherein the data includes at least one of enhanced mobile broadband (eMBB) data or ultra reliable and low latency communication (URLLC) data.

12. The terminal of claim 9, wherein the at least one processor is configured to allocate resources to a logical channel based on at least one of subcarrier spacing information, a transmission time interval (TTI), or bandwidth part information.

13. A base station in a wireless communication system, the base station comprising:
    a transceiver; and
    at least one processor configured to:
       generate an uplink grant including resource information based on an identifier of a terminal, the identifier of the terminal being identified from a first identifier that is a cell-radio network temporary identifier (C-RNTI) or a second identifier,
       transmit, via the transceiver to the terminal, control information including the uplink grant, and
       receive, via the transceiver from the terminal, data based on resources that are allocated to a logical channel based on the identifier of the terminal,
       wherein, in case that the uplink grant is associated with the second identifier, the resources included in the uplink grant associated with the second identifier are allocated to a first logical channel with higher priority than a second logical channel, and wherein an error rate for a modulation coding scheme (MCS) level of the uplink grant associated with the second identifier is lower than an error rate for an MCS level of an uplink grant associated with the C-RNTI.

14. The base station of claim 13, wherein the identifier of the terminal for decoding the control information is determined based on a type of the data.

15. The base station of claim 13,
wherein the data includes at least one of enhanced mobile broadband (eMBB) data or ultra reliable and low latency communication (URLLC) data.

16. The base station of claim 13, wherein the resources are allocated to the logical channel based on at least one of subcarrier spacing information, a transmission time interval (TTI), or bandwidth part information.

* * * * *